US011882333B2

(12) United States Patent
Fisch et al.

(10) Patent No.: US 11,882,333 B2
(45) Date of Patent: *Jan. 23, 2024

(54) METHODS AND APPARATUS FOR METERING PORTABLE MEDIA PLAYERS

(71) Applicant: The Nielsen Company (US), LLC, New York, NY (US)

(72) Inventors: Perry Joseph Fisch, Palm Harbor, FL (US); Seth Alan Pelletier, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,285

(22) Filed: Jul. 2, 2021

(65) Prior Publication Data
US 2021/0329335 A1 Oct. 21, 2021

Related U.S. Application Data

(63) Continuation of application No. 16/512,341, filed on Jul. 15, 2019, now Pat. No. 11,057,674, which is a
(Continued)

(51) Int. Cl.
*H04N 21/442* (2011.01)
*G06F 16/41* (2019.01)
(Continued)

(52) U.S. Cl.
CPC ....... *H04N 21/44218* (2013.01); *G06F 16/41* (2019.01); *G11B 27/322* (2013.01);
(Continued)

(58) Field of Classification Search
CPC .......... H04N 21/8358; H04N 21/2541; H04N 21/44204; H04N 21/44224;
(Continued)

(56) References Cited

U.S. PATENT DOCUMENTS 2,662,168 A   12/1953 Scherbatskoy
3,919,479 A   11/1975 Moon et al.
(Continued)

FOREIGN PATENT DOCUMENTS

AU   2005251196   12/2005
AU   2008347051   7/2009
(Continued)

OTHER PUBLICATIONS

United States Patent and Trademark Office, "Restriction Requirement," issued in connection with U.S. Appl. No. 12/006,452, dated Jul. 12, 2011, 6 pages.
(Continued)

*Primary Examiner* — Chenea Davis

(57) ABSTRACT

Example methods, apparatus, and articles of manufacture for media metering are disclosed. An example apparatus disclosed herein includes at least one memory, instructions in the apparatus, and at least one processor installed in a media presentation device to execute the instructions to at least: cause a video decoder to generate video display rasterizing information, present the video display rasterizing information via an output device of the media presentation device, and in response to monitoring being enabled, generate metering information corresponding to media presented in association with the video display rasterizing information presented via the output device.

13 Claims, 22 Drawing Sheets

Related U.S. Application Data continuation of application No. 15/299,652, filed on Oct. 21, 2016, now Pat. No. 10,356,471, which is a continuation of application No. 14/529,922, filed on Oct. 31, 2014, now Pat. No. 9,514,135, which is a continuation of application No. 12/106,040, filed on Apr. 18, 2008, now Pat. No. 8,914,819, which is a continuation of application No. PCT/US2006/060118, filed on Oct. 20, 2006.

(60) Provisional application No. 60/813,757, filed on Jun. 14, 2006, provisional application No. 60/786,196, filed on Mar. 27, 2006, provisional application No. 60/729,421, filed on Oct. 21, 2005.

(51) Int. Cl.

| | |
|---|---|
| *H04R 3/00* | (2006.01) |
| *G11B 27/32* | (2006.01) |
| *G11B 27/36* | (2006.01) |
| *H04H 60/37* | (2008.01) |
| *H04H 60/58* | (2008.01) |
| *H04N 21/235* | (2011.01) |
| *H04N 21/258* | (2011.01) |
| *H04N 21/435* | (2011.01) |
| *H04N 21/439* | (2011.01) |
| *H04N 21/658* | (2011.01) |
| *H04N 21/81* | (2011.01) |
| *H04H 60/59* | (2008.01) |
| *H04L 67/10* | (2022.01) |
| *H04N 21/254* | (2011.01) |
| *H04N 21/4223* | (2011.01) |
| *H04N 21/45* | (2011.01) |
| *H04N 21/4627* | (2011.01) |
| *H04N 21/61* | (2011.01) |
| *H04N 21/6587* | (2011.01) |
| *H04N 21/8358* | (2011.01) |
| *H04H 60/31* | (2008.01) |
| *H04N 21/414* | (2011.01) |
| *H04N 21/44* | (2011.01) |

(52) U.S. Cl.
CPC ............ *G11B 27/36* (2013.01); *H04H 60/37* (2013.01); *H04H 60/58* (2013.01); *H04H 60/59* (2013.01); *H04L 67/10* (2013.01); *H04N 21/235* (2013.01); *H04N 21/2541* (2013.01); *H04N 21/25883* (2013.01); *H04N 21/25891* (2013.01); *H04N 21/4223* (2013.01); *H04N 21/435* (2013.01); *H04N 21/4394* (2013.01); *H04N 21/44204* (2013.01); *H04N 21/44224* (2020.08); *H04N 21/4532* (2013.01); *H04N 21/4627* (2013.01); *H04N 21/6125* (2013.01); *H04N 21/6582* (2013.01); *H04N 21/6587* (2013.01); *H04N 21/8193* (2013.01); *H04N 21/8358* (2013.01); *H04R 3/00* (2013.01); *H04H 60/31* (2013.01); *H04H 2201/90* (2013.01); *H04N 21/41407* (2013.01); *H04N 21/44008* (2013.01); *H04R 2420/05* (2013.01); *H04R 2420/09* (2013.01)

(58) Field of Classification Search
CPC ........... H04N 21/4627; H04N 21/4532; H04N 21/435; H04N 21/6582; H04N 21/4223; H04N 21/6587; H04N 21/4394; H04N 21/44218; H04N 21/41407; H04N 21/25891; H04N 21/235; H04N 21/44008; H04N 21/8193; H04N 21/6125; H04N 21/25883; H04R 3/00; H04R 2420/05; H04R 2420/09; G06F 16/41; H04H 60/59; H04H 60/31; H04H 60/58; H04H 2201/90; G11B 27/36; G11B 27/322; H04L 67/10
See application file for complete search history.

(56) References Cited

U.S. PATENT DOCUMENTS

| | | |
|---|---|---|
| 4,230,990 A | 10/1980 | Lert, Jr. et al. |
| 4,450,551 A | 5/1984 | Kudo et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,955,070 A | 9/1990 | Welsh et al. |
| 5,319,735 A | 6/1994 | Preuss et al. |
| 5,436,653 A | 7/1995 | Ellis et al. |
| 5,450,490 A | 9/1995 | Jensen et al. |
| 5,481,294 A | 1/1996 | Thomas et al. |
| 5,512,933 A | 4/1996 | Wheatley et al. |
| 5,526,427 A | 6/1996 | Thomas et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,612,729 A | 3/1997 | Ellis et al. |
| 5,675,510 A | 10/1997 | Coffey et al. |
| 5,687,191 A | 11/1997 | Lee et al. |
| 5,737,025 A | 4/1998 | Dougherty et al. |
| 5,764,763 A | 6/1998 | Jensen et al. |
| 5,778,182 A | 7/1998 | Cathey et al. |
| 5,787,334 A | 7/1998 | Fardeau et al. |
| 5,796,952 A | 8/1998 | Davis et al. |
| 5,828,325 A | 10/1998 | Wolosewicz et al. |
| 5,872,588 A | 2/1999 | Aras et al. |
| 5,945,932 A | 8/1999 | Smith et al. |
| 5,963,909 A | 10/1999 | Warren et al. |
| 6,097,441 A | 8/2000 | Allport |
| 6,108,637 A | 8/2000 | Blumenau |
| 6,115,680 A | 9/2000 | Coffee et al. |
| 6,138,147 A | 10/2000 | Weaver et al. |
| 6,154,484 A | 11/2000 | Lee et al. |
| 6,175,627 B1 | 1/2001 | Petrovic et al. |
| 6,247,128 B1 | 6/2001 | Fisher et al. |
| 6,286,104 B1 | 9/2001 | Buhle et al. |
| 6,353,929 B1 * | 3/2002 | Houston .............. H04H 20/38 705/7.33 |
| 6,385,766 B1 | 5/2002 | Doran, Jr. et al. |
| 6,466,765 B1 | 10/2002 | Tanaka et al. |
| 6,467,089 B1 | 10/2002 | Aust et al. |
| 6,539,358 B1 | 3/2003 | Coon et al. |
| 6,577,346 B1 | 6/2003 | Perlman |
| 6,621,881 B2 | 9/2003 | Srinivasan |
| 6,647,548 B1 | 11/2003 | Lu et al. |
| 6,675,383 B1 | 1/2004 | Wheeler et al. |
| 6,745,011 B1 | 6/2004 | Hendrickson et al. |
| 6,754,470 B2 | 6/2004 | Hendrickson et al. |
| 6,755,346 B2 | 6/2004 | Epstein |
| 6,810,413 B1 | 10/2004 | Rajakarunanayake et al. |
| 6,834,308 B1 | 12/2004 | Ikezoye et al. |
| 6,845,360 B2 | 1/2005 | Jensen et al. |
| 6,862,355 B2 | 3/2005 | Kolessar et al. |
| 6,871,180 B1 | 3/2005 | Neuhauser et al. |
| 6,934,508 B2 | 8/2005 | Ceresoli et al. |
| 7,222,071 B2 | 5/2007 | Neuhauser et al. |
| 7,289,643 B2 | 10/2007 | Brunk et al. |
| 7,324,824 B2 | 1/2008 | Smith et al. |
| 7,340,677 B2 | 3/2008 | Cowperthwaite |
| 7,587,732 B2 | 9/2009 | Wright et al. |
| 7,630,888 B2 | 12/2009 | Bichsel |
| RE42,627 E | 8/2011 | Neuhauser et al. |
| 8,019,449 B2 | 9/2011 | Barzegar et al. |
| 8,116,401 B2 | 2/2012 | Ibrahim et al. |
| 8,185,100 B2 | 5/2012 | Jones et al. |
| 8,225,342 B2 | 7/2012 | Mears et al. |

(56) References Cited

U.S. PATENT DOCUMENTS

| | | |
|---|---|---|
| 8,296,791 B2 | 10/2012 | Steuer et al. |
| 8,315,554 B2 | 11/2012 | Levy et al. |
| 8,335,576 B1 | 12/2012 | Bradshaw et al. |
| 8,539,527 B2 | 9/2013 | Wright et al. |
| 8,763,022 B2 | 6/2014 | Ramaswamy |
| 8,869,187 B2 | 10/2014 | Wright et al. |
| 8,914,819 B2 | 12/2014 | Mears et al. |
| 8,930,003 B2 | 1/2015 | Krug et al. |
| 9,191,581 B2 | 11/2015 | Srinivasan et al. |
| 9,325,381 B2 | 4/2016 | Gutierrez |
| 9,491,518 B2 | 11/2016 | Wright et al. |
| 9,514,135 B2 | 12/2016 | Fisch et al. |
| 9,614,881 B2 | 4/2017 | Krug et al. |
| 10,356,471 B2 | 7/2019 | Fisch et al. |
| 11,057,674 B2 | 7/2021 | Fisch et al. |
| 2001/0003166 A1 | 6/2001 | Gulick |
| 2001/0053190 A1 | 12/2001 | Srinivasan |
| 2002/0026635 A1 | 2/2002 | Wheeler et al. |
| 2002/0032904 A1 | 3/2002 | Lerner |
| 2002/0042730 A1 | 4/2002 | Homer |
| 2002/0056089 A1 | 5/2002 | Houston |
| 2002/0059577 A1 | 5/2002 | Lu et al. |
| 2002/0066083 A1 | 5/2002 | Patel et al. |
| 2002/0068600 A1 | 6/2002 | Chihara et al. |
| 2002/0069037 A1 | 6/2002 | Hendrickson et al. |
| 2002/0107701 A1 | 8/2002 | Batty et al. |
| 2002/0111912 A1 | 8/2002 | Hunter et al. |
| 2002/0112048 A1* | 8/2002 | Gruyer .............. G06Q 30/02 709/224 |
| 2002/0178441 A1 | 11/2002 | Hashimoto |
| 2003/0005430 A1 | 1/2003 | Kolessar |
| 2003/0053792 A1 | 3/2003 | Janevski |
| 2003/0061490 A1 | 3/2003 | Abajian |
| 2003/0073402 A1 | 4/2003 | Herring et al. |
| 2003/0110485 A1 | 6/2003 | Lu et al. |
| 2003/0131350 A1 | 7/2003 | Peiffer et al. |
| 2003/0170001 A1 | 9/2003 | Breen |
| 2003/0229900 A1 | 12/2003 | Reisman |
| 2004/0019463 A1 | 1/2004 | Kolessar et al. |
| 2004/0019675 A1 | 1/2004 | Hebeler, Jr. et al. |
| 2004/0051812 A1 | 3/2004 | Hayward |
| 2004/0064319 A1 | 4/2004 | Neuhauser et al. |
| 2004/0116067 A1 | 6/2004 | Karaoguz et al. |
| 2004/0117224 A1 | 6/2004 | Agarwal et al. |
| 2004/0122679 A1 | 6/2004 | Neuhauser et al. |
| 2004/0132407 A1 | 7/2004 | Hein-Magnussen et al. |
| 2004/0230332 A1 | 11/2004 | Cheng |
| 2004/0254887 A1 | 12/2004 | Jacoby |
| 2005/0054285 A1 | 3/2005 | Mears et al. |
| 2005/0086334 A1 | 4/2005 | Aaltonen et al. |
| 2005/0119967 A1 | 6/2005 | Ishiguro et al. |
| 2005/0144632 A1 | 6/2005 | Mears et al. |
| 2005/0204379 A1 | 9/2005 | Yamamori |
| 2005/0216509 A1 | 9/2005 | Kolessar et al. |
| 2005/0225665 A1 | 10/2005 | Chen |
| 2005/0228665 A1 | 10/2005 | Kobayashi et al. |
| 2005/0232411 A1 | 10/2005 | Srinivasan et al. |
| 2005/0267750 A1 | 12/2005 | Steuer et al. |
| 2006/0105702 A1 | 5/2006 | Muth et al. |
| 2006/0129496 A1 | 6/2006 | Chow et al. |
| 2006/0195861 A1 | 8/2006 | Lee |
| 2006/0269004 A1 | 11/2006 | Ibrahim et al. |
| 2006/0294225 A1 | 12/2006 | Grecco et al. |
| 2007/0006250 A1 | 1/2007 | Croy et al. |
| 2007/0006275 A1 | 1/2007 | Wright et al. |
| 2007/0011040 A1 | 1/2007 | Wright et al. |
| 2007/0038516 A1 | 2/2007 | Apple et al. |
| 2007/0050832 A1 | 3/2007 | Wright et al. |
| 2007/0115827 A1 | 5/2007 | Boehnke et al. |
| 2007/0142024 A1 | 6/2007 | Clayton et al. |
| 2007/0254695 A1 | 11/2007 | Langberg et al. |
| 2007/0259621 A1 | 11/2007 | Lin et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0022294 A1 | 1/2008 | Perrin et al. |
| 2008/0049704 A1 | 2/2008 | Witteman et al. |
| 2008/0081608 A1 | 4/2008 | Findikli et al. |
| 2008/0091489 A1 | 4/2008 | LaRock et al. |
| 2008/0263579 A1 | 10/2008 | Mears et al. |
| 2009/0034750 A1 | 2/2009 | Ayoub et al. |
| 2009/0061769 A1 | 3/2009 | Zimbric et al. |
| 2009/0068949 A1 | 3/2009 | Lin |
| 2009/0077578 A1 | 3/2009 | Steuer et al. |
| 2009/0169024 A1 | 7/2009 | Krug et al. |
| 2009/0222848 A1 | 9/2009 | Ramaswamy |
| 2011/0115827 A1 | 5/2011 | Tanaka |
| 2011/0140961 A1 | 6/2011 | Yeh et al. |
| 2012/0308064 A1 | 12/2012 | Matthews |
| 2015/0058299 A1 | 2/2015 | Fisch et al. |
| 2015/0112466 A1 | 4/2015 | Krug et al. |
| 2016/0212250 A1 | 7/2016 | Gutierrez |
| 2017/0041668 A1 | 2/2017 | Fisch et al. |
| 2019/0342612 A1 | 11/2019 | Fisch et al. |

FOREIGN PATENT DOCUMENTS

| | | |
|---|---|---|
| CN | 1557093 | 12/2004 |
| CN | 1663249 | 8/2005 |
| CN | 1685735 | 10/2005 |
| CN | 101371472 | 2/2009 |
| EP | 0887958 | 12/1998 |
| EP | 1213860 | 6/2002 |
| JP | 2000307530 | 11/2000 |
| JP | 2002344933 | 11/2002 |
| JP | 2004272810 | 9/2004 |
| WO | 9111062 | 7/1991 |
| WO | 9810539 | 3/1998 |
| WO | 0058962 | 10/2000 |
| WO | 0245273 | 6/2002 |
| WO | 2005038625 | 4/2005 |
| WO | 2005079457 | 9/2005 |
| WO | 2005079941 | 9/2005 |
| WO | 2005119651 | 12/2005 |
| WO | 2006014362 | 2/2006 |
| WO | 2007070789 | 6/2007 |
| WO | 2009088485 | 7/2009 |

OTHER PUBLICATIONS

United States Patent and Trademark Office, "Non-Final Office Action," issued in connection with U.S. Appl. No. 12/006,452, dated Nov. 18, 2011, 11 pages.

United States Patent and Trademark Office, "Final Office Action," issued in connection with U.S. Appl. No. 12/006,452, dated Apr. 26, 2012, 13 pages.

United States Patent and Trademark Office, "Advisory Action," issued in connection with U.S. Appl. No. 12/006,452, dated Aug. 3, 2012, 3 pages.

United States Patent and Trademark Office, "Non-Final Office Action," issued in connection with U.S. Appl. No. 12/006,452, dated Oct. 28, 2013, 13 pages.

United States Patent and Trademark Office, "Notice of Allowance," issued in connection with U.S. Appl. No. 12/006,452, dated Apr. 17, 2014, 17 pages.

United States Patent and Trademark Office, "Notice of Allowance," issued in connection with U.S. Appl. No. 12/006,452, dated Sep. 5, 2014, 5 pages.

IP Australia, "Patent Examination Report No. 1," issued in connection with Australian Patent Application No. 2008347051, dated Oct. 31, 2012, 3 pages.

International Searching Authority, "International Search Report and Written Opinion", issued in connection with International Patent Application No. PCT/US2008/014142, dated Mar. 3, 2009, 9 pages.

Bender et al., "Techniques for Data Hiding," IBM Systems Journal, vol. 35, Nos. 3 4, 1996, 24 pages.

Walker, "Audio Watermarking," British Broadcasting Corporation Research and Development, Aug. 2004, 18 pages.

(56) References Cited

OTHER PUBLICATIONS

IP Australia, "Notice of Acceptance," issued in connection with Australian Patent Application No. 2008347051, dated Jan. 7, 2013, 1 page.
Apple Inc., "AirPort Express—Setup Guide," 2007, retrieved from www.apple.com/airport , 56 pages.
European Patent Office, "Intent to Grant," issued in connection with European Patent Application No. 11006764.2, dated Feb. 12, 2014, 7 pages.
European Patent Office, "Intent to Grant," issued in connection with European Patent Application No. 11006764.2, dated Jul. 9, 2014, 8 pages.
European Patent Office, "Decision to Grant," issued in connection with European Patent Application No. 11006764.2, dated Nov. 20, 2014, 4 pages.
IP Australia, "Notice of Acceptance," issued in connection with Australian Patent Application No. 2013203923, dated Jan. 15, 2015, 2 pages.
State Intellectual Property Office of China, "First Office Action," issued in connection with Chinese Patent Application No. 201210472409.4, dated Nov. 24, 2014, 14 pages.
Mexican Institute of Industrial Property, "Office Action," issued in connection with Mexican Patent Application No. MX/a/2014/004336, dated Dec. 11, 2014, 5 pages.
International Bureau, "International Preliminary Report on Patentability," issued in connection with International Patent Application No. PCT/US2006/60118, dated Apr. 29, 2008, 7 pages.
IP Australia, "Patent Examination Report No. 2," issued in connection with Australian Patent Application No. 2011239270, dated Mar. 24, 2015, 3 pages.
State Intellectual Property Office of China, "Second Office Action," issued in connection with Chinese Patent Application No. 201210472409.4, dated Aug. 7, 2015, 15 pages.
IP Australia, "Notice of Grant," issued in connection with Australian Patent Application No. 2013203923, dated May 14, 2015, 2 pages.
State Intellectual Property Office of China, "First Office Action," issued in connection with Chinese Patent Application No. 201210472240.2, dated Jan. 6, 2015, 16 pages.
Mexican Institute of Industrial Property, "Official Action," issued in connection with Mexican Patent Application No. MX/a/2011/013715, dated Jul. 19, 2013, 5 pages.
European Patent Office, "Communication Pursuant to Article 94(3) EPC," issued in connection with European Patent Application No. 11006764.2, dated May 27, 2013, 3 pages.
European Patent Office, "Intention to Grant," issued in connection with European Patent Application No. 11006764.2, dated Dec. 17, 2012, 8 pages.
The Korean Intellectual Property Office, "Notice of Preliminary Rejection," issued in connection with Korean Patent Application No. 10-2008-7012179, dated Apr. 29, 2013, 9 pages.
United States Patent and Trademark Office, "Notice of Allowance," issued in connection with U.S. Appl. No. 12/106,040, dated Jul. 18, 2014, 8 pages.
IP Australia, "Patent Examination Report No. 1 ," issued in connection with Australian Patent Application No. 2011239270, dated Feb. 5, 2014, 5 pages.
IP Australia, "Patent Examination Report No. 1," issued in connection with Australian Patent Application No. 2013203923, dated Feb. 5, 2014, 4 pages.
Arbitron, "The Manchester 300—Out of the Lab and into the Field: A Report on the Extended Field Test of Arbitrons Portable People Meter in Manchester, England," Jan. 1, 2000, 24 pages.
Friess, "Nielsen, TiVo Try Ratings Game," Sep. 13, 2002, retrieved from http://www.wired.com/print/entertainment/music/news/2002/09/55091 , retrieved on Mar. 5, 2009, 2 pages.
Think CP Technologies, "Think Headtrip," retrieved from http://www.thinkcp.com/products/thinkheadtrip.asp., retrieved on Jan. 18, 2006, 2 pages.

United States Patent and Trademark Office, "Non-Final Office Action," issued in connection with U.S. Appl. No. 12/106,040, dated Sep. 30, 2010, 10 pages.
United States Patent and Trademark Office, "Final Office Action," issued in connection with U.S. Appl. No. 12/106,040, dated May 17, 2011, 12 pages.
United States Patent and Trademark Office, "Non-Final Office Action," issued in connection with U.S. Appl. No. 12/106,040, dated Apr. 5, 2012, 12 pages.
United States Patent and Trademark Office, "Final Office Action," issued in connection with U.S. Appl. No. 12/106,040, dated Oct. 29, 2012, 17 pages.
European Patent Office, "Extended Search Report," issued in connection with European Patent Application No. 10008093.6, dated Nov. 5, 2010, 12 pages.
European Patent Office, "Communication Pursuant to Article 94(3) EPC," issued in connection with European Patent Application No. 10008093.6, dated Sep. 19, 2011, 4 pages.
European Patent Office. "Extended European Search Report," issued in connection with European Patent Application No. 11006764.2, dated Jan. 23, 2012, 10 pages.
IP Australia, "Examiners First Report," issued in connection with Australian Patent Application No. 2006304933, dated Apr. 22, 2010, 2 pages.
IP Australia, "Examiners Second Report," issued in connection with Australian Patent Application No. 2006304933, dated Jun. 2, 2011, 2 pages.
IP Australia, "Notice of Acceptance," issued in connection with Australian Patent Application No. 2006304933, dated Jul. 7, 2011, 3 pages.
Canadian Intellectual Property Office, "Office Action," issued in connection with Canadian Patent Application No. 2,626,798, dated Oct. 28, 2011, 3 pages.
Canadian Intellectual Property Office, "Office Action," issued in connection with Canadian Patent Application No. 2,626,798, dated Dec. 21, 2012, 3 pages.
The State Intellectual Property Office of China, "First Notification of Office Action," issued in connection with Chinese Patent Application No. 200680045794.7, dated Dec. 7, 2011, 16 pages.
The State Intellectual Property Office of China, "Notice of Decision of Granting Patent Right for Invention," issued in connection with Chinese Patent Application No. 200680045794.7, dated Sep. 5, 2012, 4 pages.
The Korean Intellectual Property Office, "Notice of Preliminary Rejection," issued in connection with Korean Patent Application No. 10-2008-7012179, dated Sep. 27, 2012, 5 pages.
Mexican Institute of Industrial Property, "Official Action," issued in connection with Mexican Patent Application No. MX/a/2008/005249, dated Aug. 5, 2011, 7 pages.
United States Patent and Trademark Office, "Non-Final Office," issued in connection with U.S. Appl. No. 12/106,040, dated Jun. 24, 2013, 15 pages.
International Searching Authority, "Search Report," issued in connection with International Patent Application No. PCT/US06/60118, dated Mar. 14, 2008, 1 page.
International Searching Authority, "Written Opinion," issued in connection with International Patent Application No. PCT/US06/60118, dated Mar. 14, 2008, 6 pages.
The State Intellectual Property of China, "Second Office Action," issued in connection with Chinese Patent Application No. 201210472240.2, dated Sep. 21, 2015, 6 pages.
United States Patent and Trademark Office, "Final Office Action," issued in connection with U.S. Appl. No. 12/106,040, dated Feb. 14, 2014, 12 pages.
European Patent Office, "Decision to Grant," issued in connection with European Patent Application No. 06827898.5, dated Jul. 22, 2010,1 page.
European Patent Office, "Communication pursuant to Article 94(3) EPC," issued in connection with European Patent Application No. 10008093.6, dated Dec. 21, 2015, 7 pages.
United States Patent and Trademark Office, "Final Office Action," issued in connection with U.S. Appl. No. 14/529,922, dated Feb. 18, 2016,6 pages.

(56) References Cited

OTHER PUBLICATIONS

United States Patent and Trademark Office, "Advisory Action," issued in connection with the U.S. Appl. No. 14/529,922, dated May 23, 2016, 5 pages.
United States Patent and Trademark Office, "Non-Final Office Action," issued in connection with U.S. Appl. No. 15/084,922, dated Jul. 1, 2016, 11 pages.
United States Patent and Trademark Office, "Notice of Allowance," issued in connection with U.S. Appl. No. 14/577,888, dated Jun. 23, 2016, 15 pages.
European Patent Office, "Communication pursuant to Article 94(3) EPC," issued in connection with European Patent Application No. 10008093.6, dated Aug. 17, 2016, 8 pages.
United States Patent and Trademark Office, "Notice of Allowance," issued in connection with U.S. Appl. No. 14/529,922, dated Jul. 28, 2016, 7 pages.
Canadian Intellectual Property Office, "Office Action," issued in connection with Canadian Patent Application No. 2,710,836, dated Jul. 14, 2015, 4 pages.
IP Australian Government, "Notice of Grant," issued in connection with Australian Patent Application No. 2008347051, dated May 2, 2013, 1 page.
European Patent Office, "Search Report," issued in connection with European Patent Application No. 08870324.4, dated Mar. 22, 2016, 7 pages.
European Patent Office, "Communication pursuant to Rules 70(2) and 70a(2) EPC," issued in connection with European Patent Application No. 08870324.4, dated Apr. 8, 2016, 1 pages.
International Searching Authority, "International Preliminary Report on Patentability," issued in connection with International Patent Application No. PCT/US2008/014142, dated Jul. 6, 2010, 6 pages.
United States Patent and Trademark Office, "Notice of Allowance," issued in connection with U.S. Appl. No. 14/577,888, dated Dec. 6, 2016, 6 pages.
Canadian Intellectual Property Office, "Notice of Allowance," issued in connection with Canadian Patent Application No. 2,710,836, dated Oct. 18, 2018, 1 page.
United States Patent and Trademark Office, "Final Office Action," issued in connection with U.S. Appl. No. 15/084,922, dated Jan. 6, 2017, 13 pages.
United States Patent and Trademark Office, "Non-Final Office Action," issued in connection with U.S. Appl. No. 14/529,922, dated Jul. 31, 2015, 8 pages.
United States Patent and Trademark Office, "Notice of Allowance," issued in connection with U.S. Appl. No. 15/084,922, dated May 9, 2017, 20 pages.
United States Patent and Trademark Office, "Non-Final Office Action," issued in connection with U.S. Appl. No. 15/299,652, dated Apr. 24, 2017, 10 pages.
United States Patent and Trademark Office, "Final Office Action," issued in connection with U.S. Appl. No. 15/299,652, dated Aug. 10, 2017, 12 pages.
United States Patent and Trademark Office, " Advisory Action," issued in connection with U.S. Appl. No. 15/299,652, dated Nov. 9, 2017, 3 pages.
United States Patent and Trademark Office, "Non-Final Office Action," issued in connection with U.S. Appl. No. 15/299,652, dated Jan. 11, 2018, 11 pages.
United States Patent and Trademark Office, "Final Office Action," issued in connection with U.S. Appl. No. 15/299,652, filed Jun. 5, 2018, 16 pages.
United States Patent and Trademark Office, "Notice of Allowance," issued in connection with U.S. Appl. No. 15/299,652, dated Mar. 5, 2019, 8 pages.
United States Patent and Trademark Office, "Non-Final Office Action," issued in connection with U.S. Appl. No. 16/512,341, dated May 14, 2020, 9 pages.
United States Patent and Trademark Office, "Final Office Action," issued in connection with U.S. Appl. No. 16/512,341, dated Oct. 28, 2020, 6 pages.
United States Patent and Trademark Office, "Notice of Allowance," issued in connection with U.S. Appl. No. 16/512,341, dated Feb. 19, 2021, 8 pages.

* cited by examiner

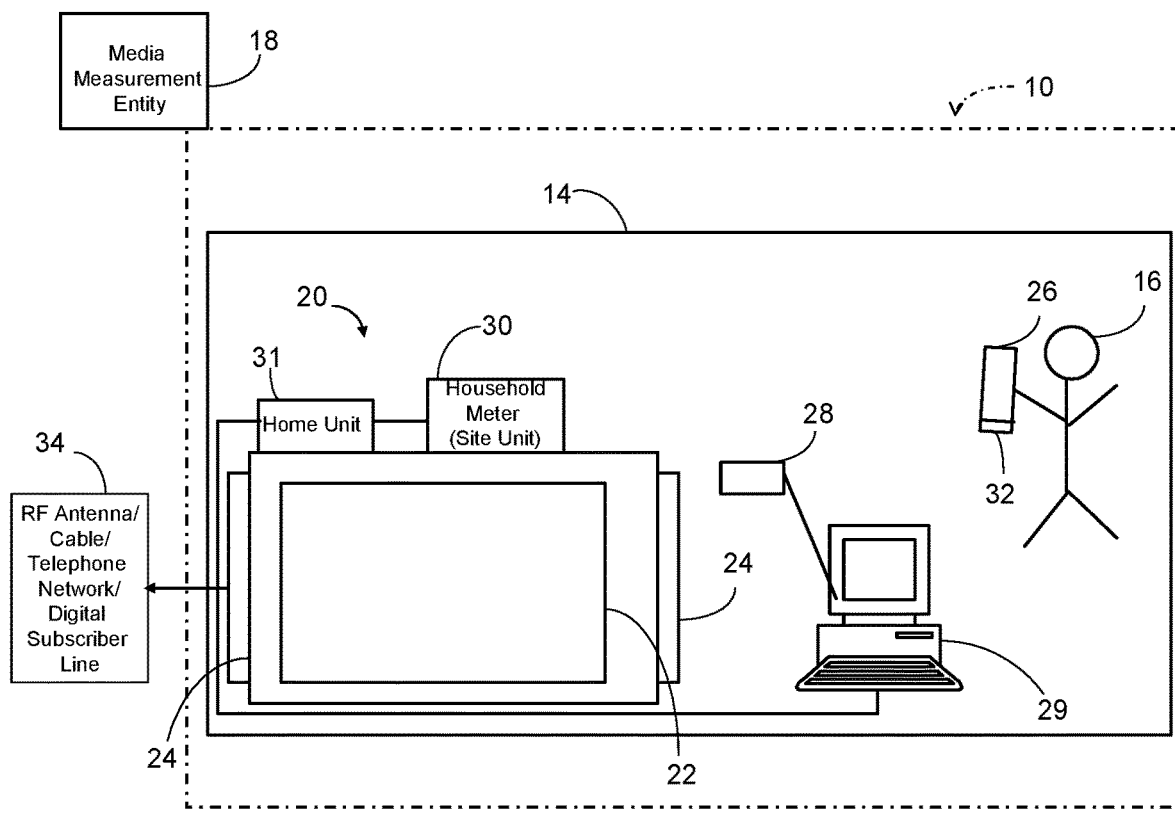
FIG. 1
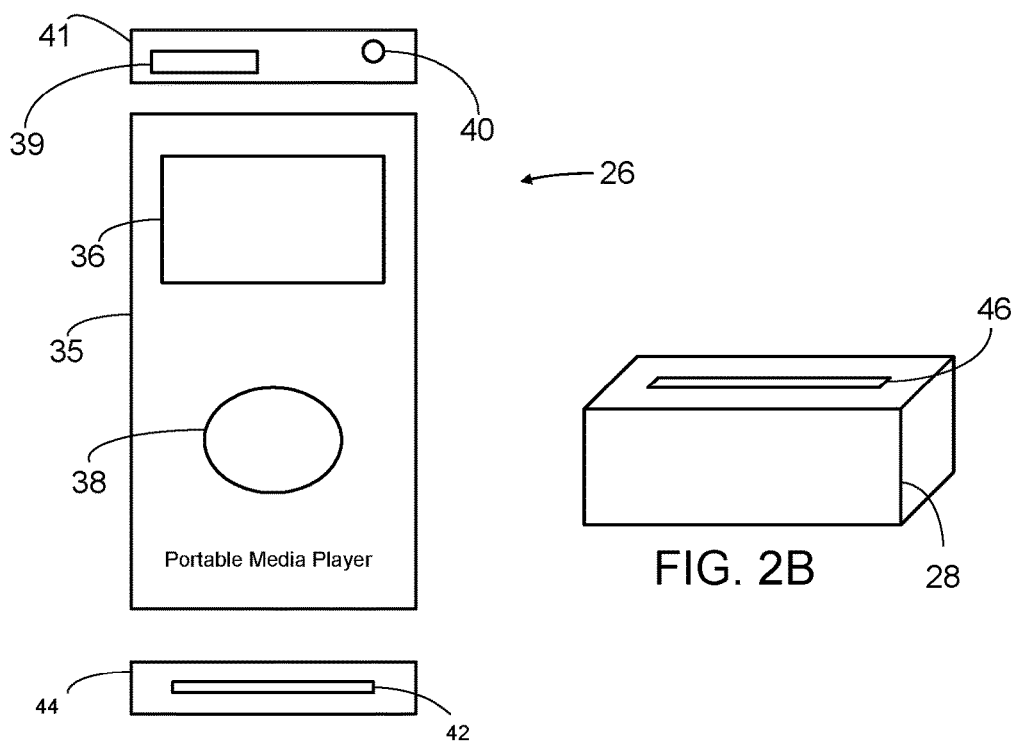
FIG. 2A
FIG. 2B

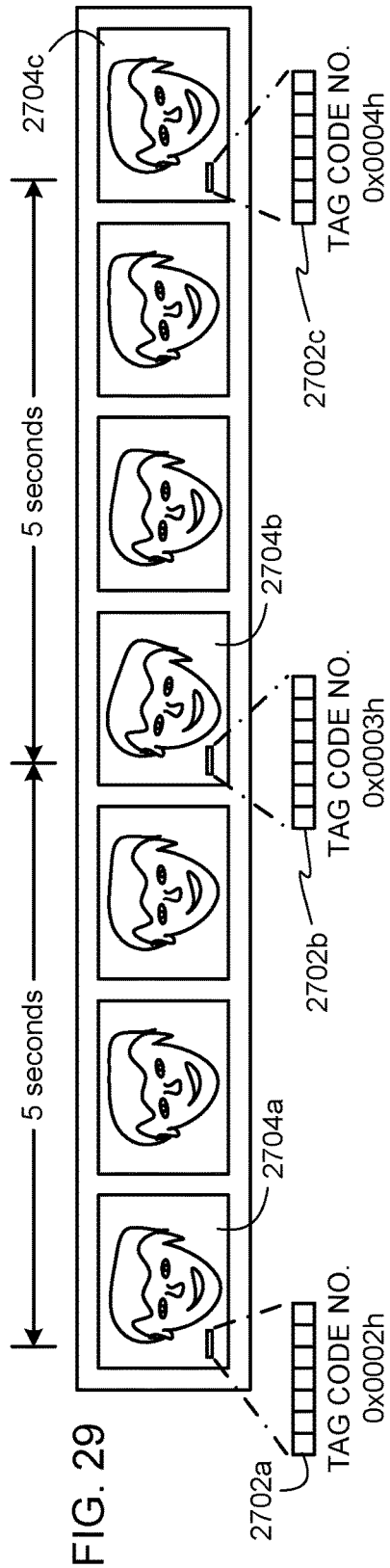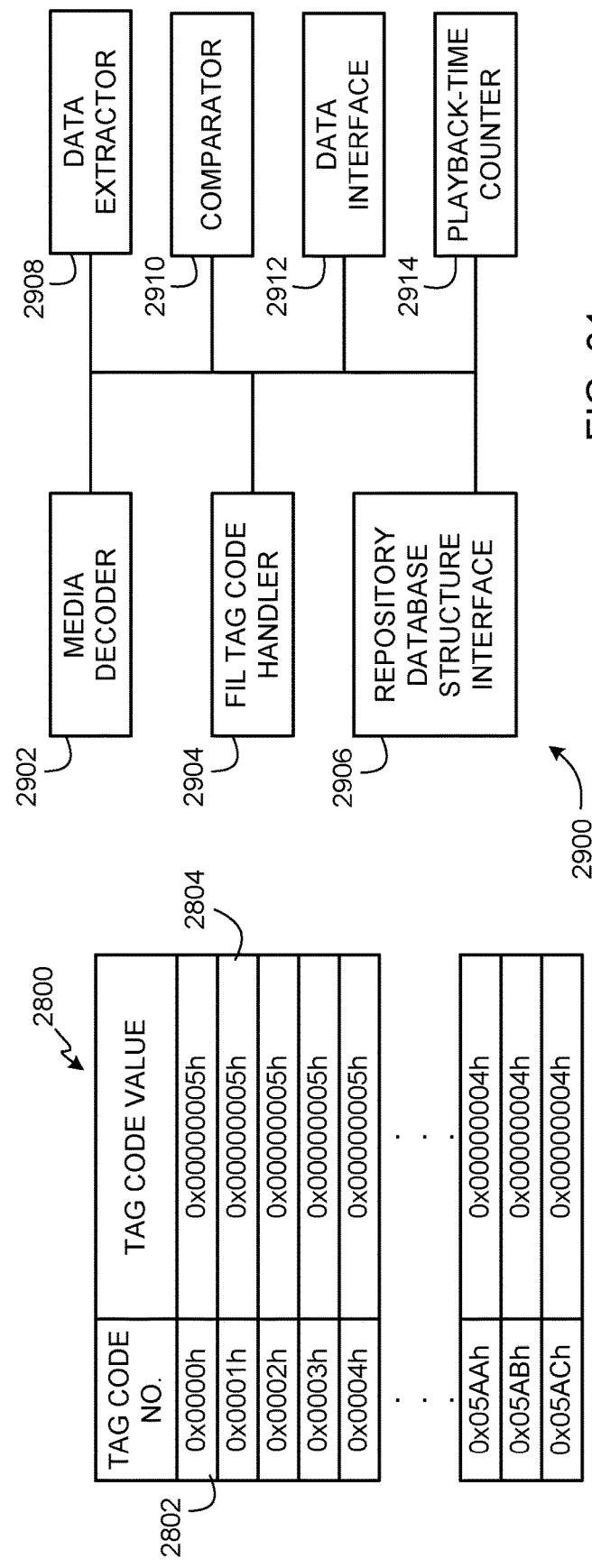

METHODS AND APPARATUS FOR METERING PORTABLE MEDIA PLAYERS

RELATED APPLICATIONS

This patent arises from a continuation of U.S. patent application Ser. No. 16/512,341, filed Jul. 15, 2019, now U.S. Pat. No. 11,057,674, which arises from a continuation of U.S. patent application Ser. No. 15/299,652, filed Oct. 21, 2016, now U.S. Pat. No. 10,356,471, which arises from a continuation of U.S. patent application Ser. No. 14/529,922, filed Oct. 31, 2014, now U.S. Pat. No. 9,514,135 which arises from a continuation of U.S. patent application Ser. No. 12/106,040, filed Apr. 18, 2008, now U.S. Pat. No. 8,914,819, which arises from a continuation of International Patent Application No. PCT/US2006/060118, filed Oct. 20, 2006, which claims the benefit of U.S. Provisional Patent Application Ser. No. 60/729,421, filed Oct. 21, 2005, U.S. Provisional Patent Application Ser. No. 60/786,196, filed Mar. 27, 2006, and U.S. Provisional Patent Application Ser. No. 60/813,757, filed Jun. 14, 2006, all of which are hereby incorporated herein by reference in their entireties.

FIELD OF THE DISCLOSURE

This disclosure relates generally to audience measurement and, more particularly, to methods and apparatus for metering portable media players.

BACKGROUND

Consuming media presentations generally involves listening to audio information and/or viewing video information such as, for example, radio programs, music, television programs, movies, still images, etc. Media-centric companies such as, for example, advertising companies, broadcasting networks, etc. are often interested in the viewing and listening interests of their audience to better allocate their advertising expenditures and better market their products.

A known technique often used to measure the exposure of audience members to media involves installing metering equipment within a household connected to one or more televisions and/or stereos throughout the household. When members of the household watch television or other video media content (e.g., digital video disks, video cassette recorders, persona video recorders, etc.) and/or listen to radio programming or audio from compact discs (CD's), tapes, etc., the metering equipment collects metering information (e.g., video or audio signatures (e.g., samples of the monitored signals or proxies representative of such samples), identification codes (e.g., codes ancillary to the program content inserted into the program for the purpose of audience measurement), time/date stamps, user identities, demographic characteristics, etc.).

Another known technique used to measure the exposure of audience members to media involves using personal portable metering devices (PPM's), which are also known as portable metering devices and portable personal meters. A PPM is an electronic device that is worn (e.g., clipped to a belt or other apparel) or otherwise carried by an audience member to monitor the media consumption (e.g., viewing and/or listening activities) of that audience member. To detect audio, some PPM's are provided with a microphone to pick up audio emitted from speakers (e.g., television speakers, stereo speakers, computer speakers, etc.). To detect video, some PPM's are provided with an optical sensor (e.g., a light sensor, a camera sensor, etc.) that picks up video emitted by a screen or display.

BRIEF DESCRIPTION OF THE DRAWINGS

FIG. 1 is a block diagram illustrating an example media consumption environment, including an example portable media player, that is metered by a media measurement entity through the use of an example portable media player meter.

FIG. 2A is a plan diagram of the example portable media player of FIG. 1 illustrating the front, top and bottom panels of the portable media player.

FIG. 2B is a three-dimensional view of a recharging/docking device (also shown in FIG. 1) for use with the example portable media player of FIG. 1.

FIG. 29 depicts example frame incremental logging (FIL) tag codes embedded in a plurality of video frames.

FIG. 30 depicts an example data structure used to store a plurality of example FIL tag codes.

FIG. 31 depicts an example system that may be used to monitor media presented via the personal computer and/or an example portable media player.

DETAILED DESCRIPTION

Figure 3A:
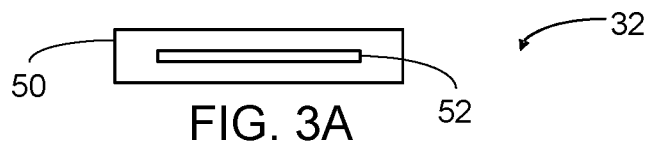
FIGS. 3A-3C are plan diagrams of the example portable media player meter of FIG. 1.

The example portable media player meter, methods, apparatus and/or machine readable instructions described herein may be used to monitor media presented by a portable media presentation device. An example method of monitoring media presented by a portable media presentation device involves collecting media metering information associated with media content presented by the portable media presentation device, and communicating the media metering information to a media measurement company to analyze media consumption of audience members. Preferably, the media measurement company is a neutral entity that does not create and/or distribute media content and, thus, can function as a trusted third party monitor of the distribution and/or consumption of media content.

An example apparatus to monitor media presented by a portable media presentation device includes a signal line interface to receive media presentation information (e.g., media content such as video information, audio information, graphics information, etc. and/or metadata (e.g., content title, author, date of publication, source and/or publisher information, copyright information, digital rights management information, etc) associated with the media content) from a media signal line associated with the portable media presentation device. The example apparatus also includes a processor communicatively coupled to the signal line interface and configured to receive the media presentation information and generate media metering information based on the media presentation information. To store the media presentation information, the apparatus is provided with a memory communicatively coupled to the processor. In addition, the apparatus includes a communication interface to communicate the media metering information to a processor system (e.g., a computer, a media measurement entity, etc.).

In other examples, the methods and apparatus used to monitor media presented by a portable media presentation device may additionally or alternatively be used to monitor media presented by other media player devices (e.g., computers, set-top-boxes, digital versatile disk ("DVD") players, video cassette recorders ("VCR's"), televisions, stereo's, etc.) and/or media player applications (e.g., media player software applications, media player hardware applications, etc.).

Portable media players may also send and receive information wirelessly. For instance, wireless telephone service providers allow subscribers to place and receive voice telephone calls, send and receive photos, participate in text messaging, send and receive e-mail messages, browse web pages, and/or download and/or stream music broadcasts, MP3 files (including proprietary and non-proprietary digital audio/video format variations), talk radio broadcasts, news broadcasts, and various broadcast entertainment programs (e.g., sitcoms, movies, etc.). The portable media players may include speakers to allow the user to hear analog audio signals, and/or a display, such as a liquid crystal display (LCD) screen to allow the user to view video signals. Alternatively, or additionally, the portable media player may include a headphone/earphone connector to allow the user to consume audio signals privately, thereby minimizing eavesdropping and/or preventing people nearby from being annoyed by the audio signals. For instance, some jurisdictions require that automobile drivers use an earpiece when talking on a wireless phone, or face a monetary fine.

Wireless headphones/earpieces are not limited to wireless telephones, but are also used with home stereo systems and portable (e.g., handheld) media players, such as MP3 players (e.g., IPod®, Creative Zen®, Cowon iAudio®, etc.). Wireless technologies to transfer audio signals from the portable media player to the user's headphones/earphones include, but are not limited to, infrared signals, IEEE-802.11 signals, Bluetooth® signals, and/or other optical and radio frequency signal technologies.

FIG. 1 is a block diagram of an example media consumption environment 10 within which the apparatus and methods described in greater detail below may be used to meter the presentation/display of media content by an example portable media player. The example media consumption environment 10 shown in FIG. 10 includes a media consumer's household 14 having media consumer(s) 16 (only one of whom is shown) that have agreed to permit a media measurement entity 18 having a central data collection facility to meter their viewing/listening habits/behaviors (i.e., media consumption). The household 14 includes an example media presentation system 20 having a video display device 22 with speakers 24 and further includes a portable media player ("media player") 26 that is capable of playing audio and/or displaying video (i.e., presenting media). Example implementations of portable media player 26 include an IPod® sold by Apple, and/or other MP3 players.

The example household 14 of FIG. 1 includes a docking/recharging device 28 that is communicatively coupled to a personal computer 29 (e.g., a processor system). The docking/recharging device 28 is provided to enable transferring data (e.g., media content, control data, metadata, or any other data) between the media player 26 and the personal computer 29 and to recharge the media player 26. The consumer 16 may mechanically and communicatively couple the media player 26 to the docking/recharging device 28 to transfer data and/or to recharge the media player 26. The docking/recharging device 28 may be eliminated and replaced with, for example, a USB cable to dock the media player 26 to a personal computer 29 and that performs the functions of the docking/recharging device 28. In some example implementations, the personal computer 29 may be used to implement the docking/recharging device 28 or at least the functions thereof and the USB cable may be used as a data transmission medium and/or a power transmission medium between the media player 26 and the personal computer 29.

In the example of FIG. 1, a household media meter 30 and a portable media player meter 32 are provided to meter the presentation of media content. The household media meter 30 ("household meter" also referred to as a "Site Unit") of the illustrated example is configured to meter the presentation of audio and/or video content by the display device 22 and/or speakers 24. The portable media player meter ("meter") 32 of the illustrated example is removably attached to the portable media player 26 and is configured to meter the presentation of media content by the media player 26. The portable meter 32 generates and/or collects media presentation metering information reflecting and/or identifying presentation of media content by the media player 26. For example, the portable meter 32 may detect and/or collect ancillary audio and/or video codes present in the content presented by the media player 26, may detect and/or collect metadata embedded in or otherwise associated with the content presented by the media player 26, and/or may generate and/or collect signatures (e.g., video rasterizing data, audio samples data, etc.) representative of the media content presented by the media player 26. While the portable meter 32 is shown attached to the media player 26 in the example of FIG. 1, other implementations may be realized, for example, in which the portable meter 32 is embedded into a listening device, such as a pair of headphones, as discussed in further detail below.

To communicate metering information to the media measurement entity 18, the example household 14 illustrated in FIG. 1 is provided with a home unit 31 that may be communicatively coupled to the household meter 30 and/or the portable meter 32. The home unit 31 is communicatively coupled to the media measurement entity 18 via a communication network 34. The communication network 34 may be implemented using any suitable data communications medium and/or service. For example, the communication network 34 may be, for example, a wired or wireless telephone network, a cable network, a satellite network, a utility (e.g., electrical service) network, etc. and may provide Internet services and/or media content delivery services to the household 14. In the illustrated example, the communication network 34 is also communicatively coupled to the media presentation system 20 and the personal computer 29.

The home unit 31 of the illustrated example collects metering information from the portable meter 32 and the household meter 30 and transmits the collected metering information to the media measurement entity 18. In the illustrated example, the home unit 31 combines the metering information received from the portable meter 32 and the household meter 30, and forwards the combined metering information to the media measurement entity 18 via the communication network 34. In an alternative example, the home unit 31 does not combine the metering information received from the portable meter 32 and the household meter 30, but instead transmits the metering information received from the portable meter 32 separate from the metering information received from the household meter 30. For example, some media providers may permit the portable media player 26 to display audio and/or video that is also broadcast to the consumer's household 14 via the presentation system 20. As such, any embedded ancillary audio and/or video codes in the household broadcast also reside in the media content presented on the portable media player. Separating any metering information received from the household meter 30 from metering information received from the portable meter 32 allows the media measurement entity 18 to determine the source of the metering information and, thus, identify the presentation device via which the associated content was consumed. Alternatively, the portable meter 32 may append an additional source signal to the metering information identifying the associated metering information as originating at the portable media device so that all metering information from both the household meter 30 and the portable meter 32 may be combined, yet still be identifiable/distinguishable by the metering entity. Source identification may occur via post-processing at, for example, the media measurement entity 18, in which the appended source signal may be detected to determine whether the received metering information originated from the household meter 30 or the portable meter 32.

In yet another example, the docking device 28 is adapted to receive metering information from the portable meter 32 and to transmit the metering information to the personal computer 29, which may in turn communicate the metering information to the media measurement entity 18 via the communication network 34. In a still further example, the home unit 31 may be configured as a communication device adapted solely to transmit information received from the portable meter 32 to the media measurement entity 18. In such examples, the media consumption environment 10 may eliminate or forego metering of the display device 22 and speakers 24 entirely.

In addition to enabling the communication of metering information to the media measurement entity 18, the communication network 34 may enable the presentation system 20 and/or the personal computer 29 to receive or retrieve media content from the plurality of content providers (not shown) via the communication network 34. The content providers may provide a variety of media content such as, for example, television programs, advertisements, audio (e.g., radio) programs, still image information (e.g., web pages), etc. in known manners to a broadcast station (not shown). The broadcast station (not shown) then transmits one or more signals containing the media content to the media consumption environment 10 via the communication network 34.

In the illustrated example, the media player 26 receives media content from the personal computer 29 via the docking device 28. In particular, the consumer 16 may use the personal computer 29 to download and/or retrieve media content provided by content providers via the communication network 34 and may subsequently synchronize, copy, or download the retrieved media content to the media player 26 via the docking device 28. The media player 26 may then present (e.g., display video/graphics and/or emit audio) the media content to the consumer 16. Additionally or alternatively, the portable media player 26 may receive media content wirelessly via, for example, any suitable wireless protocol and corresponding hardware, including, but not limited to, IEEE-802.11 (Wi-Fi®), Bluetooth®, 900 MHz, and/or mobile communications protocols (e.g., CDMA, TDMA, GSM, AMPS, EDGE, etc.). Verizon®, for example, offers audio/video media content on wireless telephones through its VCast® program, and Sprint® offers broadcast media content via wireless phones, including the Weather Channel® and the Fox News Channel®.

FIG. 2A is a plan view of the example media player 26 of FIG. 1. The media player 26 may be implemented using one or more of a music player (e.g., an MP3 player, an IPod®, etc.), a game player, a video player, a video recorder, a camera, an image viewer, an audio and/or video enabled wireless telephone, and/or the like. In the example illustrated in FIG. 2A, the media player 26 is implemented using an Apple IPod® that is capable of presenting video and/or audio to the consumer 16. Further detail regarding the configuration and operation of an example media player is available in U.S. Pat. No. 6,934,812, Robbin et al. which is hereby incorporated by reference. In the example of FIG. 2A, the face panel 35 of the media player 26 includes a display device 36 by which live action video, streaming video, still images, etc. may be viewed. The face panel 35 of the media player 26 further includes a user input device 38 by which the consumer 16 (see FIG. 1) may select content to be presented by the media player 26. The top panel 41 of the media player 26 includes a headphone jack 40 that enables the presentation of audio to the consumer 16 (see FIG. 1). The top panel 41 also includes a communication port 39 to exchange information between the media player 26 and a remote control (not shown). The information exchanged by the communication port 39 may include, for example, presentation control signals (e.g., stop, play, search, etc.) and media presentation information (e.g., track title, volume level, etc.).

Referring to FIGS. 2A and 2B, a bottom panel 44 of the example media player 26 includes a media player communication port 42 that is configured to engage a docking communication port 46 on the recharging/docking device 28. The docking communication port 46 may be used to communicate media content and/or other information between the media player 26 and, for example, the personal computer 29 via the recharging/docking device 28, as described below. The docking communication port 46 may also be used to transfer electrical power from the recharging/docking device 28 to a rechargeable battery (e.g., the rechargeable battery 65 depicted in FIG. 4) disposed in the media player 26.

Figure 3B:
Figure 3C:

FIGS. 3A-3C are plan views of the example meter 32. The example meter 32 has a top panel 50 (FIG. 3A) including a player-side communication port 52. The player-side communication port 52 is configured to engage the media player communication port 42 (see FIG. 2A) so that the portable meter 32 may be physically and communicatively coupled to the media player 26. The bottom panel 56 (FIG. 3C) of the portable meter 32 includes a docking-side communication port 54 that is configured to engage the docking communication port 46 on the recharging/docking device 28 (see FIG. 2B). The portable meter 32 has a signal pass-through feature that enables the signals associated with the media player communication port 42 and the docking communication port 46 to be communicated or transferred between the ports 52 and 54. Accordingly, when the media player 26 is engaged to or coupled to the portable meter 32, the signals available at the media player communication port 42 are at least substantially identical to the signals available at the docking-side communication port 54 of the portable meter 32. In this manner, when the docking-side communication port 54 is engaged to or mechanically coupled to the docking communication port 46, the media player 26 can be electrically and/or communicatively coupled to the recharging/docking device 28 via the portable meter 32 for recharging and/or information transfer without needing to disengage the portable meter 32 from the media player 26. Alternatively, as discussed in further detail below, the portable meter 32 may be configured to reside in a set of headphones/earphones. For example, the portable media player 26 may be Bluetooth® enabled and may transmit audio content wirelessly to the consumer's headphones/earphones, which may also be Bluetooth® enabled. Media content collected by the Bluetooth® enabled portable meter 32 can be electrically and/or communicatively coupled to the media measurement entity 18 via, for example, a USB port, a mini-USB port, and/or other communication ports of the consumer's headphones/earphones.

In the illustrated example, the player-side communication port 52 engages or mechanically couples to the media player communication port 42 so that the media player 26 and the portable meter 32 appear or substantially appear to be a single, monolithic unit. In the illustrated example, the portable meter 32 and the media player 26 have at least some corresponding dimensions (e.g., width and depth dimensions) that are substantially similar or identical. In other words, the form factor (e.g., a housing) of the portable meter corresponds to and/or complements the form factor (e.g., a housing) of the portable player 26 so that the meter and player combined appear to be a single device in appearance. In this manner, the portable meter 32 does not detract from or decrease the portability of the media player 26.

Figure 4:
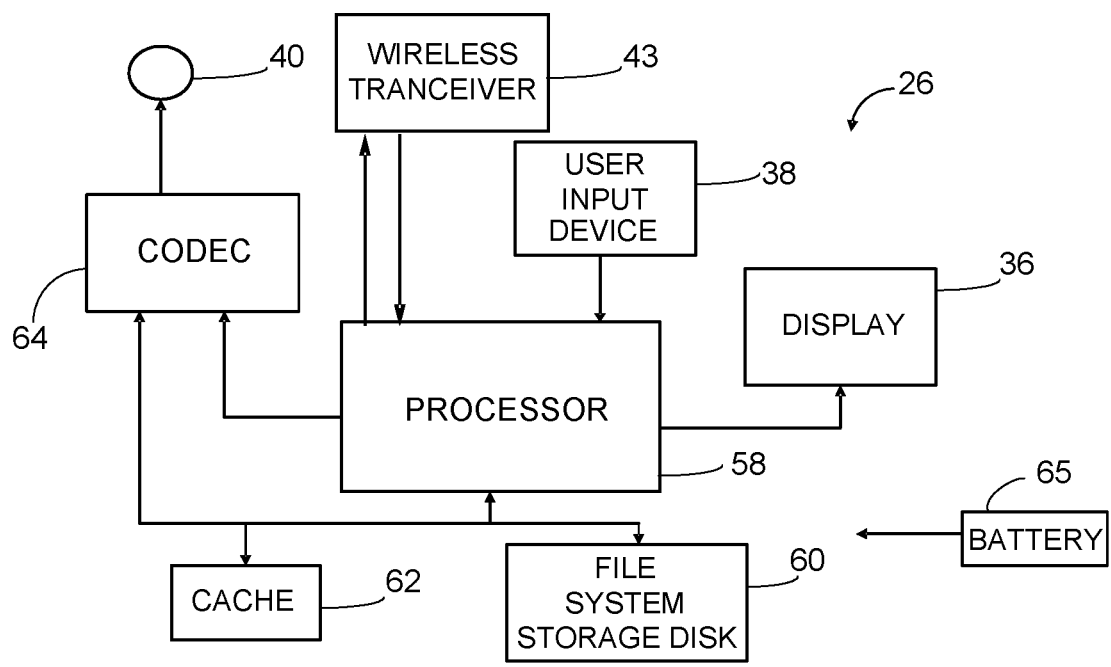
FIG. 4 is a block diagram of the components of the example portable media player of FIGS. 1 and 2.

Referring now to FIG. 4, the example media player 26 includes a processor 58 coupled to the display device 36, the user input device 38, a file system storage disk 60, a cache memory 62, and a codec 64. The user input device 38 enables the selection of audio and/or video content (stored in, for example, the file system storage disk 60 and/or the cache 62) to be played by the media player 26. The processor 58 accesses or causes the codec 64 to access the selected audio/video content from the file system storage disk 60 and/or cache 62. In the illustrated example, the codec 64 accesses audio content for decoding and the processor 58 accesses video content for decoding. For instance, the codec 64 processes the audio content to produce analog audio signals and communicates the analog audio signals to the headphone jack 40 for emission by a speaker (not shown) disposed in a headphone/earphone (not shown) coupled to the headphone jack 40.

In other examples, a wireless transceiver 43 may be used instead of the headphone jack 40 to communicate the audio signals to a consumer's headphones/earphones. For example, Bluetooth® enabled transmission/receiving devices are relatively inexpensive, wireless, allow for relatively high-bandwidth communication, and consume low amounts of battery power. The low power radio waves employed by the Bluetooth® standard operate at a frequency of approximately 2.45 GHz and transmit signals at a power of approximately 1 milliwatt, thereby limiting Bluetooth® enabled device interoperation to approximately 10 meters. Before Bluetooth® devices successfully operate with one another, they create a personal-area network (PAN), also referred to as a piconet. To prevent unauthorized snooping of Bluetooth® transmissions, users may establish trusted devices that may exchange data without asking permission. Unauthorized devices, however, may not participate in the established piconet of trusted devices without authorization from at least one authorized device. The wireless transceiver 43 may also be implemented using any suitable wireless protocol and corresponding hardware including, for example, IEEE-802.11 (Wi-Fi®), 900 MHz, and/or mobile communications protocols (e.g., CDMA, EDMA, GSM, AMPS, EDGE, etc.).

The processor 58 may execute video decoding software (e.g., an MPEG-2 decoder, an MPEG-4 decoder, etc.) stored in, for example, the processor 58 and/or the file system storage disk 60 to generate video display rasterizing information and communicate the rasterizing information to the display 36. The media player 26 also includes a rechargeable battery 65 that provides power to each of the components of the media player 26 to enable operation thereof. The rechargeable battery 65 may be recharged by docking the media player 26 in the recharging/docking device 28.

Figure 5:
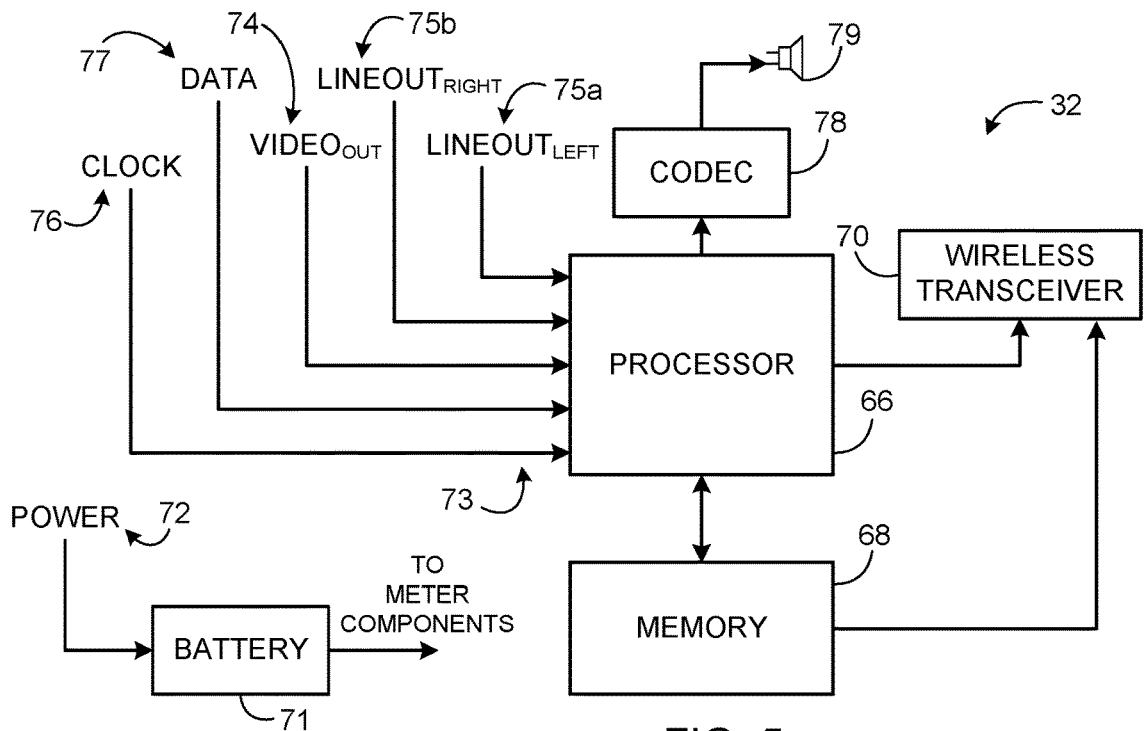
FIG. 5 is a block diagram of the components of the example portable media player meter of FIGS. 1 and 3.

Referring now to FIG. 5, the portable meter 32 includes a processor 66 (e.g., a metering information generator) that accesses and/or stores information in a memory 68. The memory 68 may be implemented using a mass storage optical, magnetic, and/or solid-state memory and may be used to store collected media monitoring information. The memory 68 may also be used to store machine readable instructions (e.g., software and/or firmware) that is retrieved and executed by the processor 66 and cause the processor 66 to perform functions, processes, and/or operations related to monitoring the presentation of media by the media player 26. Flow charts representative of example machine readable instructions that may be stored in the memory 68 and executed by the processor 66 are described below. In some example implementations, the processor 66 may be implemented using circuitry (e.g., an application specific integrated circuit (ASIC)) configured to generate audio signatures, collect metadata, and/or extract audio codes. For example, the processor 66 may be provided with an audio signature generator circuit and/or an audio code and/or metadata extractor circuit.

The portable meter 32 of the illustrated example also includes a wireless transceiver 70 to communicate, for example, media metering information to the home unit 31 (see FIG. 1). The wireless transceiver 70 may be implemented using any suitable wireless protocol and corresponding hardware including, for example, IEEE-802.11 (Wi-Fi®), Bluetooth®, 900 MHz, mobile communications protocols (e.g., CDMA, TDMA, GSM, AMPS, EDGE, etc.).

To power the meter components (e.g., the processor 66, the memory 68, and the wireless transceiver 70), the portable meter 32 includes a rechargeable battery 71. When the media player 26 and the portable meter 32 are docked in the recharging/docking device 28, the rechargeable battery 72 may be charged using power drawn from the recharging/docking device 28. In some examples, the rechargeable battery 71 may additionally or alternatively be recharged by drawing power from the rechargeable battery 65 disposed within the media player 26 when the portable meter 32 is coupled thereto. In an alternative example, the portable meter 32 may not include the rechargeable battery 71, and the meter components (e.g., the processor 66, the memory 68, and the wireless transceiver 70) may instead be directly powered from a power line 72 (e.g., 3.3 V) conveying electrical power from the rechargeable battery 65 of the media player 26.

Figure 6:
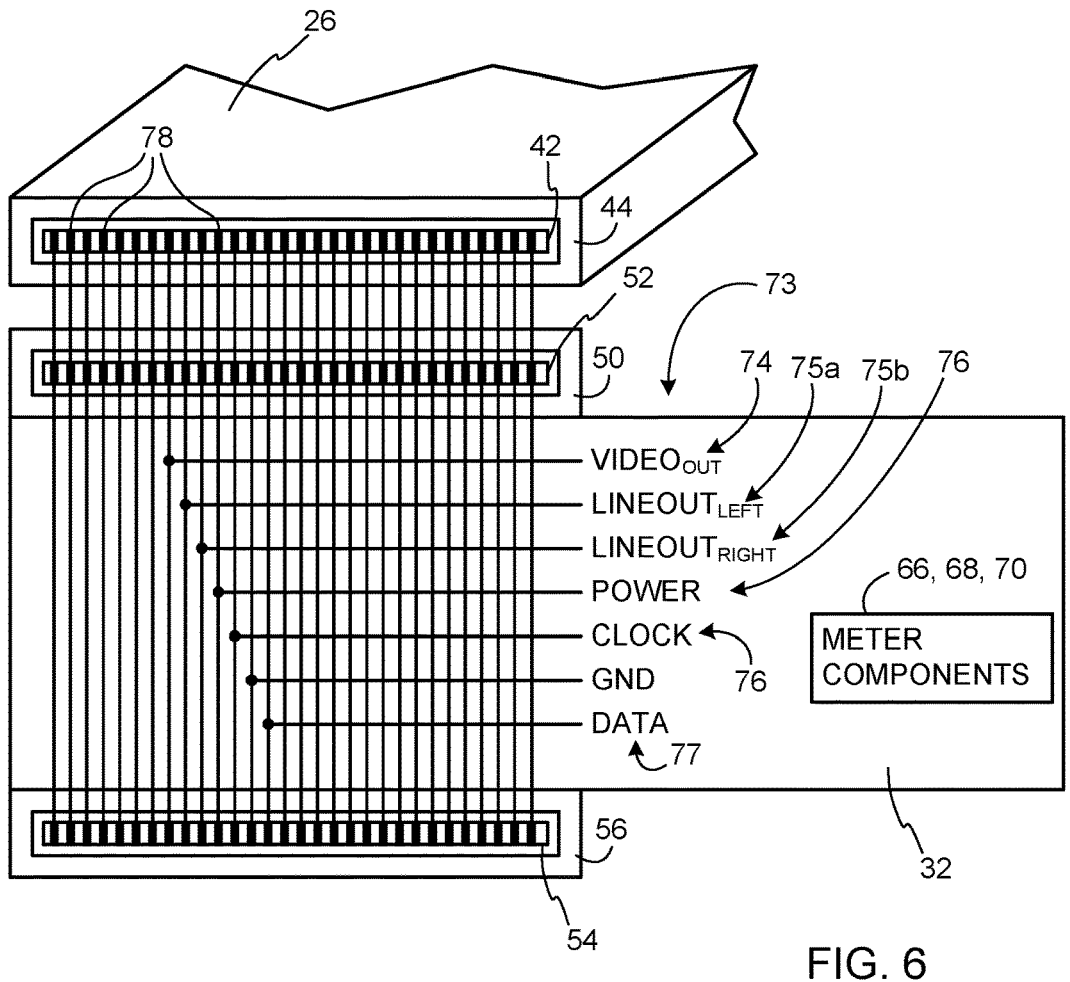
FIG. 6 is a diagram of a communication/power port of the example portable media player of FIG. 1 and a set of communication/power ports associated with the example portable media player meter.

To enable the processor 66 to monitor the presentation of media information, the processor 66 is provided with or is communicatively coupled to a signal line interface 73 that includes a plurality of signal lines 74-77 as shown in FIG. 5. The signal lines 74-77 are also communicatively coupled to the media player 26 via the communication ports 42 and 52 as shown in FIG. 6, and are used to obtain (e.g., transmit, receive, communicate) information related to the presentation of media content by the media player 26. In particular, the signal line interface 73 includes media information signal lines including a VIDEO$_{OUT}$ signal line 74, a LINEOUT$_{LEFT}$ signal line 75a, and a LINEOUT$_{RIGHT}$ signal line 75b. The signal line interface 73 also includes a CLOCK signal line 76 and a DATA signal line 77 (e.g., control and data signals). The VIDEO$_{OUT}$ signal line 74 provides video signals corresponding to video or graphics data (e.g., rasterizing data) presented via the media player display 36. The LINEOUT$_{LEFT}$ signal line 75a and the LINEOUT$_{RIGHT}$ signal line 75b provide audio data (e.g., audio sample data) corresponding to the audio that is emitted or presented via the speakers connected to the media player headphone jack 40.

In some examples, the CLOCK signal line 76 and the DATA signal line 77 may be used to implement a serial data communications interface to enable communicating data formatted according to one or more desired serial communication protocols such as, for example, the universal serial bus (USB) communication protocol and/or the FireWire communication protocol (i.e., IEEE-1394). Serial communication interface ground and power pins may also be included to power devices (e.g., the portable meter 32) via the serial communication interface. The serial communications interface may be used to transfer or synchronize media content and/or other information between the media player 26 and the personal computer 29 via the recharging/docking device 28.

In another alternative example, the portable meter 32 is embedded within the consumer's headphones/earphones. Audio information is transmitted from the portable media player 26 via the wireless transceiver 43, such as a Bluetooth® transceiver, and received by the wireless transceiver 70 of FIG. 5. The portable meter/headphone 32 may also include a codec that processes received audio content to produce analog audio signals and communicate the analog audio signals to speakers 79, such as headphone/earphone speakers. Persons of ordinary skill in the art will appreciate that, in such an example, the signal lines 74-77 may not be necessary.

In another alternative example, the consumer may be provided with a small form factor (SFF) Bluetooth® enabled device to listen for audio information transmitted from the portable media player 26 via the wireless transceiver 43. The SFF device may implement, for instance, the portable meter 32 of FIG. 5, and may conveniently and unobtrusively attach to a consumer's belt-clip and/or fit in a pocket while monitoring for, and collecting media information transmitted via a Bluetooth® enabled portable media player 26. Alternatively, the SFF device may couple to the player 26 in a manner similar to the meter 32 in FIG. 1. Persons of ordinary skill in the art will appreciate that such an example may not need the signal lines 74-77, codec 78, and/or the speakers 79. Collected media information may be stored in the memory 68 for subsequent transfer to the media measurement entity 18.

FIG. 6 depicts an example mechanical configuration that may be used to communicatively couple the plurality of signal lines 74-77 to the media player 26. The media player communication port 42 includes a plurality of conductive pins 78 that provide access to a plurality of media player signal lines (e.g., the $VIDEO_{OUT}$ signal line 74, the $LINEOUT_{LEFT}$ signal line 75a, the $LINEOUT_{RIGHT}$ signal line 75b, the CLOCK signal line 76, and the DATA signal line 77).

The signal lines 74-77 coupled to the media player communication port 42 of the media player 26 are input to the player-side communication port 52 of the portable meter 32 and are supplied in an uninterrupted fashion (e.g., passed through) to the docking-side communication port 54 of the portable meter 32 so that the signals provided at the media player communication port 42 are substantially identical to the signals provided at the docking-side communication port 54. As a result, the docking-side communication port 54 of the portable meter 32 is substantially similar or identical in form and function (e.g., mechanically and electrically) to the media player communication port 42. In this manner, the communication and recharging functions provided by the media player communication port 42 remain intact/undisturbed by the presence of the portable meter 32. That is, coupling the media player 26 to the docking/recharging device 28 via the portable meter 32 enables the media player 26 to be communicatively and electrically coupled to the docking/recharging device 28 as if the portable meter 32 were not attached. Any signals of interest (e.g., the $VIDEO_{OUT}$ signal 74, the $LINEOUT_{LEFT}$ signal line 75a, the $LINEOUT_{RIGHT}$ signal line 75b, the CLOCK signal line 76, and the DATA signal line 77) for purposes of metering the media content presented by the media player 26 or for purposes of tracking/identifying any media content that is transmitted to and stored on the media player 26 are supplied to one or more of the components 66, 68, and 70 disposed in the portable meter 32.

Referring to FIGS. 5 and 6, in the illustrated example, the $VIDEO_{OUT}$ signal 74, is supplied to the processor 66 which may be configured to operate as a video signature processor 66. The video signature processor 66 collects one or more characteristics of the video signal of the presented program content to generate a substantially unique proxy or signature (e.g., a series of digital values, a waveform, etc.) representative of that content. The signature information for the media content presented on the player 26 may be compared to a set of reference signatures corresponding to a known set of media content. In the illustrated example, the reference signatures are generated at a reference site at which all or large portions of all media content is available and then stored for comparison to the signature information collected by one or more meters (e.g., the portable meter 32). When a substantial match is found, the media content that was presented by the media player 26 can be identified with a relatively high probability. Methods and apparatus for implementing the video signature processor 66 are known in the art. For example, U.S. Pat. No. 6,577,346, which is hereby incorporated herein by reference in its entirety, describes a video signature extraction technique. As another example, U.S. Pat. No. 6,633,657, which is hereby incorporated herein by reference in its entirety, describes a signature based program identification apparatus and method for use with a broadcast system. As another example, U.S. Pat. No. 4,677,466, which is hereby incorporated herein by reference in its entirety, discloses signature based program identification apparatus and methods. These and/or any other appropriate technique may be used to implement the video signature processor 66. Additionally or alternatively, example machine readable instructions, such as those described below, may be executed to implement the video signature processor 66.

The processor 66 may additionally or alternatively be configured to operate as an audio signature processor 66. Referring still to FIGS. 5 and 6, in the illustrated example, the audio $LINEOUT_{RIGHT}$ and the audio $LINEOUT_{LEFT}$ signal lines 75a and 75b may be supplied to the audio signature processor 66 (e.g., the processor 66). The audio signature processor 66 uses characteristics of the audio signal of the presented media content to generate a substantially unique proxy or signature (e.g., a series of digital values, a waveform, etc.) representative of that media content. The signature information is then stored for later comparison to reference signatures, each corresponding to a known piece of media content as is described above with respect to video signatures. Methods and apparatus for implementing the audio signature processor 66 are known in the art. For example, in U.S. patent application Ser. No. 09/427,970, which is hereby incorporated herein by reference in its entirety, Srinivasan, et al. disclose audio signature extraction and correlation techniques. As another example, in Patent Cooperation Treaty Application Serial No. PCT/US03/22562, which is hereby incorporated herein by reference in its entirety, Lee, et al. disclose signature-based program identification apparatus and methods for use with a digital broadcast system. These and/or any other appropriate technique may be used to implement the audio signature processor 66. Additionally or alternatively, example machine readable instructions, such as those described below, may be executed to implement the audio signature processor 66.

Additionally or alternatively, the processor 66 may be configured to operate as an audio code detector 66. Referring still to FIGS. 5 and 6, in another example, the audio $LINEOUT_{RIGHT}$ and audio $LINEOUT_{LEFT}$ signal lines 75a and 75b are supplied to the audio code detector 66 (e.g., the processor 66). The example audio code detector 66 is configured to detect audio codes that may be embedded in the audio signal provided by the LINEOUT$_{RIGHT}$ and LINEOUT$_{LEFT}$ signal lines 75a and 75b. Audio codes may be used to encode and/or embed identifying information (e.g., a broadcast/network channel number, a program identification code, a broadcast time stamp, a source identifier to identify a network and/or station providing and/or broadcasting the content, etc.) in, for example, portions of the audio signal accompanying a broadcast program. Preferably, the audio codes are embedded such that they are substantially masked to human hearing by the audio content and/or otherwise inaudible to human hearing. Methods and apparatus for implementing the audio code detector 66 are known in the art. For example, in U.S. Pat. No. 6,272,176, which is hereby incorporated herein by reference in its entirety, Srinivasan discloses broadcast encoding systems and methods for encoding and decoding information transmitted within an audio signal. These and/or any other appropriate technique may be used to implement the audio code detector 66. Additionally or alternatively, example machine readable instructions, such as those described below, may be executed to implement the audio code detector 66.

In a similar fashion, the processor 66 may be configured to operate as a video code detector 66. Referring still to FIGS. 5 and 6, in another example, the VIDEO$_{OUT}$ signal line 74 may be supplied to the video code detector 66 (e.g., the processor 66). Methods and apparatus for implementing the example video code detector 66 are known in the art. For example, in U.S. Pat. No. 5,526,427, which is hereby incorporated herein by reference in its entirety, Thomas, et al. disclose broadcast video encoding systems and methods for encoding and decoding information transmitted within a video signal. By way of further example, U.S. Pat. No. 5,481,294, which is hereby incorporated herein by reference in its entirety, discloses broadcast audience measurement systems for collecting signatures and codes. These and/or any other appropriate technique may be used to implement the video code detector 66. Additionally or alternatively, example machine readable instructions, such as those described below, may be executed to implement the video code detector 66.

Additionally or alternatively, the processor 66 may be configured to operate as a metadata collector 66. For example, in addition to generating signatures and/or detecting codes, information (e.g., metadata) transmitted with media content that is downloaded to the media player 26 via the docking device 28 may be used to obtain information about the viewing/listening habits/activities/preferences of the user 16 of the media player 26. Example metadata associated with particular media content may include, for example, a title of the content, a content distributor, a content description, a content originator, a track number, an album identifier, etc. In some examples, metadata may be stored in, for example, known MP3 ID3 tags of an audio MP3 file or in any other header information or file information of any other type of media. To enable detecting and extracting metadata from media content downloaded to the media player 26, communication signals (e.g., the CLOCK signal line 76 and the DATA signal line 77) between the media player 26 and the docking station 28 are additionally routed to the processor 66. The processor 66 causes the communication signals to be monitored and, depending on what is detected, may cause portions of the communicated information to be stored in the memory 68 for later analysis. For example, the information may be communicated in a known format and the processor 66 may be programmed to parse through the information based on the known format and retrieve/store information of interest, including, for example, a title of the content, a content distributor, a content description, a content originator, a track number, an album identifier etc.

Depending on whether a signature generator, a code detector, and/or a metadata collector are implemented, the processor 66 causes generated signatures, detected codes and/or collected metadata to be stored in the memory 68 with, for example, corresponding timestamps indicating the times at which each signature, metadata and/or code was generated and/or stored. As used herein, metering data may refer to one or more audio and/or video signatures, one or more audio and/or video codes, and/or metadata.

In the illustrated example, the metering information stored in the memory 68 is downloaded on a regular, irregular, periodic, aperiodic, or real-time basis to the household meter 30 (see FIG. 1) using the wireless transceiver 70 disposed in the portable meter 32. In the illustrated example, the wireless transceiver 70 is adapted to communicate upon receiving a notification signal from another wireless transceiver (not shown) disposed in the household meter 30. In another example, the wireless transceiver 70 is adapted to emit an identification signal. If the portable meter 32 is within sufficient proximity to the household meter 30 such that the household meter 30 detects the identification signal, then the household meter 30 responds to the identification signal with a request for data. In response to the request for data, the portable meter 32 begins transmitting metering information to the household meter 30. The household meter 30, in turn, stores the metering information for subsequent transmission to the media measurement entity 18 or, instead, immediately transmits the information to the media measurement entity 18 for further processing.

Flowcharts representative of example machine readable instructions that may be executed to implement the functionality of the portable meter 32 are shown in FIGS. 7 through 21. In these examples, the machine readable instructions represented by each flowchart may comprise one or more programs for execution by: (a) a processor, such as the processor 66 of FIG. 5, (b) a controller, and/or (c) any other suitable device. The one or more programs may be embodied in software stored on a tangible medium such as, for example, the memory 68 (see FIG. 5), but persons of ordinary skill in the art will readily appreciate that the entire program or programs and/or portions thereof could alternatively be executed by a device other than the processors 66 and/or embodied in firmware or dedicated hardware in a well-known manner (e.g., implemented using an application specific integrated circuit (ASIC), a programmable logic device (PLD), a field programmable logic device (FPLD), discrete logic, etc.). For example, the processor 66 and associated components could be implemented using any combination of software, hardware, and/or firmware. Also, some or all of the machine readable instructions represented by the flowcharts of FIGS. 7 through 21 may be implemented manually. Further, although the example machine readable instructions are described with reference to the flowcharts illustrated in FIGS. 7 through 21, persons of ordinary skill in the art will readily appreciate that many other techniques for implementing the example methods and apparatus described herein may alternatively be used. For example, with reference to the flowcharts illustrated in FIGS. 7 through 21, the order of execution of the blocks may be changed, and/or some of the blocks described may be changed, eliminated, combined and/or subdivided into multiple blocks.

Figure 7:
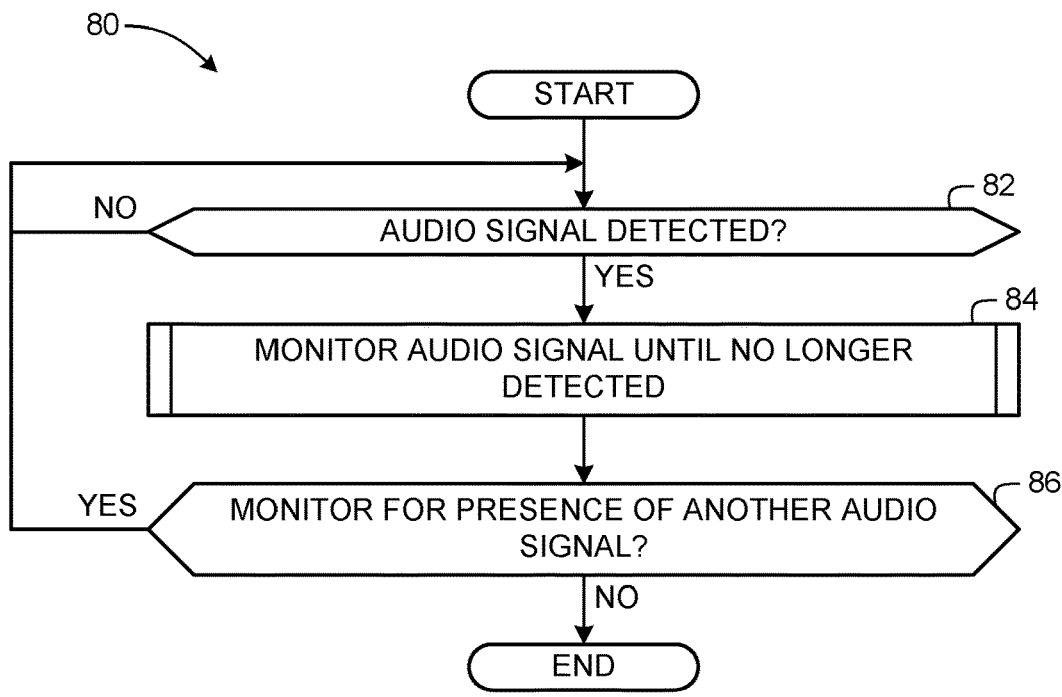
FIG. 7 is a flow chart representative of example machine readable instructions that may be executed by the example portable media player meter of FIGS. 1 and/or 3 to monitor audio signals.

Referring to FIG. 7, the processor 66, when configured to operate as an audio signature generator, monitors the LINEOUT$_{RIGHT}$ and LINEOUT$_{LEFT}$ signal lines 75a and 75b (see FIGS. 5 and 6) supplied by the media player 26 via the media player communication port 42 to determine whether audio signals are present (block 82). If such signals are present, then the processor 66 begins monitoring the audio signals until such signals are no longer present (block 84) at the LINEOUT$_{RIGHT}$ and LINEOUT$_{LEFT}$ signal lines 75a and 75b as described herein in connection with FIG. 8. After the processor 66 finishes monitoring the audio signals at block 84, the processor 66 determines whether it should monitor for the presence of another audio signal (block 86). For example, the processor 66 may determine that it should monitor for the presence of another signal if it does not detect that a "power off" command has been issued in the media player 26. If the processor 66 determines that it should monitor for the presence of another audio signal, then the processor 66 returns control to the operation of block 82 and monitors for the presence of another audio signal. Otherwise, if the processor 66 determines that it should not monitor for the presence of another audio signal, then the process 80 of FIG. 7 is ended.

Figure 8:
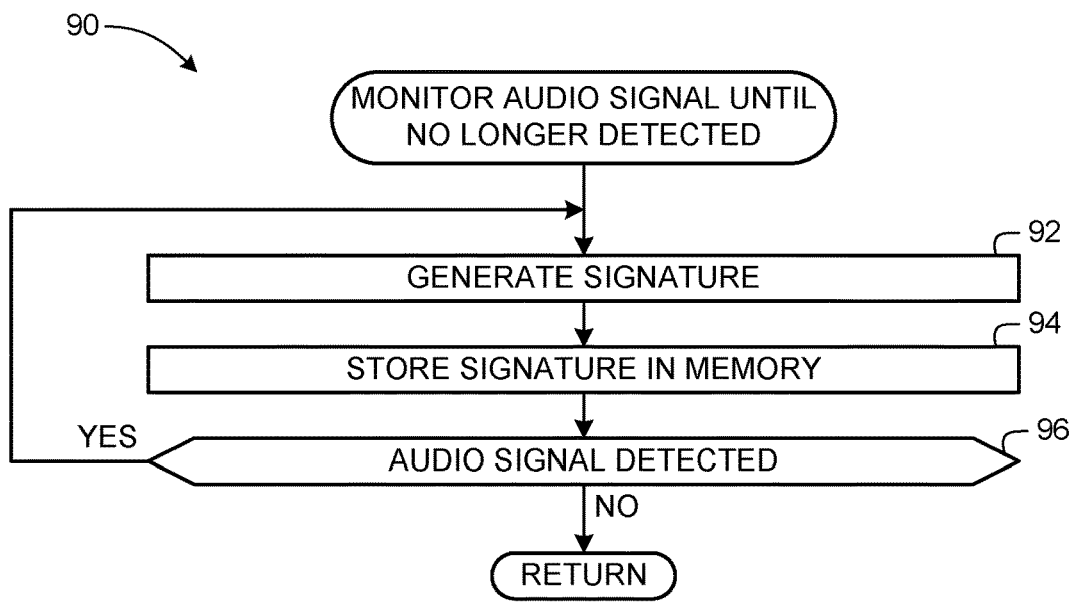
FIG. 8 is a flow chart representative of example machine readable instructions that may be executed by the example portable media player meter of FIGS. 1 and/or 3 to generate audio signatures.

Monitoring the audio signals (see block 84 of FIG. 7) may entail any number of operations including, for example, the operations 90 shown in FIG. 8. Specifically, the audio signature processor 66 uses the detected audio signals (see block 82 of FIG. 7) to generate audio signatures (block 92), store the audio signatures in memory (e.g., the memory 68 of FIG. 5) (block 94) and then determine whether audio signals are still present at the LINEOUT$_{RIGHT}$ and LINEOUT$_{LEFT}$ signal lines 75a and 75b (block 96). If the audio signals are still present, then control returns to block 92 to generate a signature. If, instead, the audio signals are no longer present, then the audio signature processor 66 returns control to a calling function, operation, or process such as the process 80 of FIG. 7.

Figure 9:
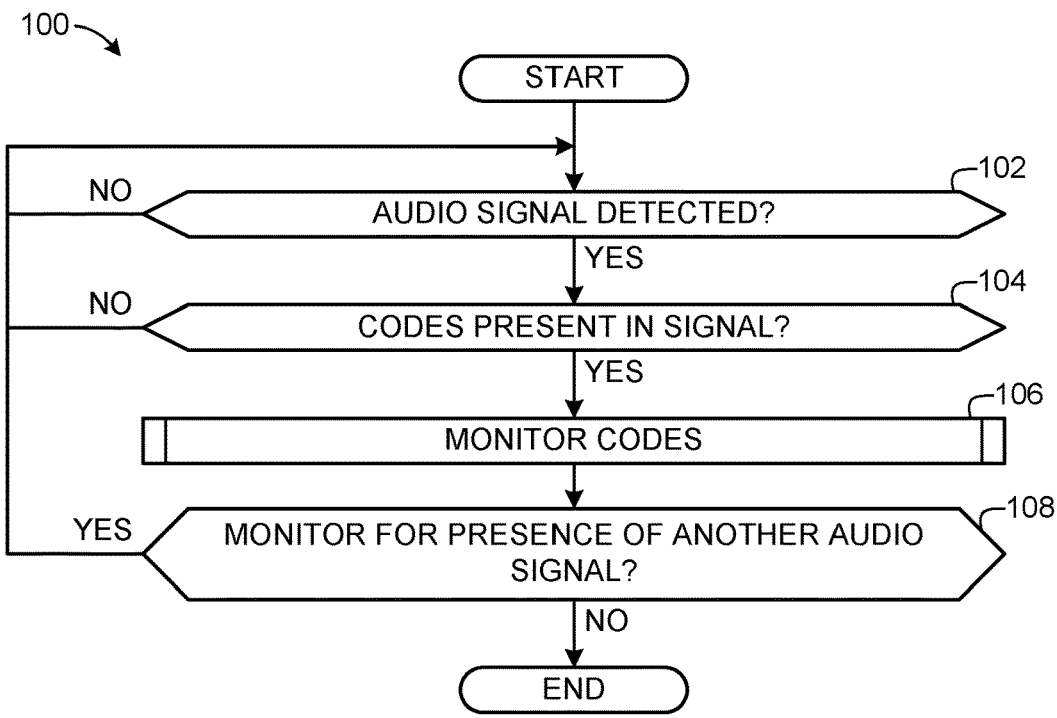
FIG. 9 is a flow chart representative of example machine readable instructions that may be executed by the example portable media player meter of FIGS. 1 and/or 3 to control when to perform audio code detection in audio signals.

Referring now to FIG. 9, the processor 66, when configured to operate as an audio code detector, may be configured to monitor the LINEOUT$_{RIGHT}$ and LINEOUT$_{LEFT}$ signal lines 75a and 75b supplied by the media player 26 via the media player communication port 42 to determine whether audio signals are present (block 102). If no such signals are present, then the audio code detector 66 returns to monitoring the LINEOUT$_{RIGHT}$ and LINEOUT$_{LEFT}$ signal lines 75a and 75b until a signal is detected. If such signals are detected, then the audio code detector 66 begins analyzing the audio signals to determine whether codes are present in the detected signals (block 104). If codes are not detected, then the audio code detector 66 returns to monitoring the LINEOUT$_{RIGHT}$ and LINEOUT$_{LEFT}$ signal lines 75a and 75b (block 102). If codes are detected, then the audio code detector 66 monitors the codes (e.g., performs a code detection technique)(block 106) as, for example, described below in connection with FIG. 10. After the audio code detector 66 monitors the codes (block 106), the audio code detector 66 determines whether it should monitor for the presence of another audio signal (block 108). If the audio code detector 66 determines that it should monitor for the presence of another audio signal, then the audio code detector 66 returns control to the operation of block 102 and monitors for the presence of another audio signal. Otherwise, if the audio code detector 66 determines that it should not monitor for the presence of another audio signal, then the process 100 of FIG. 9 is ended.

Figure 10:
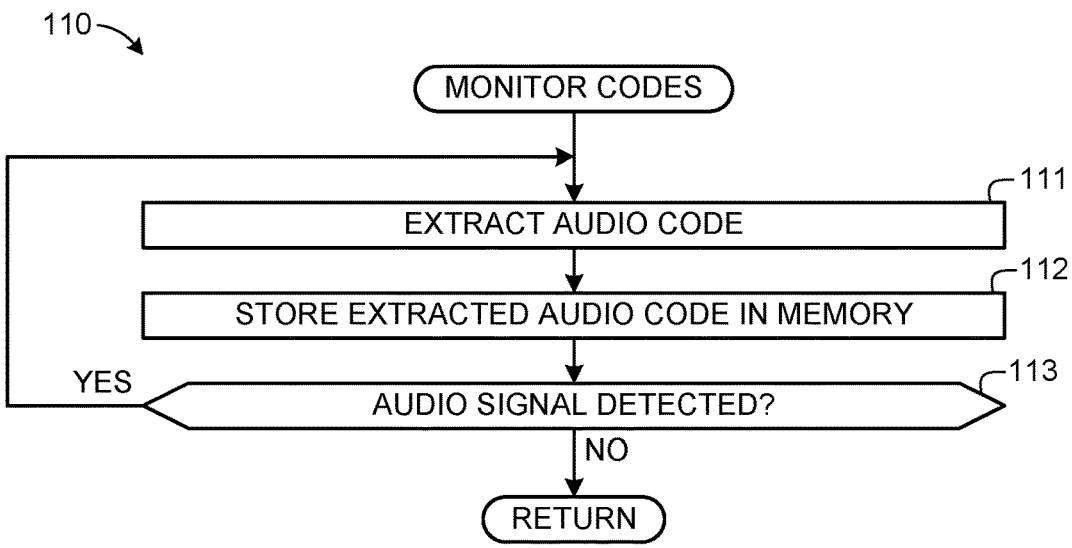
FIG. 10 is a flow chart representative of example machine readable instructions that may be executed by the example portable media player meter of FIGS. 1 and/or 3 to detect/extract audio codes from audio signals.

Performing an audio code detection technique to implement the operation of block 106 (see FIG. 9) may entail any number of operations including, for instance, the example operation 110 shown in FIG. 10. Specifically, the audio code detector 66 extracts codes from the audio signals (block 111) and then stores the extracted codes in the memory 68 (see FIG. 5) (block 114). If desired, the audio code detector 66 may be configured to store additional information with the extracted codes, including, for example, timestamp information. After storing the codes in the memory 68 (block 112), the audio code detector 66 again monitors the LINEOUT$_{RIGHT}$ and LINEOUT$_{LEFT}$ signal lines 75a and 75b to determine whether there is still an audio signal present (block 113). If so, then the audio code detector 66 continues to extract and store audio codes (block 111 and 112). If audio is no longer present (block 113), then the audio code detector 66 returns control to a calling function, operation, or process such as, for example, the process 100 of FIG. 9.

Figure 11:
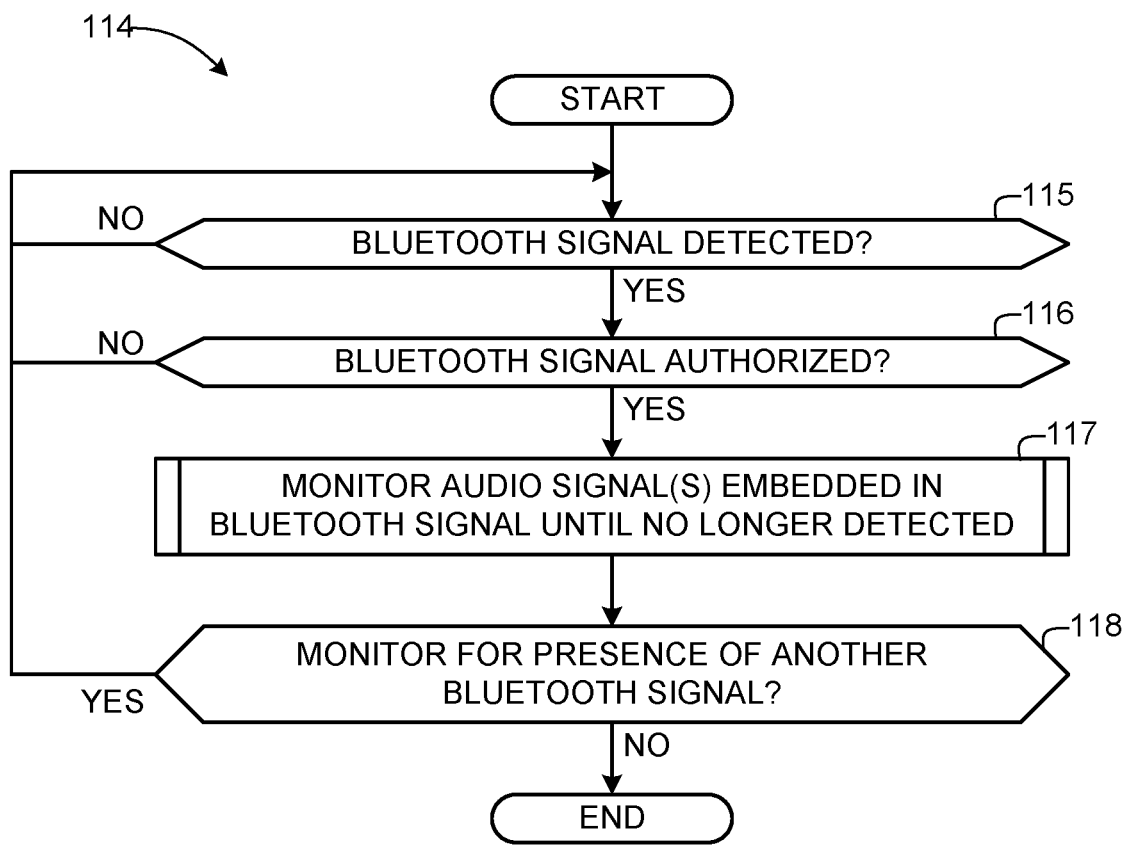
FIG. 11 is a flow chart representative of example machine readable instructions that may be executed by the example portable media player meter of FIGS. 1, 3 and/or 5 to monitor wireless (e.g., Bluetooth®) signals.

Referring now to FIG. 11, the processor 66, when configured to operate as a Bluetooth® enabled device, such as a portable meter 32 embedded within a consumer's headphones/earphones, or as a Bluetooth® enabled SFF portable meter 32 that is carried by the consumer on a belt-clip, pocket, or other location, may be configured to execute instructions 114 that begins with monitoring for a Bluetooth® signal (block 115). If no such signals are present, then the processor 66 returns to monitoring for a Bluetooth® signal via the wireless transceiver 70 until a signal is detected. If such signals are detected, then the processor 66 and/or wireless transceiver 70 determines if the detected signal is an authorized device with which the portable meter 32 may operate (block 116). As discussed above, many Bluetooth® enabled devices may come within range of the consumer's Bluetooth® enabled wireless headphones/earphones that are not associated with the consumer. Accordingly, the Bluetooth® protocol enables a consumer to allow only authorized devices to participate, thereby protecting the consumer's privacy. If the detected Bluetooth® signal is not authorized, then the processor 66 returns to monitoring for other authorized Bluetooth® signals via the wireless transceiver 70. On the other hand, if the detected Bluetooth® signal is from an authorized device on the consumer's piconet, then the processor 66 begins monitoring the audio signals that may be embedded within the Bluetooth® signal until such signal is no longer detected (block 117). Persons of ordinary skill in the art will appreciate that while audio signals embedded within the Bluetooth® signal are detected, any or all of the processes of FIGS. 7-10 may proceed. After the processor 66 determines that the Bluetooth® signal is no longer detected, the processor 66 determines whether it should monitor for the presence of another Bluetooth® signal (block 118). If the processor 66 determines that it should monitor for the presence of another Bluetooth® signal, then the processor 66 returns control to block 115 and monitors for the presence of another Bluetooth® signal. Otherwise, if the processor 66 determines that it should not monitor for the presence of another audio signal, then the process 114 of FIG. 11 is ended.

Figure 12:
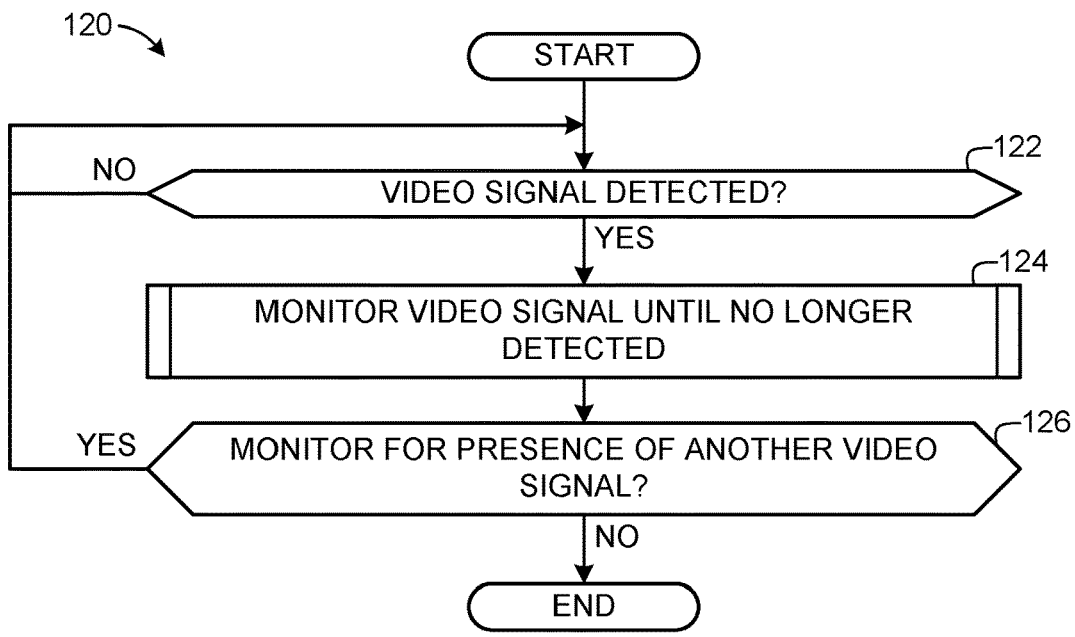
FIG. 12 is a flow chart representative of example machine readable instructions that may be executed by the example portable media player meter of FIGS. 1 and/or 3 to monitor video signals.

Referring now to FIG. 12, the processor 66 (see FIG. 5), when configured to operate as a video signal generator 66, may be configured to execute instructions 120 to detect video presentation information and generate video signatures. To this end, the processor 66 initially monitors the VIDEO$_{OUT}$ signal line 74 (see FIGS. 5 and 6) supplied by the media player 26 via media player communication port 42 to determine whether video signals are present (block 122). If no such signals are present, then the video signature generator 66 returns to monitoring the VIDEO$_{OUT}$ signal line 74 until a signal is detected. If such signals are detected, then the video signature generator 66 begins monitoring the video signal until the signal is no longer present at the VIDEO$_{OUT}$ signal line 74 (block 124) as described below in connection with FIG. 13. After the video signature generator 66 is finished monitoring the video signals, the video signature generator 66 determines whether it should continue to monitor for the presence of another video signal (block 126). If the video signature generator 66 determines that it should continue monitoring for the presence of another video signal, then control is returned to block 122. Otherwise, the process 120 is ended.

Figure 13:
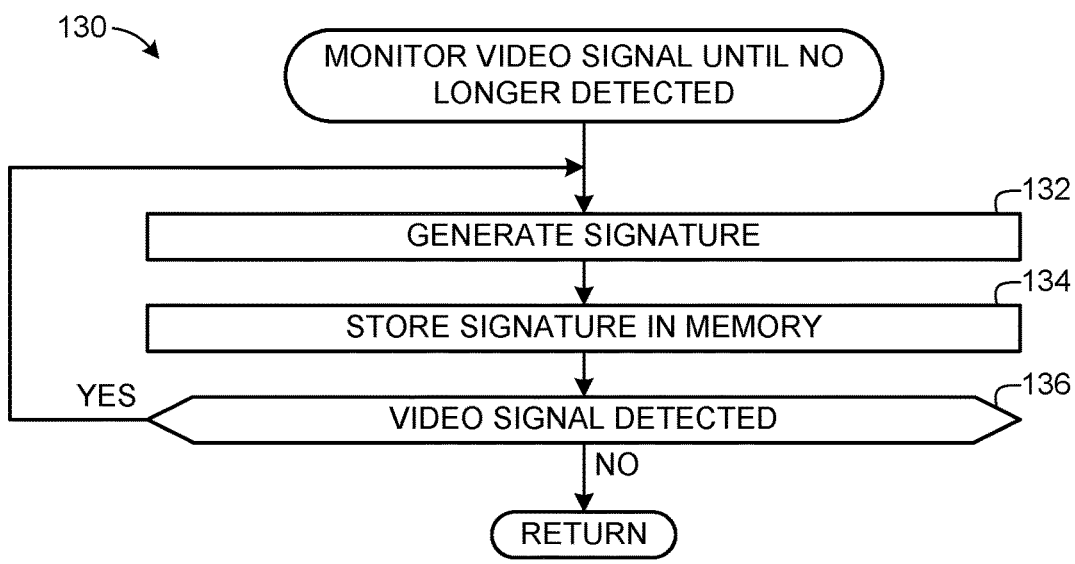
FIG. 13 is a flow chart representative of example machine readable instructions that may be executed by the example portable media player meter of FIGS. 1 and/or 3 to generate video signatures.

Performing the video signal monitoring (block 124 of FIG. 12) may entail any number of operations including, for instance, the example operations 130 shown in FIG. 13. Specifically, the video signature generator 66 uses the detected video signals to generate video signatures (block 132), store the video signatures in the memory 68 (see FIG. 5) (block 134) and then determine whether video signals are still present at the VIDEO$_{OUT}$ signal line 74 (block 136). If the video signals are still present, then control is returned to block 132 and the video signature generator 66 continues to generating the signatures (block 132) and storing the signatures in memory (block 134). If, instead, the video signals are no longer present at the VIDEO$_{OUT}$ signal line 74, then the video signature processor 66 returns control to a calling function, operation, or process such as, for example, the process 120 of FIG. 13.

Figure 14:
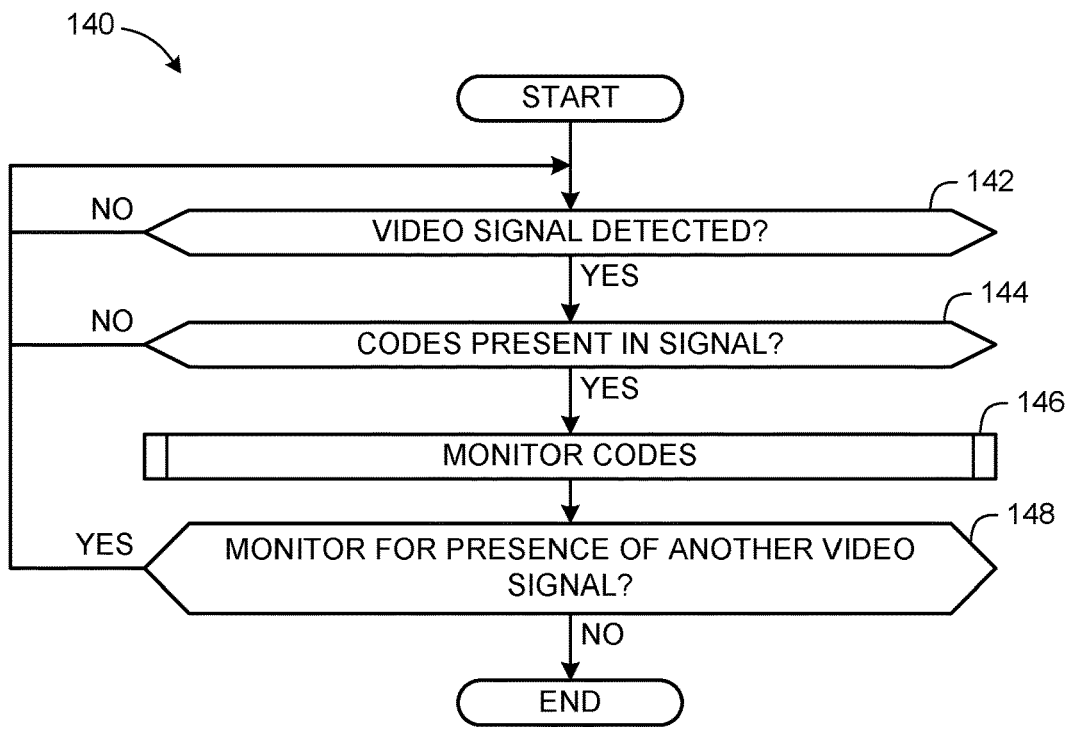
FIG. 14 is a flow chart representative of example machine readable instructions that may be executed by the example portable media player meter of FIGS. 1 and/or 3 to control when to perform video code detection.

Referring now to FIG. 14, the processor 66, when configured to operate as a video code detector 66, may be configured to execute instructions 140 to detect video presentation information and collect ancillary video codes. Initially, the video code detector 66 monitors the VIDEO$_{OUT}$ signal line 74 supplied by the media player 26 via the media player communication port 42 to determine whether video signals are present (block 142). If no such signals are present, then the video code detector 66 returns to monitoring the VIDEO$_{OUT}$ signal line 74 until a video signal is detected. Otherwise, if the video code detector 66 determines that video signals are present at the VIDEO$_{OUT}$ signal line 74, then the video code detector 66 begins analyzing the video signals to determine whether codes are present in the detected video signals (block 144). If codes are not detected, then the video code detector 66 returns to monitoring the VIDEO$_{OUT}$ signal line 74 (block 142). If video codes are detected (block 144), then the video code detector 66 performs a code detection technique (block 146) as described below in connection with FIG. 15.

After the video signature generator 66 is finished monitoring the video codes (block 146), the video signature generator 66 determines whether it should continue to monitor for the presence of another video signal (block 148). If the video signature generator 66 determines that it should continue monitoring for the presence of another video signal, then control is returned to block 142. Otherwise, the process 140 is ended.

Figure 15:
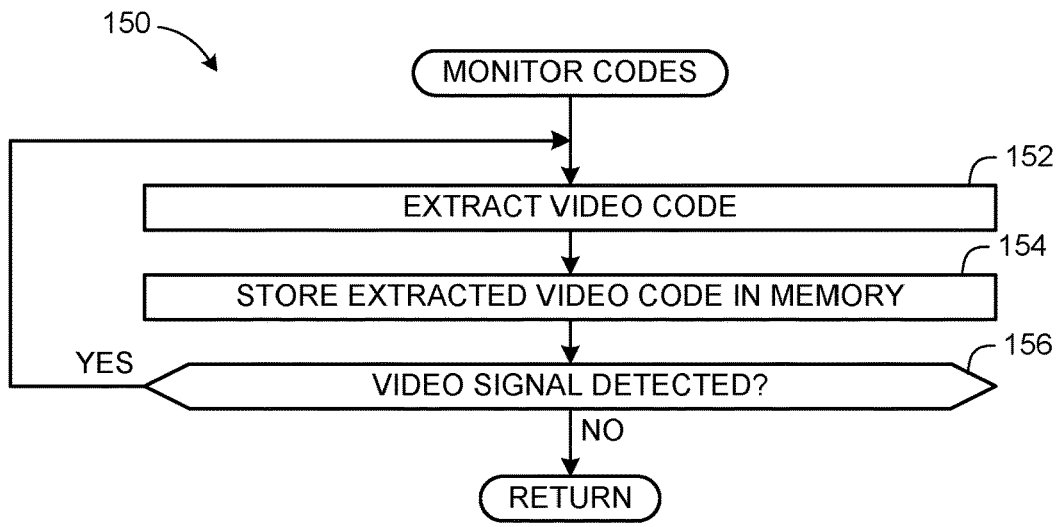
FIG. 15 is a flow chart representative of example machine readable instructions that may be executed by the example portable media player meter of FIGS. 1 and/or 3 to detect/extract video codes from video signals.

Performing the video code detection technique (block 146 of FIG. 14) may entail any number of operations including, for instance, the example operations 150 shown in FIG. 15. Specifically, the video code detector 66 extracts codes from the video signals (block 152) and then stores the extracted codes in the memory 68 (block 154). If desired, the video code detector 66 may be configured to store additional information with the extracted codes, including, for example, timestamp information. After storing the codes in memory (block 154), the video code detector 66 again monitors the VIDEO$_{OUT}$ line 74 to determine whether there is still a video signal present (block 156). If so, then the video code detector 66 continues to extract and store audio codes (blocks 152 and 154). If video signals are no longer present (block 156), then the video code detector 66 returns control to a calling function, operation, or process such as, for example, the example process 140 of FIG. 14.

Figure 16:
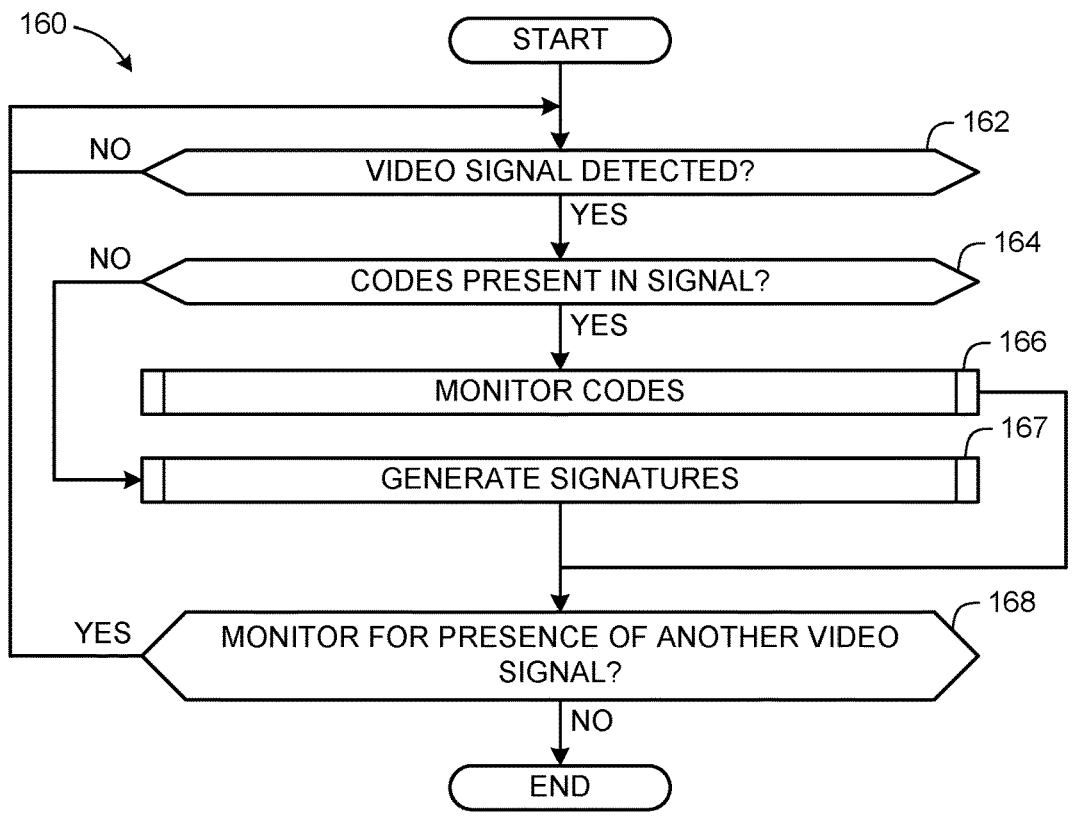
FIG. 16 is a flow chart representative of example machine readable instructions that may be executed by the example portable media player meter of FIGS. 1 and/or 3 to perform video code detection and/or video signature generation.

In an alternative example, the processor 66 of the portable meter 32 may be implemented as several signal processors including, for example, a video code detector and a video signature generator to monitor ancillary video codes and/or generate video signatures by executing, for instance, the example instructions 160 depicted in FIG. 16. In such an example, the processor 66 monitors the VIDEO$_{OUT}$ line 74 of the media player communication port 42 to determine whether a video signal is present (block 162). If a video signal is detected, then the processor 66 causes the video code detector to determine whether codes are present in the detected signal (block 164). If video codes are present (block 164), then the processor 66 causes the video code detector to monitor the codes (block 166) using, for example, the code detection technique described above in connection with the instructions 150 represented by FIG. 15. If video codes are not present (block 164), then the processor 66 causes the video signature generator to generate signatures for the detected video signal (block 167). The instructions for generating signatures (block 167) may be implemented using the instructions 130 described above in connection with FIG. 13.

After the video code detector collects any present video code(s) (block 166) or after the video signature generator generates signatures (block 167), the processor 66 determines whether it should monitor for the presence of another video signal (block 168). If the processor 66 determines that it should monitor for the presence of another video signal (block 168) then control is passed back to block 162. Otherwise, the process 160 is ended.

Figure 17:
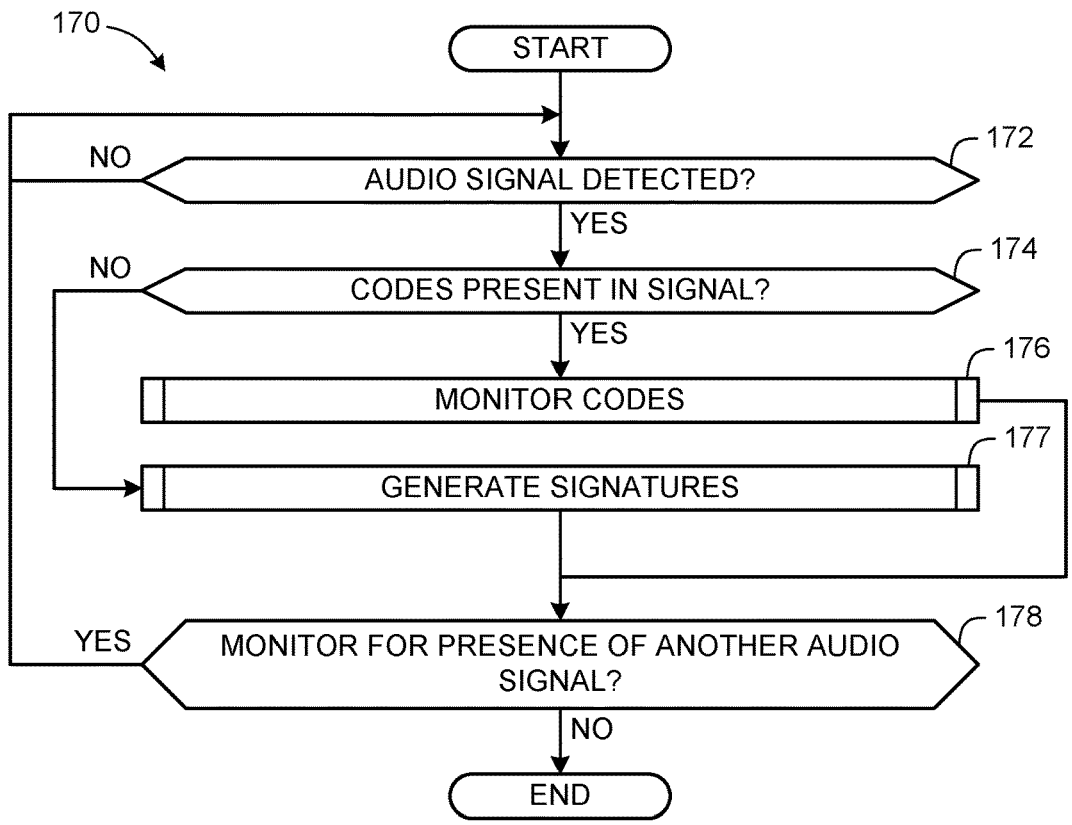
FIG. 17 is a flow chart representative of example machine readable instructions that may be executed by the example portable media player meter of FIGS. 1 and/or 3 to perform audio code detection and/or audio signature generation.

In yet another alternative example, the processor 66 of the portable meter 32 may be implemented as several signal processors including, for example, an audio code detector and an audio signature generator to monitor ancillary audio codes and/or generate audio signatures by, for instance, executing the example instructions 170 depicted in FIG. 17. Initially, the processor 66 monitors the LINEOUT$_{RIGHT}$ and LINEOUT$_{LEFT}$ audio lines 75a and 75b supplied by the media player communication port 42 of the media player 26 to determine whether an audio signal is present (block 172). If an audio signal is not present (block 172), then the processor 66 again monitors the LINEOUT$_{RIGHT}$ and LINEOUT$_{LEFT}$ audio lines 75a and 75b to determine whether an audio signal is present (block 172). Otherwise, if an audio signal is detected (block 172), then the processor 66 causes the audio code detector to determine whether codes are present in the detected signal (block 174). If audio codes are present (block 174), then the processor 66 causes the video code detector to monitor audio codes (block 176) using for example the code detection technique described above in connection with the method 110 (see FIG. 10). If audio codes are not present (block 174), then the processor 66 causes the audio signature generator to generate signatures for the detected video signal (block 177). The instructions for generating signatures (block 177) may be implemented by the instructions 90 described above in connection with FIG. 8.

After the audio code detector monitors audio codes (block 176) or after the audio signature generator generates signatures (block 177), the processor 66 determines whether it should monitor for the presence of another audio signal (block 178). If the processor 66 determines that it should monitor for the presence of another audio signal (block 178) then control is passed back to block 172. Otherwise, the process 170 is ended.

Figure 18:
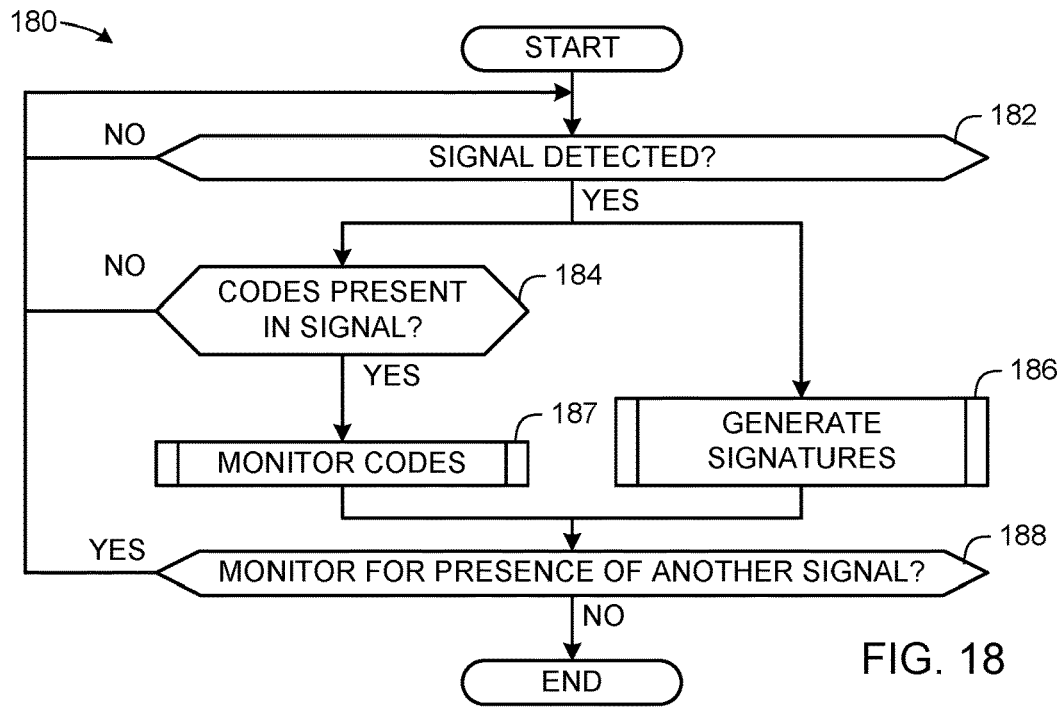
FIG. 18 is a flow chart representative of example machine readable instructions that may be executed by the example portable media player meter of FIGS. 1 and/or 3 to perform audio and/or video code detection and/or signature generation.

In a still further example, the processor 66 of the portable meter 32 may be implemented as several signal processors including, for example, an audio code detector, a video code detector, an audio signature generator and/or a video signature generator to monitor ancillary video and/or audio codes and/or to generate video and/or audio signatures by executing, for instance, the instructions 180 depicted in FIG. 18. In such an example, the processor 66 monitors the LINEOUT$_{RIGHT}$ and LINEOUT$_{LEFT}$ signal lines 75a and 75b in addition to the VIDEO$_{OUT}$ signal line 74 supplied by the media player communication port 42 of the media player 26 to determine whether an audio signal is present and/or a video signal is present at the respective lines 74, 75a, and 75b (block 182). If an audio signal is detected, then the processor 66 causes the audio signature generator to perform signature generation (block 186) until the audio signal is no longer present at the LINEOUT$_{RIGHT}$ and LINEOUT$_{LEFT}$ signal lines 75a and 75b using, for example, the example signature generation technique described above in connection with FIG. 8. In addition, the processor 66 causes the audio code detector to determine whether any audio codes are present in the signals (block 184). If the processor 66 determines that codes are not present in the audio signals (block 184) or that no audio signals are present at the LINEOUT$_{RIGHT}$ and LINEOUT$_{LEFT}$ signal lines 75a and 75b (block 182), then the processor 66 continues monitoring the LINEOUT$_{RIGHT}$ and LINEOUT$_{LEFT}$ signal lines 75a and 75b to determine whether an audio signal is present (block 182).

If the processor 66 determines that audio codes are present (block 184), then audio code detector performs code detection techniques (block 187) using, for example, the example code detection technique described above in connection with FIG. 10. In this manner, the processor 66 can perform both audio signature generation and audio code detection in parallel or at substantially the same time.

Likewise, if at the block 182, a video signal is detected, then the processor 66 causes the video signature generator to perform signature generation (block 186) until the video signal is no longer present at the VIDEO$_{OUT}$ signal line 74 using, for example, the example signature generation technique described above in connection with FIG. 13. In addition, the processor 66 causes the video code detector to determine whether any video codes are present in the signals (block 184). If the processor 66 determines that codes are not present in the video signals (block 184) or that no video signals are present at the VIDEO$_{OUT}$ signal line 74 (block 182), then the processor 66 continues monitoring the VIDEO$_{OUT}$ signal line 74 to determine whether a video signal is present (block 182).

If the processor 66 determines that video codes are present, then the video code detector performs code detection techniques (block 187) using, for example, the example code detection technique described above in connection with FIG. 15. In this manner, the processor 66 can perform both video signature generation and video code detection in parallel or at substantially the same time.

After the audio code detector finishes detecting audio codes or the video code detector finishes detecting video codes (block 187) and the audio signature generator finishes generating audio signatures or the video signature generator finishes generating video signatures (block 186), the processor 66 determines whether it should continue to monitor for the presence of another audio or video signal (block 188). If the processor 66 determines that it should monitor for the presence of another signal, then control is passed back to block 182. Otherwise, the process 180 is ended.

Figure 19:
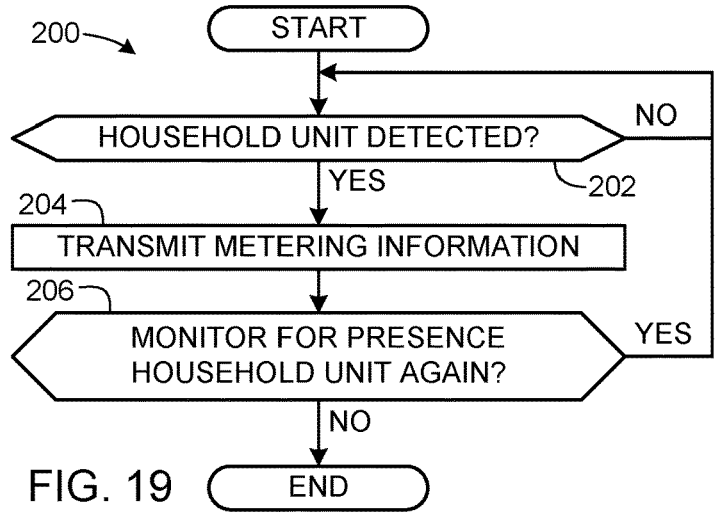
FIG. 19 is a flow chart representative of example machine readable instructions that may be executed by the example portable media player meter of FIGS. 1 and/or 3 to communicate with the example personal computer of FIG. 1.

Referring now to FIG. 19, the portable meter 32 may execute instructions 200 to use the wireless transceiver 70 (see FIG. 5) to enable wireless communication with the household unit 30. Initially, the processor 66 of the portable meter 32 determines whether it has detected the home unit 31 (block 202). For example, the home unit 31 may transmit a beacon signal detectable by the portable meter 32 via the wireless transceiver 70 when the portable meter 32 within sufficient proximity to the home unit 31. If the processor detects the signal (block 202), then the processor 66 responds by transmitting metering information (block 204) via the wireless transceiver 70. The metering information may include, for example, a plurality of signatures, a plurality of codes, a plurality of metadata, and/or any combination thereof.

After the processor 66 transmits the metering information (block 204), the processor 66 determines whether it should monitor for the presence of the home unit 31 again (block 196). For example, if the memory 68 (see FIG. 5) does not contain any other metering information to be transmitted to the home unit 31, the processor 66 may determine that it should not monitor for the presence of the home unit 31 again. Alternatively or additionally, the processor 66 may be adapted to communicate with the home unit 31 only after predetermined time intervals based on, for example, the expiration of a timer, in which case the processor 66 may determine not to monitor the home unit 31 again if the timer has not expired. In any case, if the processor 66 determines that it should monitor for the presence of the home unit 31 again, control is passed back to block 192. Otherwise, the process 190 is ended.

Figure 20:
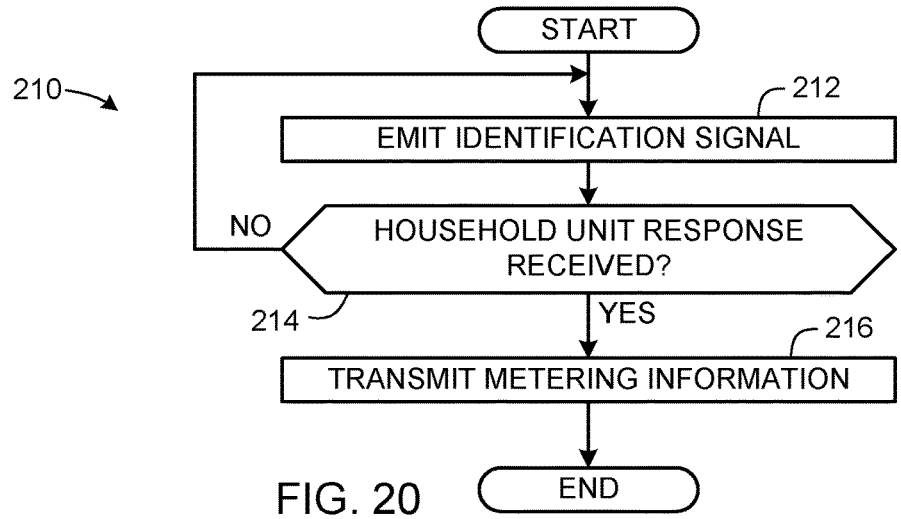
FIG. 20 is a flow chart representative of example machine readable instructions that may be executed by the example portable media player meter of FIGS. 1 and/or 3 to communicate with the example personal computer

Referring now to FIG. 20, in another example, the portable meter 32 may execute instructions 210 to communicate with the home unit 31. Initially, the wireless transceiver 70 of the portable meter 32 emits an identification signal (block 212). The processor 66 then determines whether it received a response from the home unit 31 (block 214). For example, if the portable meter 32 is within sufficient proximity of the home unit 31 to enable communicating therewith, then the home unit 31 receives and responds to the identification signal with a message or information prompting the processor 66 to transmit metering information. If the processor 66 determines that it did not receive the response message from the home unit 31 (block 214) (e.g., the portable meter 32 is not within sufficient proximity to the home unit 31, or if the home unit 31 is inoperable), then control is returned to block 212. Otherwise, if the processor 66 determines that it did receive the response from the home unit 31, then the processor 66 responds to the message by transmitting the metering information (block 216) (which may include a plurality of signatures, a plurality of codes, a plurality of metadata, or any combination thereof). After the processor 66 finishes transmitting the metering information (block 216) the process 210 is ended. As will be understood by one having ordinary skill in the art, the portable meter 32 may be adapted to insert a delay between emission of identification signals in an effort to conserve battery power.

As described above, the metering information received by the home unit 31 is immediately or later transmitted to the media measurement entity 18 (see FIG. 1).

Figure 21:
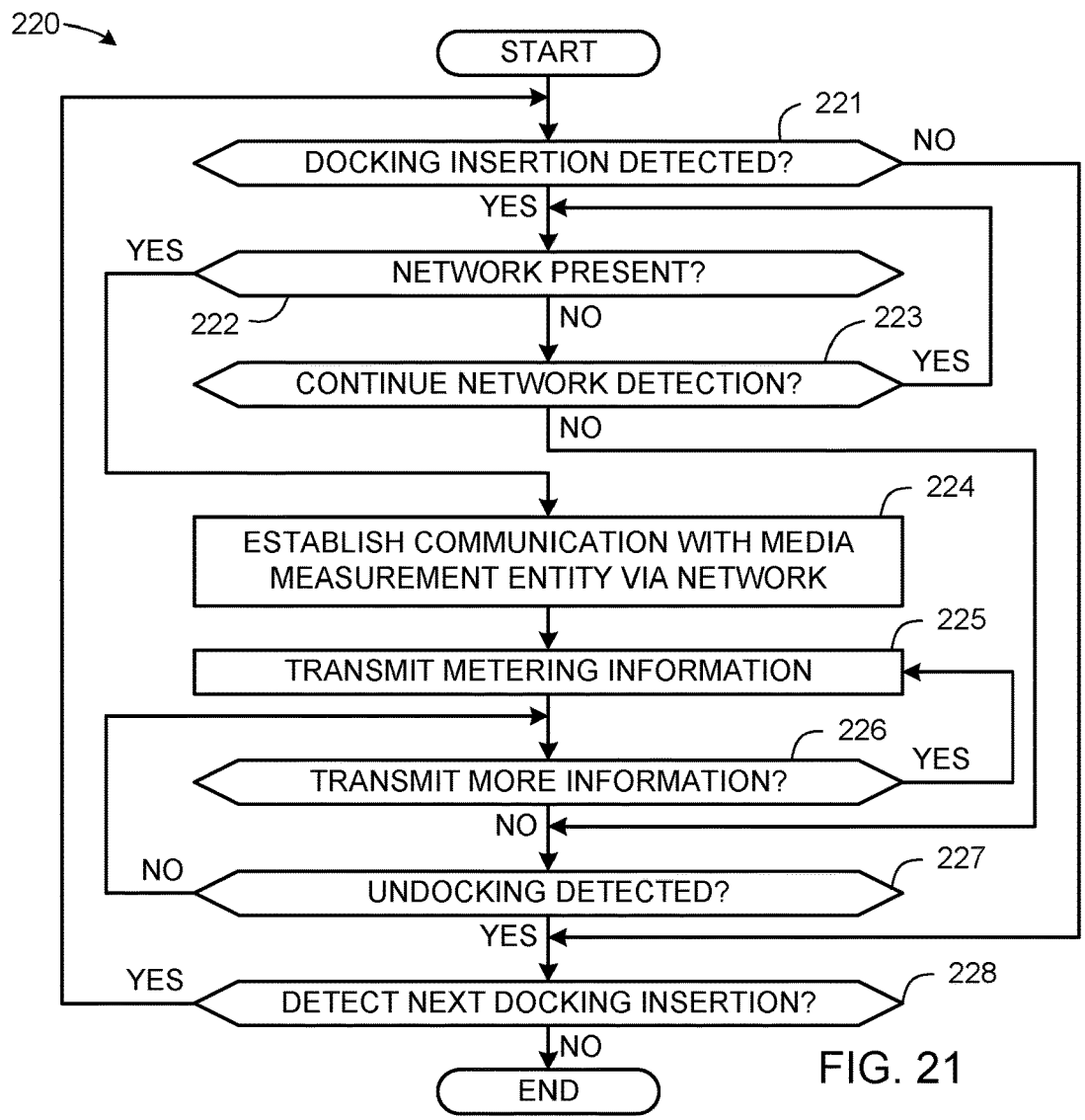
FIG. 21 is a flow chart representative of example machine readable instructions that may be executed by the example portable media player meter of FIGS. 1 and/or 3 to communicate with the example personal computer.

Referring to FIG. 21, example instructions 220 may be executed to communicate information between the portable meter 32 and the media measurement entity 18 (see FIG. 1) using the docking/recharging device 28 (see FIG. 2B). Specifically, the docking device 28 includes communication equipment (not shown) to enable communication between the media player 26 (when in a docked position relative to the docking device 28) and a network 34 (see FIG. 1). The media player 26 may receive/download media content and/or communicate information via the docking/recharging device 28. In the illustrated example, the portable meter 32 is adapted to communicate metering information to the media measurement entity 18 via the docking device 28 by executing the example instructions 220.

Initially, the docking device 28 determines whether the media player 26 (coupled to the portable meter 32) has been inserted into the docking device 28 (block 221). If the docking device 28 determines that the media player 26 is inserted (block 221), then the portable meter 32 or the communication equipment disposed in the docking device 28 determines whether the docking device 28 has network access (block 222) (e.g., determine whether the docking device 28 is coupled to the network 34 or is coupled to the personal computer 29 that is coupled to the network 34). If the network is not detected at the block 222, then the docking device 28 determines whether it should continue to monitor for the presence of the network 34 (block 223). For example, the docking device 28 or the portable meter 32 may determine that it should continue monitoring for the presence of the network 34 if the media player 26 has not been removed. If the docking device 28 or the portable meter 32 determines that it should continue to monitor for the presence of the network 34 then control is passed back to block 222.

If the network 34 is detected (block 222), then the portable meter 32 establishes communication with the media measurement entity 18 using the communication equipment disposed in the docking device 28 (block 224). As will be appreciated by one having ordinary skill in the art, various communication synchronization functions will occur when communication is established between the media player 26 and the personal computer 29 via the docking station 28. Such communication synchronization functions are known in the art and are, therefore, not discussed further herein. After the synchronization processes occur, the media player 26 communicates with the personal computer 29 to download content. After any such communications between the media player 26 and the personal computer 29 are completed, the portable meter 32 begins to communicate with the personal computer 29 to download to the personal computer 29 any media information collected by the portable meter 32 (block 225).

After the media information has been transmitted (block 225), the media player 26 determines whether it should transmit more metering information (block 226). For example, after transmitting the media metering information (block 225) the portable meter 32 may be configured to forego subsequent communication with the media measurement entity 18 via the processor 29 until a predetermined amount of time has elapsed or until a predetermined amount of new metering information has been collected or until any other desired event has occurred. In such an example, the wireless transceiver 70 (see FIG. 5) may be implemented as a wired transceiver. If the media player 26 determines that it should transmit more metering information (block 226), control is passed back to block 225.

If the media player 26 determines that it should not transmit more metering information (block 226) or if the docking device 28 or the portable meter 32 determines that it should not continue to monitor for the presence of the network 34, the docking device 28 determines whether it has detected an undocking event (block 227). For example, an undocking event may occur when the media player 26 is physically removed, disengaged, uncoupled, etc. from the docking device 28. If the docking device 28 determines that it has not detected an undocking event (block 227) then control is passed back to block 226.

If the docking device 28 determines that it has detected an undocking event (block 227) or if the docking device 28 did not detect a docking insertion (block 221), then the docking device 28 determines whether it should continue to monitor for a next docking insertion event (block 228). If the docking device 28 determines that it should monitor for another docking insertion event (block 228), then control is passed back to block 221. Otherwise, the process 220 is ended.

Figure 22:
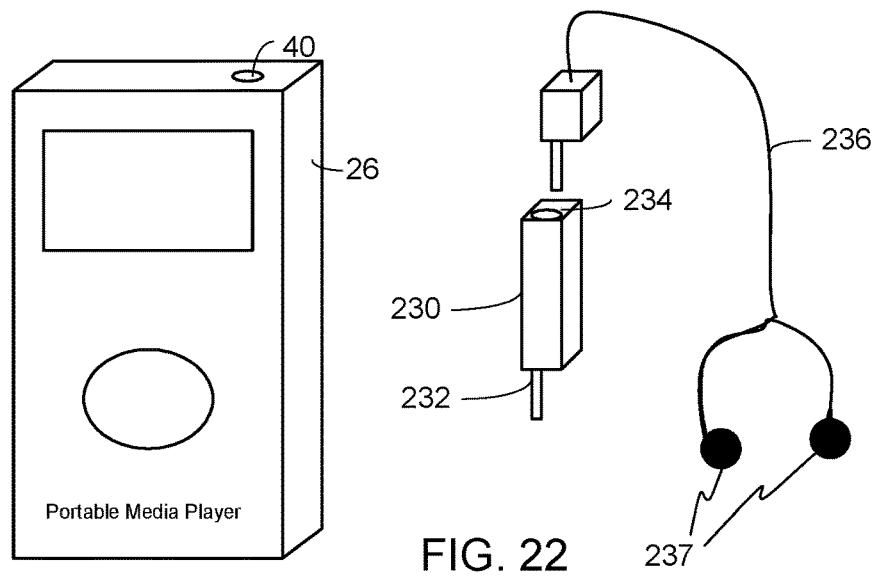
FIG. 22 is a block diagram illustrating the portable media player of FIG. 1 and an example portable media player meter that is configured for insertion between the media player and a set of headphones/earphones.

Referring now to FIG. 22, although the example portable meter 32 shown in FIG. 3 is attachable to the media player communication port 42 of the media player 26, an example portable meter 230 substantially similar to the portable meter 32 (see FIGS. 1 and 5) may instead be configured to attach to the media player 26 via the headphone jack 40. More specifically, the portable meter 230 may be configured to include a headphone/earphone plug 232 suited for insertion into the headphone/earphone jack 40 instead of having the communication ports 52 and 54 shown in FIG. 3. In addition, the portable meter 230 may include a headphone/earphone jack 234 into which the user 16 (see FIG. 1) may insert headphone/earphone set 236 having headphones/earbuds 237 for listening to the media player 26.

Via the headphone/earphone jack 40 and plug 232, the portable meter 230 can access and monitor the $LINEOUT_{LEFT}$ and $LINEOUT_{RIGHT}$ signal lines 75a and 75b for purposes of obtaining and/or generating metering information. The audio signals obtained by inserting the plug 232 into the jack 40 are used by the portable meter 230 to perform any of the audio signature generation and/or audio code detection techniques described above. The $LINEOUT_{LEFT}$ and $LINEOUT_{RIGHT}$ signal lines 75a and 75b are also supplied as an output at the headphone/earphone jack 234 undisturbed by the operation of the portable meter 230 so as to not interfere with the listening enjoyment of the user 16 (see FIG. 1).

The portable meter 230 includes all of the same components described in connection with FIG. 5, except that the portable meter 230 need not include any video processing circuitry capable of performing video signature generation and/or video code detection. In some examples, the portable meter 230 may be large enough to install a battery, (e.g. an AAA alkaline battery). In yet other examples, the portable meter 230 uses the electrical current supplied by the $LINEOUT_{LEFT}$ and $LINEOUT_{RIGHT}$ signal lines 75a and 75b to power its electrical components (e.g., components substantially similar or identical to the meter components 66, 68, and 70 of FIG. 5). In other examples, the portable meter 230 may operate using both battery power and power supplied by the current from the media player 26.

Figure 23:
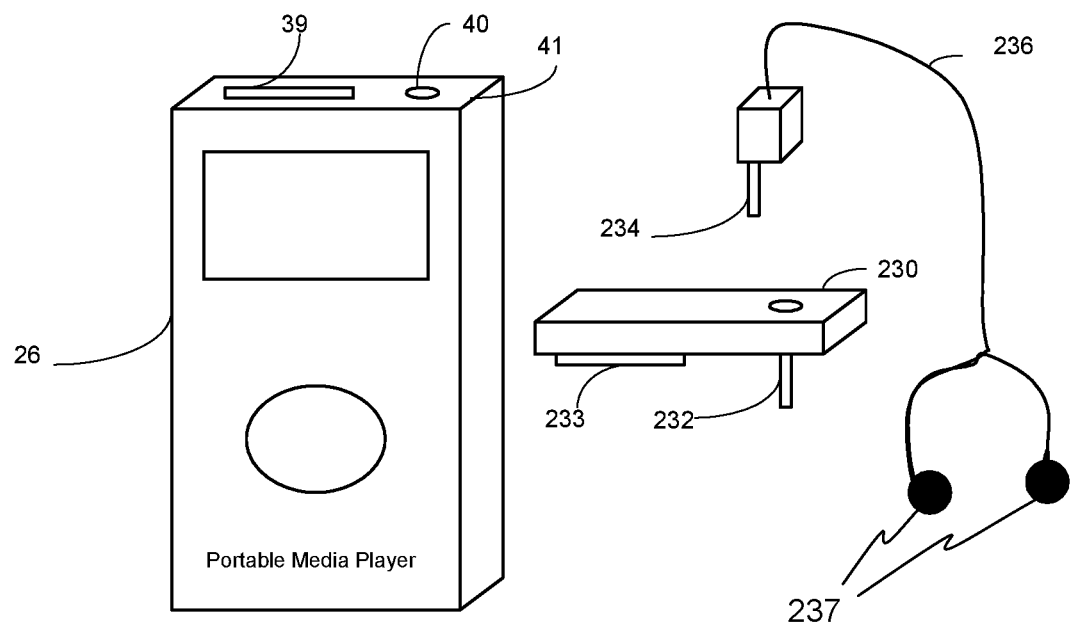
FIG. 23 is a block diagram illustrating the portable media player of FIG. 1 and an example portable media player meter that is configured for insertion between the portable media player and a set of headphones/earphones in a manner such that the length of the meter is parallel to the width of the portable media player.

Referring also to FIG. 23, in yet other examples, the example portable meter 230 may be adapted for insertion into the headphone/earphone plug 40 but be configured for positioning lengthwise along the top of the media player 26 instead of perpendicular to it as is shown in FIG. 22. In the example of FIG. 23, the portable meter 230 may additionally include a portable meter communication port 233 that is adapted for insertion into the media player communication port 39 disposed on the top panel 41 of the media player 26. The portable meter communication port 233 is adapted to monitor signals of interest (e.g., play command, stop command, pause command, next/previous command, media metadata, graphic display information, video signals, audio signals, etc.) that are available at the port 39. For example, any data communication signals may be monitored for the presence of media content information and the portable meter 230 additionally monitors for the presence of any audio signals or video signals. Any audio and/or video signals detected are monitored in the same manner as described for the portable meter 32.

Figure 24:
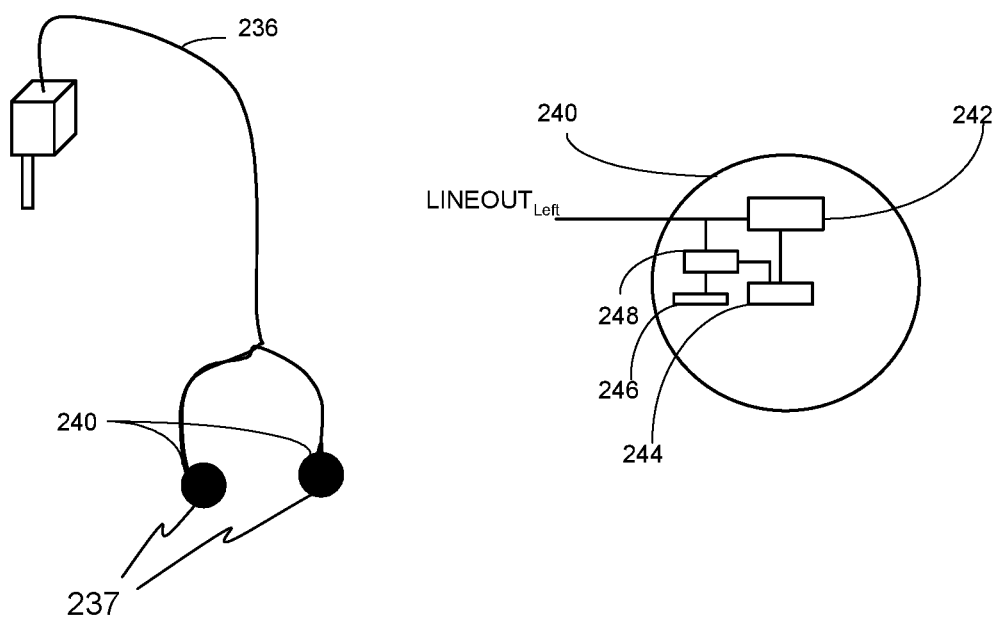
FIG. 24 is a block diagram illustrating a set of example headphones/earphones and an example portable media player meter installed therein.

Referring now to FIG. 24, in yet another example, an example portable meter 240 is disposed in the headphones/earbuds portion 237 of the earphone/headphone set 236. In this example, the earphone/headphone set 236 is configured to include processing equipment installed in the headphones/earbuds portion 237 of the set 236 and designed to improve the quality of the sound for the pleasure of the user 16 (see FIG. 1). The processing equipment includes, for example, a signal processor 242 (e.g., a codec, a digital-to-analog converter, an analog-to-digital converter, etc.) to which the LINEOUT$_{LEFT}$ 75a (or LINEOUT$_{RIGHT}$ 75b) audio signals are supplied. In example implementations in which the media player 26 outputs digital signals via the jack 40, the signal processor 242 can be implemented using a digital-to-analog converter (DAC) that converts the digital audio signals to analog audio signals suitable for output by a speaker 244 installed in each of the headphones/earbuds. In example implementations in which the media player 26 outputs analog signals via the jack 40, the signal processor 242 may be implemented using an analog-to-digital converter (ADC) to generate digital information for use in generating signatures or extracting audio/video codes.

To adapt the headphone/earphone set 236 for inclusion of the portable meter 240, a memory 246 sufficient to store either codes and/or signatures is installed in one or both of the headphones/earbuds. Additionally a processor 248 (e.g., a metering information generator) adapted to generate audio signatures and/or extract audio codes in the same manner as the processor 66 described in connection with FIG. 5 is installed in one or both of the headphones/earbuds and coupled to the memory 246. The processor 248 may be configured to execute machine readable instructions that cause the processor to generate audio signatures and/or extract audio codes. Alternatively, the processor 248 may be implemented using circuitry (e.g., an application specific integrated circuit (ASIC)) configured to generate audio signatures and/or extract audio codes. For example, the processor 248 may be provided with an audio signature generator integrated circuit and/or an audio code extractor circuit. The portable meter 240 configured in this manner, (i.e., for installation in the headphone/earphone buds), is programmed/adapted to operate in the substantially the same manner as the portable meter 32 described above in connection with FIG. 5, except that it need not include any equipment for processing video signals. The portable meter 240 may be powered using the audio signals received via the LINEOUT$_{LEFT}$ 75a (or LINEOUT$_{RIGHT}$ 75b) and includes a battery (not shown) coupled to the processor 248 and memory 246. The battery is used to power the portable meter 240 when the media player 26 is turned off so that the portable meter 240 can still communicate with the personal computer 29. The portable meter 240 additionally includes a wireless transceiver (not shown) for transmitting the media measurement information, e.g., the codes and/or signatures, to a personal computer 29 (see FIG. 1) coupled to the network 34.

Figure 25:
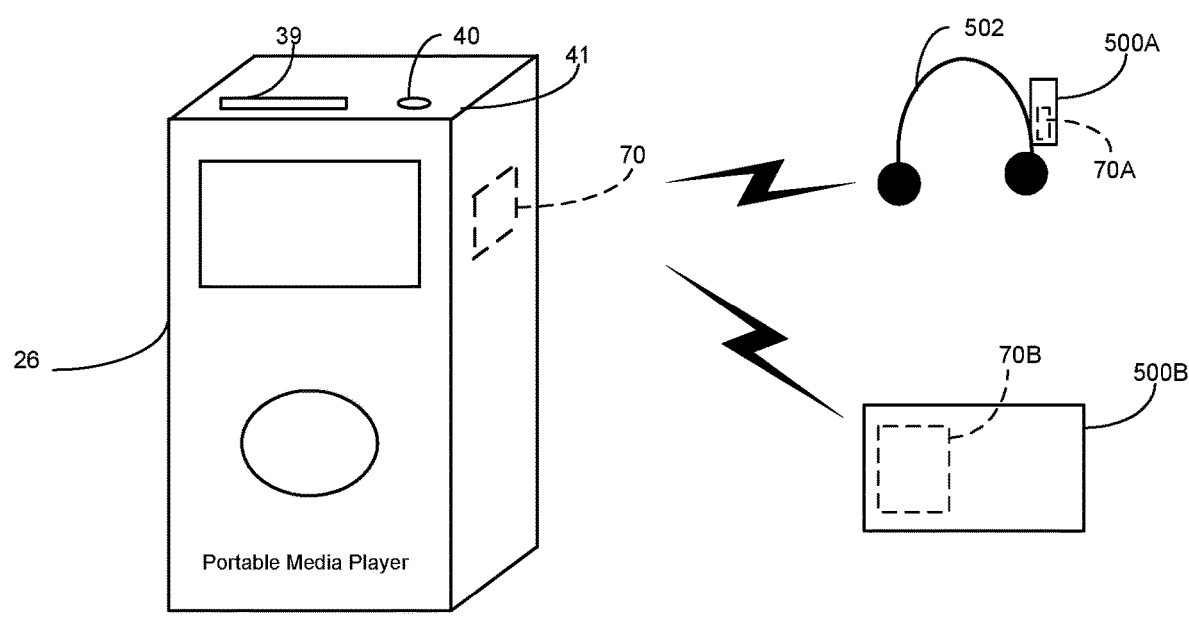
FIG. 25 is a block diagram illustrating a set of headphones/earphones, an example small-form-factor meter, and an example portable media player.

Referring now to FIG. 25, in yet another example, an example portable meter 500A is in or near the earbud/earphone portion of the earphone/headphone set 502. In this example, the portable meter 500A is configured to include a processor 66, a memory 68, a wireless transceiver 70A, a battery 71, a codec 78, and speakers 79 (see FIG. 5). The wireless transceiver 70A of the example earphone/headphone set 502 may be implemented using any suitable wireless protocol and corresponding hardware including, for example, Bluetooth®, which may establish communications with the wireless transceiver 70 of the example media device 26 of FIG. 25. As such, media content transmitted from the media device 26 via the wireless transceiver 70 is received by the portable meter 500A of the earphone/headphone 502 and processed by the codec 78 (see FIG. 5) into an analog signal for the consumer to hear. Additionally, the portable meter 500A of the illustrated example extracts metering data from the transmitted audio signals embedded in the Bluetooth® signal and saves the metering data to memory for later transfer to the media measurement entity 18. In this example, the portable meter 500A has a dual role of audio processing for a consumer's listening pleasure and collecting metering data for the measurement entity.

However, other metering examples may share the responsibility for collecting metering data with an example SFF portable meter 500B, which may also be employed to communicate with the example media device 26 via a wireless transceiver 70B. In such examples, both portable meter 500A and portable meter 500B receive Bluetooth® signals from the media device 26 containing embedded audio signals. However, the portable meter 500A includes a codec 78 to process the audio content to produce analog audio signals to the speakers 79, while the portable meter 500B receives the same Bluetooth® signals for metering purposes. Accordingly, the earphone/headphone 502 of these examples may be simplified, and may employ a smaller memory 68, consume lower amounts of power from the battery 71, and/or require a less powerful processor 66.

Either or both of the portable meter 500A and/or the SFF portable meter 500B of FIG. 25 may include a USB port, a mini-USB port, or similar port to transfer collected media information from the memory 68 to the media measurement entity 18. Alternatively, either meter 500A and/or 500B may employ the wireless transceiver 70A, 70B to transmit metering information, as described in view of FIG. 19. Various collected signatures and/or codes may be transferred to the media measurement entity in any number of ways, including, but not limited to, wirelessly transmitting the collected information to the home unit 31 (see FIG. 1). The home unit 31 may be configured with a wireless transceiver similar to the wireless transceivers 43, 70, 70A, 70B shown in FIGS. 4, 5, and/or 25. The home unit 31 may be a PC with a high speed (e.g., broadband) Internet connection, and/or a custom home unit for dedicated use in the consumer's home. Such high speed network connectivity allow allows real-time transmission of collected metering data from the portable meters 500A and/or 500B.

As will be appreciated by one having ordinary skill in the art, sophisticated headphones having processing power are commercially available and any of the equipment disposed in these commercially available headphones/earphones may be adapted for dual operation as a meter such that the processor 248 and the additional memory 246 need not be added, provided that the existing processor and memory are sufficient to perform the code extraction and signature generation and storage functions of the meter 240. In addition, software instructions needed to modify the operation of the processor 248 for the task of metering must be provided.

Figure 26:
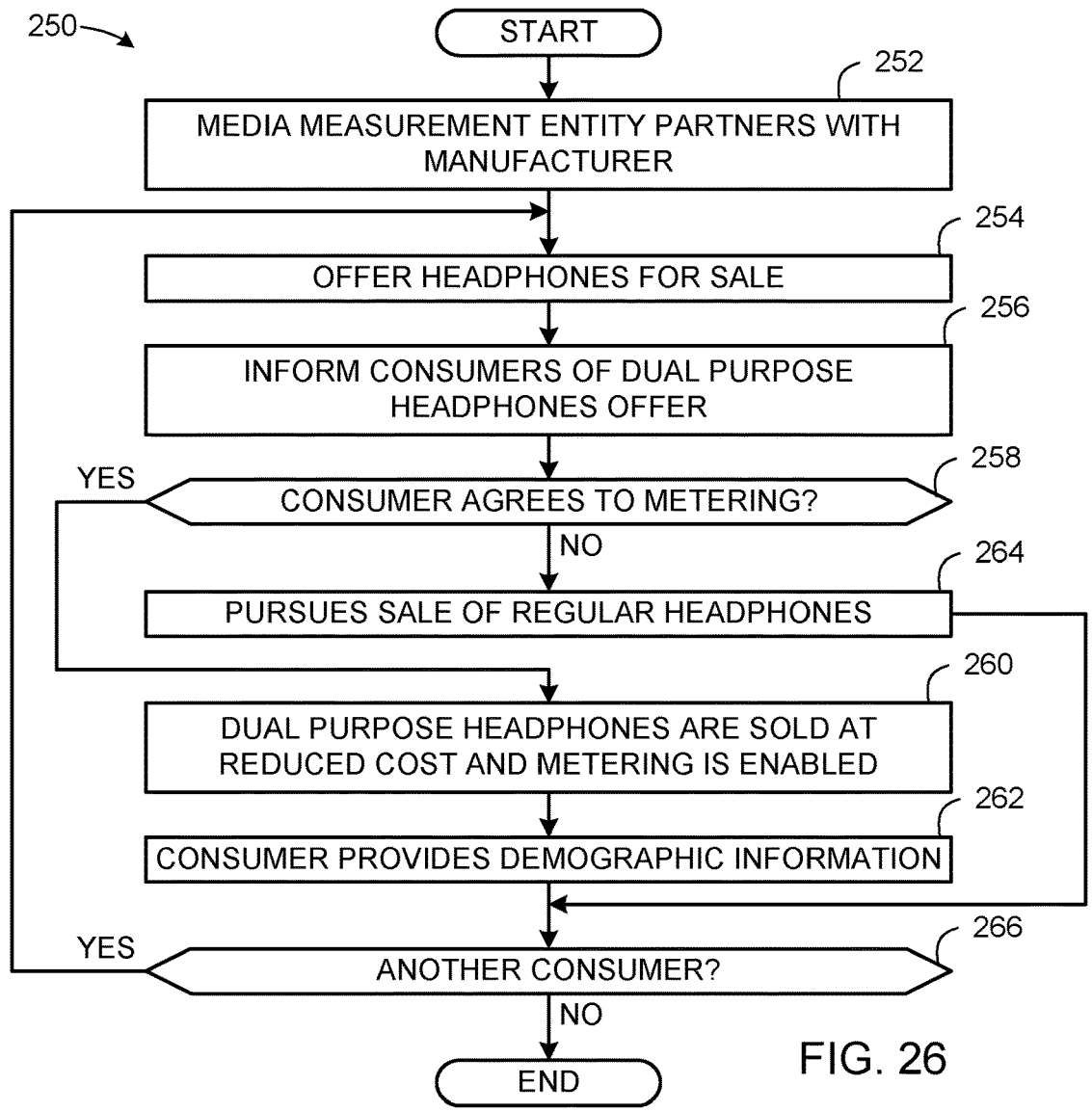
FIG. 26 is a flow chart illustrating a method of distributing portable media player meters to consumers with cooperation from one or more headphone/earphone manufacturers/vendors.

The example method 250 shown in FIG. 26 may be used to supply portable meters (e.g., one or more of the example portable meters 32 of FIGS. 1, 5, and 6; 230 of FIGS. 22 and 23; 240 of FIG. 24; or 500A and 500B of FIG. 25) to users 16 (see FIG. 1) who are willing to have their listening activities monitored. Initially, a media measurement entity 18 (see FIG. 1) partners with a headphone/earphone manufacturer (not shown) to design a dual-purpose metering headphone/headset 236 (see FIGS. 24 and 25) (block 252). In some examples, the dual-purpose metering headphone/headset 236 may be configured to output enhanced sound quality. All or some of the dual-purpose headphones/earphones 236 are offered for sale to consumer(s) 16 (see FIG. 1) (block 254). The consumer 16 is provided information about the dual-purpose headphones (block 256) in, for example, response to consumer inquiries. For example, the consumer 16 may be informed that the dual-purpose headphones 236 can be purchased with the metering functionality or without the metering functionality (block 256). Additionally, the consumer 16 is informed that the cost of the dual-purpose headphones 236 will be reduced if the consumer 16 is willing to be metered (block 256). In the event that the consumer agrees to be metered (block 258), then the cost is reduced appropriately and circuitry (e.g., the meter components 66, 68, and 70 of FIG. 5) controlling the metering disposed in the headphones 236 is enabled (block 260). Alternatively, the cost may be reduced via a mail-in rebate or a rebate accessed via an Internet website (not shown) that the user is told to visit. Additionally, the consumer may be asked to complete a survey (not shown) by which demographic information about the consumer is supplied to the media measurement entity 18 (see FIG. 1) (block 262). The survey may be provided in hard copy format or may be made available on-line via an Internet website. In the event that the consumer 16 is not willing to be metered, then the manufacturer/vendor pursues the sale of a non-dual purpose (i.e., regular) headphone/earphone set (block 264). Once the sale of the headphones is complete or not going to be consummated with the consumer 16, the manufacturer/vendor determines whether to pursue another consumer (block 266). If the manufacturer/vendor determines that it should pursue another consumer (block 266) then control is passed back to block 254, and the blocks subsequent thereto are performed with the next consumer. Otherwise the process 250 is ended.

The example method 250 of FIG. 26 may be modified in any number of ways to enable distribution of the portable meters 32, 230, or 240 to the consuming public for purposes of enlisting a greater number of metered users. For example, the media measurement entity 18 may partner with the portable media player manufacturers/vendors to provide a rebate or reduced cost media player to consumers who agree to be metered. In response to an agreement to be metered, the consumers are placed in contact with the media measurement entity who responds by collecting demographic information and sending the user a meter for insertion/installation with the media player and sends the user an agreed upon rebate. Alternatively, the media measurement entity and media player manufacturer/vendor may partner to install the portable meter 32, 230, or 240 into the portable media player 26 and only enable the portable meter if the consumer agrees to be metered. If agreement is given, then the portable meter is enabled and the user's media consumption via the media player 26 is thereafter monitored.

As will be understood by one having ordinary skill in the art, the media consumption environment, although represented in FIG. 1 as a household, may be any environment in which media content may be consumed. In the illustrated examples, the portability of the media player 26 is intended to be enhanced by allowing the portable metering of content consumed via the media player 26. In addition, the home meter 30 shown in FIG. 1, although illustrated as a single device, may be any media metering system having any number of components, devices coupled in any desired manner, whether disposed in the home, the workplace, public thoroughfares, places of commerce, etc. The home meter 30 may be implemented using the example media metering systems of the patents and patent applications referenced herein and disclosed in U.S. patent application Ser. No. 10/970,585 which are hereby incorporated herein by reference in their entireties.

Figure 27:
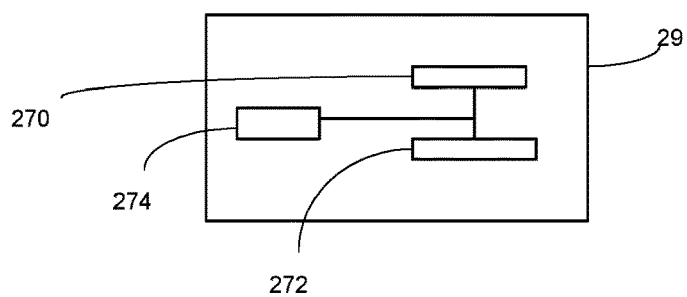
FIG. 27 is an example system that may be used to enable communications between a portable media player and a computer and to monitor those communications.

Referring to FIG. 27, the example personal computer 29 (also shown in FIG. 1) includes software/hardware 270 that enables the personal computer 29 to communicate with the media player 26 via the docking station 28. In some examples, the processor additionally includes software/hardware 272 configured to monitor communication between the software/hardware 270 and the media player 26. Such software/hardware 272 may be designed to review any data tables or libraries containing information about the media content that is downloaded and whether such media content has been presented/displayed by the media player 26. Such information may be stored in, for example, a memory device 274 installed in the personal computer 29.

Although the example media player 26 shown in FIGS. 1 and 2A includes a docking station interface in the media player communication port 42 via which the media player 26 obtains media content, the media player 26 may instead have communication ports (not shown) (e.g., a USB port, a mini-USB port, a Firewire® port, an Ethernet port, etc.) that connect directly to a communication port disposed on the personal computer 29. In this case, all references to the functionality of the docking device 28 is embodied in either the media player 26 or the personal computer 29 such that the communication occurring between the portable meter 32 and the docking device 28 instead occurs directly between the portable meter 32 and the personal computer 29. In other words, in any of the examples described herein, the docking device 28 may be implemented by the personal computer 29.

Figure 28:
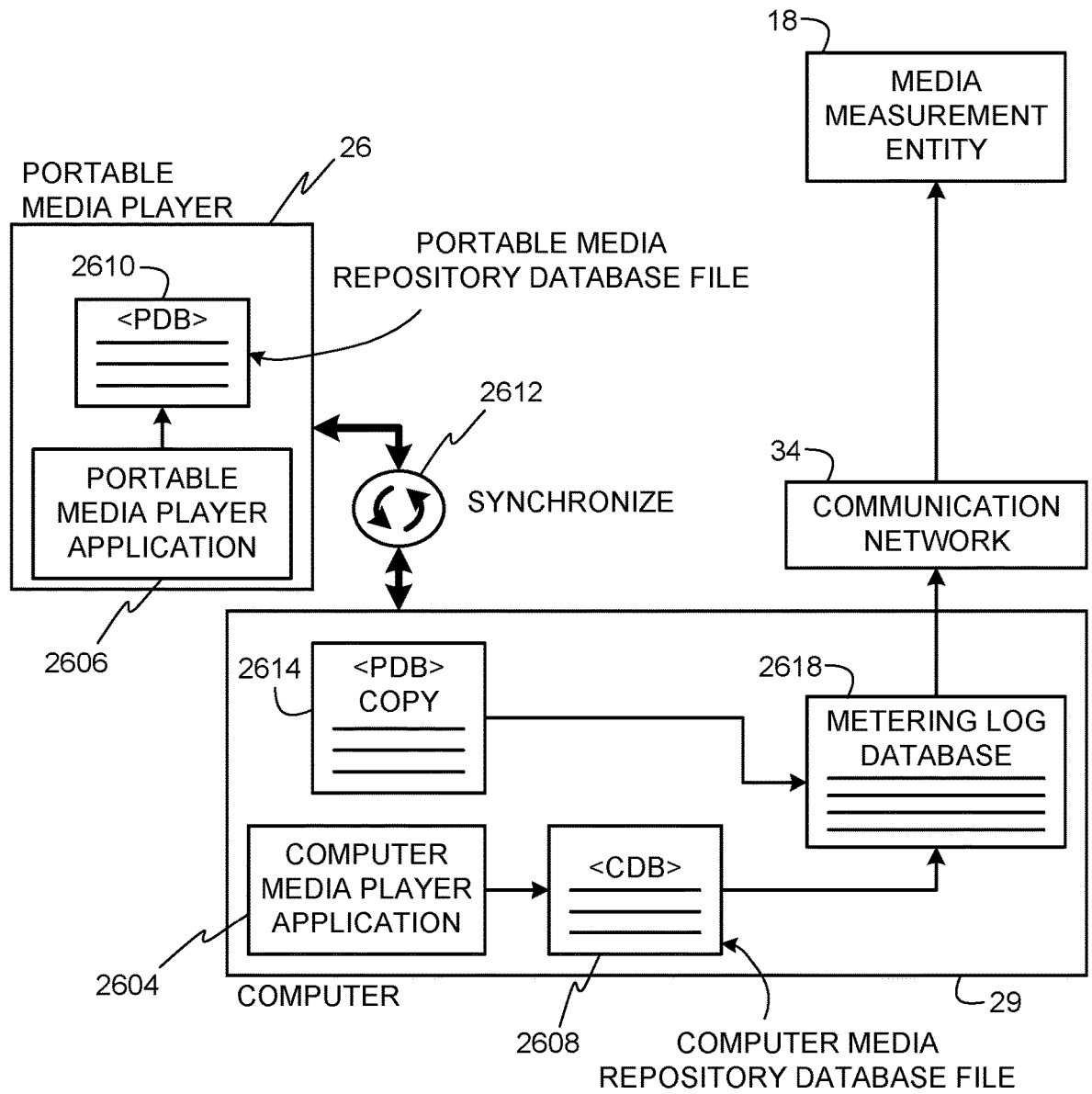
FIG. 28 depicts an example personal computer that may be used to monitor media presented via the personal computer and/or an example portable media player.

Turning to FIG. 28, the example personal computer 29 includes a computer media player application 2604 and the example media player 26 includes a portable media player application 2606. The personal computer 29 is configured to monitor metering information generated by the computer media player application 2604 and the portable media player application 2606. Specifically, the media player applications 2604 and 2606 or other metering software applications installed on the player 26 and computer 29 store metering information in respective media repository data structures 2608 and 2610 (i.e., a computer media repository database ("CDB") 2608 and a portable media repository database ("PDB") 2610). The metering information may include, for example, song titles, media file titles, video titles, movie titles, show titles, number of times presented, dates and times of last presentations, amount of media file that was presented, user identification, media player application identification, portable media player identification, computer identification, software identification, etc.

The Apple iTunes® media player application sold by Apple Computer, Inc. of Cupertino, Calif. generates a music database that may be used to implement the example CDB 2608. Specifically, the Apple iTunes® media player generates the "iTunes Music Library.xml" and the "iTunes 4 Music Library.itl" file. In addition, the Apple iPOD® portable music player generates a music database that may be used to implement the example PDB 2610. Of course, any other databases generated by any other computer media player applications (e.g., the Microsoft® Windows® Media Player®, the RealNetworks®, Inc, RealPlayer®, the Yahoo! ® Music Engine, etc.) or any other portable media players may alternatively be used to implement the CDB 2608 and the PDB 2610. Additionally or alternatively, databases generated by metering software applications separate from media player applications may be used in addition to or instead of databases generated by media presentation applications.

In some examples, it is preferable to implement the media repository data structures 2608 and 2610 using a data structure or file that stores metering information using an organization that facilitates relatively easily retrieving media monitoring information of interest. For instance, an Extensible Markup Language ("XML") file (e.g., the "iTunes Music Library.xml" file) represents metering information using ASCII text that is delimited or otherwise organized using XML tags. Using an XML file enables retrieving metering information using well-known character and string function calls without requiring the use of traditional database query languages. Of course, XML files may also be accessed using XML query languages (e.g., XQuery, developed by the XML Query working group of the World Wide Web Consortium ("W3C®")). Alternatively, traditional database files may be used to implement the media repository data structures 2608 and 2610, in which case traditional database query languages (e.g., structured query language ("SQL")) may be used to access the metering information. Other file types that may be used to implement the media repository data structures 2608 and 2610 include, for example, text files, ASCII files, spreadsheet files, database files, etc.

As shown, the media player 26 may be synchronized with the personal computer 29 using a synchronization process 2612. The synchronization process 2612 copies the PDB 2610 to a PDB copy 2614 stored in the personal computer 29 via a wired or wireless connection to enable the personal computer 29 to access the metering information generated by the media player 26. In an alternative example, the synchronization process 2612 may copy information from the PDB 2610 and merge the information into the CDB 2608 instead of into the PDB copy 2614. In this case, because the metering information generated by the portable media player application 2606 and the computer media player application 2604 are stored in the CDB 2608, the personal computer 29 may not require the PDB copy 2610 to monitor the metering information generated in the media player 26.

To collect metering information for subsequent processing, the personal computer 29 extracts the metering information from the PDB copy 2614 and the CDB 2608 and stores the retrieved metering information in a metering log database 2618 (i.e., a metering log data structure). The personal computer 29 may be configured to retrieve all of the metering information in the PDB copy 2614 and the CDB 2608 or only select metering information (e.g., only metering information of interest to the media measurement entity 18) such as, for example, content (e.g., song) titles, artist/actor names, date/time stamps, playback duration, user identification, media presentation software identification, etc. The personal computer 29 communicates the metering information stored in the metering log database 2618 to the media measurement entity 18 described above in connection with FIG. 1 via the communication network 34 (see FIG. 1).

Although the personal computer 29 is described as using the metering log database 2618 to store metering information retrieved from the PDB copy 2614 and the CDB 2608, in alternative examples, the personal computer 29 may not have the metering log database 2618. Instead, the personal computer 29 may retrieve some or all of the metering information from the PDB copy 2614 and/or the CDB 2608 and communicate the retrieved metering information to the media measurement entity 18 without storing it in a separate metering log database 2618.

In alternative examples, the media player 26 may include a metering log database substantially similar or identical to the metering log database 2618 to store some or all of the metering information retrieved from the PDB 2610 and communicate the metering information to the media measurement entity 18 without requiring the personal computer 29 to manage the PDB copy 2614 for purposes of communicating metering information generated at the media player 26 to the media measurement entity 18. In such an example, the media player 26 may include or be communicatively coupled to a communication transceiver (e.g., a wireless or wired network adapter, a cellular communication transceiver, the personal computer 29, etc.) that communicates the metering information to the media measurement entity via, for example, the communication network 34.

In an alternative example, the PDB 2610 or another data structure substantially similar or identical to the PDB 2610 may be stored and updated in the portable meter 32 (see FIGS. 1, 3, 5, and 6). In particular, the portable meter 32 may include a metering software application or metering hardware that monitors media lines (e.g., the VIDEO$_{OUT}$ signal line 74, the LINEOUT$_{LEFT}$ signal line 75a, and the LINEOUT$_{RIGHT}$ signal line 75b shown in FIG. 6) and stores metering information in a PDB stored therein. The synchronization process 2612 may then copy the metering information from the PDB in the meter 32 to the PDB copy 2614 via a wired or wireless connection for subsequent transmission to the media measurement entity 18.

FIG. 29 depicts example frame incremental logging (FIL) tag codes 2702a-c embedded or inserted in a plurality of respective video frames 2704a-c. A FIL tag code is used to store a numerical value that indicates the number of times that a corresponding frame has been presented. For example, each time the portable media player application 2606 of FIG. 28 decodes and presents the video frame 2704a, the media player application or a function (e.g., a software routine or a hardware function) associated therewith increments the value of the FIL tag code 2702a to indicate that the video frame 2704a was presented. If a user selects to play some portions of a video file more often than others, FIL tag codes associated with the more often presented portions will have higher values than FIL tag codes associated with less often presented portions. The FIL tag codes may also be indicative of whether a person fast forwarded through portions of a media presentation because typically while fast forwarding, a media player application (e.g., the portable media player application 2606) does not decode every frame of the media presentation and, thus, FIL tag codes of non-decoded frames are not incremented.

Each of the FIL tag codes 2702a-c includes a presentation count portion (e.g., the tag code value 2804 of FIG. 30) to store the number of times that a corresponding media frame has been presented and an identification portion (e.g., the tag code identification number 2802 of FIG. 30) to identify that particular FIL tag code. In some examples, the identification portion may correspond to the playback time at which the FIL tag code is inserted in the media content. The FIL tag codes 2702a-c may be inserted in viewable portions of the video frames 2704a-c. However, because the FIL tag codes 2702a-c constitute such a relatively small portion of viewable area, they are substantially imperceptible to humans when the video frames 2704a-c are presented via a display.

To insert FIL tag codes into media content, the media measurement entity 18 may partner with or enter into agreements with media production companies or media delivery companies to insert FIL tag codes into media content. Alternatively, the FIL tag codes may be defined using an industry standard and any media company interested in obtaining ratings information may insert the FIL tag codes into their media content prior to delivering the media content. In the illustrated example of FIG. 29, the FIL tag codes 2702a-c are inserted at five second intervals. However, in other examples the FIL tag codes 2702a-c may be inserted at any other interval. The interval may be defined using a predetermined standard interval determined by, for example, the media measurement entity 18 and/or an industry standard. Alternatively, the interval may be different between different media content (e.g., five seconds for television shows, ten seconds for movies, one second for commercials, etc.). In any case, the interval may be stored in a portion of each FIL tag code or the interval may be known from an interval value or a media type code stored in the media content.

Although in the illustrated example the FIL tag codes 2702a-c are inserted in video frames (the video frames 2704a-c), FIL tag codes may additionally or alternatively be inserted into audio and/or graphic information (e.g., video games, electronic pictures/photos, electronic art, etc.). For example, to track or monitor the number of times that portions of an audio file have been presented by a media player application (e.g., the media player applications 2604 and 2606 of FIG. 28), FIL tag codes may be inserted into audio frames of the audio file and incremented each time the media player application decodes and presents them.

In an alternative example, the FIL tag codes 2702a-c may not be inserted into the media content, but may instead be stored in a separate FIL tag code file (not shown). For example, for each media content file a metering software application may store FIL tag codes in a separate FIL tag code file corresponding to that media content file. In yet another alternative example, the FIL tag codes may be appended to the end or the beginning of a media content file. In either alternative example, metering applications may associate the FIL tag codes with particular media content frames based on frame identifying data (e.g., MPEG frame identification codes or other encoder frame identification codes) used to encode the media content and the FIL tag code identifications (e.g., the tag code identification number 2802 of FIG. 30).

The media measurement entity 18 may use the FIL tag codes 2702a-c to determine consumer preferences associated with particular media presentation portions (e.g., a consumer prefers less violent movies scenes and often skips or fast forwards through violent scenes). The media measurement entity 18 may also use the FIL tag codes 2702a-c to determine whether consumers were adequately exposed to advertisements (e.g., a consumer did not watch or listen to enough of a media presentation to consume an inserted commercial) to facilitate engagement (i.e., consumer responsiveness, reception and/or recall of advertisements) analysis.

Although FIL tag codes (e.g., the FIL tag codes 2702a-c) are described herein in connection with portable media presentation devices (e.g., the portable media player 26), FIL tag codes may be used to monitor the presentation of media by other types of media presentation devices. For example, FIL tag codes may be inserted into television programming media, movies distributed on digital versatile disk ("DVD") or video cassette, Internet protocol television ("IPTV") programming media, Internet-accessible media, satellite broadcast radio, Internet broadcast radio, compressed or uncompressed digital media (e.g., JPEG, MPEG-2, MPEG-3, MPEG-4, advanced audio coding ("AAC"), Windows Media Audio ("WMA"), Windows Media Video ("WMV"), etc.), compact disc ("CD") audio, analog audio, analog video, video games, or any other type of media. In addition, the FIL tag codes may be processed (e.g., retrieved, read, incremented, stored, etc.) using any media presentation device that may be used to decode and/or present media content having the FIL tag codes such as, for example, set-top-boxes, digital video recorders, video cassette recorders/players ("VCR's"), DVD players, CD players, video game consoles, portable video game devices, computers, stereos, etc.

FIG. 30 depicts an example data structure 2800 used to store a plurality of example FIL tag codes (e.g., the FIL tag code values 2702a-c). The data structure 2800 stores a plurality of FIL tag code identifier numbers 2802 and corresponding FIL tag code values 2804. While the media player applications 2604 and 2606 (see FIG. 28) present media content, a FIL tag code handling routine may store the FIL tag codes 2702a-c in respective data structures substantially similar or identical to the data structure 2800 and increment each of the FIL tag code values when the media player applications 2604 and 2606 present a corresponding media frame. The FIL tag code handling routine can then write the FIL tag code values 2804 back to respective FIL tag codes (e.g., the FIL tag codes 2702a-c) of the presented media content.

The metering routine may also use a data structure substantially similar or identical to the example data structure 2800 to store FIL tag code values returned from media content for purposes of communicating the FIL tag code values to the media measurement entity 18. For example, a data structure used to store FIL tag code values may be stored in the CDB 2608, the PDB 2610, and/or the metering log database 2618 for subsequent communication to the media measurement entity 18 for processing.

FIG. 31 depicts an example system 2900 that may be used to monitor media presented via the example personal computer 29 and/or an example portable media player 26. The example system 2900 may be implemented using any desired combination of hardware, firmware, and/or software. For example, one or more integrated circuits, discrete semiconductor components, or passive electronic components may be used. Additionally or alternatively, some or all of the blocks of the example system 2900, or parts thereof, may be implemented using instructions, code, and/or other software and/or firmware, etc. stored on a machine accessible medium that, when executed by, for example, a processor system (e.g., the media player 26 of FIGS. 1, 2, 4, and 28 and/or the personal computer 29 of FIGS. 1, 5, and 28), cause the processor system to perform the operations represented in the flowcharts of FIGS. 32-35.

To decode media content, the example system 2900 is provided with a media decoder 2902. The media decoder 2902 may be configured to decode audio, video, and/or graphic media and may be implemented using any one or more hardware and/or software decoder(s). The media decoder 2902 may be used to implement the computer media player application 2604 and/or the portable media player application 2606 (see FIG. 28).

To retrieve FIL tag codes (e.g., the FIL tag codes 2702a-c of FIG. 29) from media content, increment the FIL tag codes, and store the incremented FIL tag codes in the media content, the example system 2900 is provided with a FIL tag code handler 2904.

To update metering information in media repository data structures (e.g., the CDB 2614 and the PDB 2610), the example system 2900 is provided with a media repository data structure interface 2906. For example, the media repository data structure interface 2906 may be configured to update metering information in the CDB 2614, the PDB 2610, and/or the example data structure 2800 that pertains to media content that is presented by the computer media player application 2604 and/or the portable media player application 2606. The metering information may include, for example, song titles, media file titles, video titles, movie titles, show titles, number of times presented, last date of presentation, amount of media file that was presented, user identification, media player application identification, portable media player identification, computer identification, etc.

To extract metering information from the PDB 2610 and/or the CDB 2608 and the PDB copy 2614 of FIG. 28, the example system 2900 is provided with a data extractor 2908. The data extractor 2908 may be configured to retrieve the metering information from the CDB 2608 and the PDB copy 2614 and store the metering information in the metering log database 2618. When implemented in the media player 26, the data extractor 2908 may perform similar operations. For instance, the data extractor 2908 may retrieve the metering information from the PDB 2610 and communicate the metering information to a metering log database in the media player 26 or directly to the media measurement entity 18. The data extractor 2908 may be configured to retrieve all of the metering information in the CDB 2608, the PDB 2610, and/or the PDB copy 2614 or only select metering information.

The data extractor 2908 may also be configured to retrieve FIL tag code values (e.g., the FIL tag codes 2702*a-c*) from media content and store the retrieved FIL tag code values in the data structure 2800 and/or in the CDB 2608, the PDB 2610, and/or the metering log database 2618 for subsequent communication to the media measurement entity 18.

To determine when the data extractor 2908 should copy metering information from the CDB 2608 and/or the PDB copy 2614 to the metering log database 2618, the example system 2900 is provided with a comparator 2910. The comparator 2910 is configured to compare the metering information in the CDB 2608 and the PDB copy 2614 to the metering information stored in the metering log database 2618 to determine whether metering information in the CDB 2608 and the PDB copy 2614 has changed since the last time the data extractor 2908 copied metering information from the CDB 2608 and the PDB copy 2614 to the metering log database 2618. If the comparator 2910 determines that some metering information is different between the media repository data structures 2608 and 2614 and the metering log database 2618, the comparator 2910 communicates a message indicative of the difference to the data extractor 2908 so that the data extractor 2908 can update the metering information in the metering log database 2618 with any new metering information in the media repository data structures 2608 and 2614.

The comparator 2910 may also be configured to perform other comparisons. For example, to determine when to communicate metering information from the metering log database 2618 to the media measurement entity 18, the comparator 2910 may compare a size of the metering log database 2618 to a predetermined size threshold to determine whether the size of the metering log database 2618 has exceeded the size threshold, in which case the metering information from the metering log database 2618 should be communicated to the media measurement entity 18. Additionally, the comparator 2910 may compare a value of a timer (not shown) to a predetermined time threshold to determine if a lapsed time (tracked by the timer) has exceeded the time threshold.

To communicate metering information to the media measurement entity 18, the example system 2900 includes a data interface 2912. The data interface 2912 may be implemented using any suitable communication transceiver that communicates data via, for example, the communication network 34 (see FIGS. 1 and 28). In an example implementation in which the example system 2900 is implemented in connection with the personal computer 29, the data interface 2912 may be configured to download information from the media measurement entity 18 to the personal computer 29 and/or the media player 26. For example, the data interface 2912 may download metering software and/or metering software updates, upgrades, add-ons, patches, etc. In an example implementation in which the example system 2900 is implemented in connection with the media player 26, the data interface 2912 may be configured to communicate metering information generated by the media player 26 to the personal computer 29 and/or to the media measurement entity 2912.

To track the elapsed playback time of a media presentation, the example system 2900 is provided with a playback-time counter 2914. The playback-time counter 2914 stores a value indicative of the playback position of media being presented by, for example, the media player 26 or the personal computer 29. The playback-time counter 2914 increments or decrements the value stored therein as the playback position of a media presentation is incremented or decremented. The position of a media presentation may be incremented when the media is played back (e.g., regular speed playback or slow motion playback) or is fast-forwarded or portions of the media are skipped. The position of a media presentation may be decremented when the media is played in reverse or rewound at regular speed or any other speed (e.g., fast rewind, slow motion, etc.) or portions of the media are skipped in reverse. In any case, the value in the playback-time counter 2914 is incremented at a rate proportional to the playback, fast forward, or rewind speeds and is adjusted by amounts in accordance with skipped portions of the media. While the media is paused, the playback-time counter 2914 does not increment its value.

Figure 32:
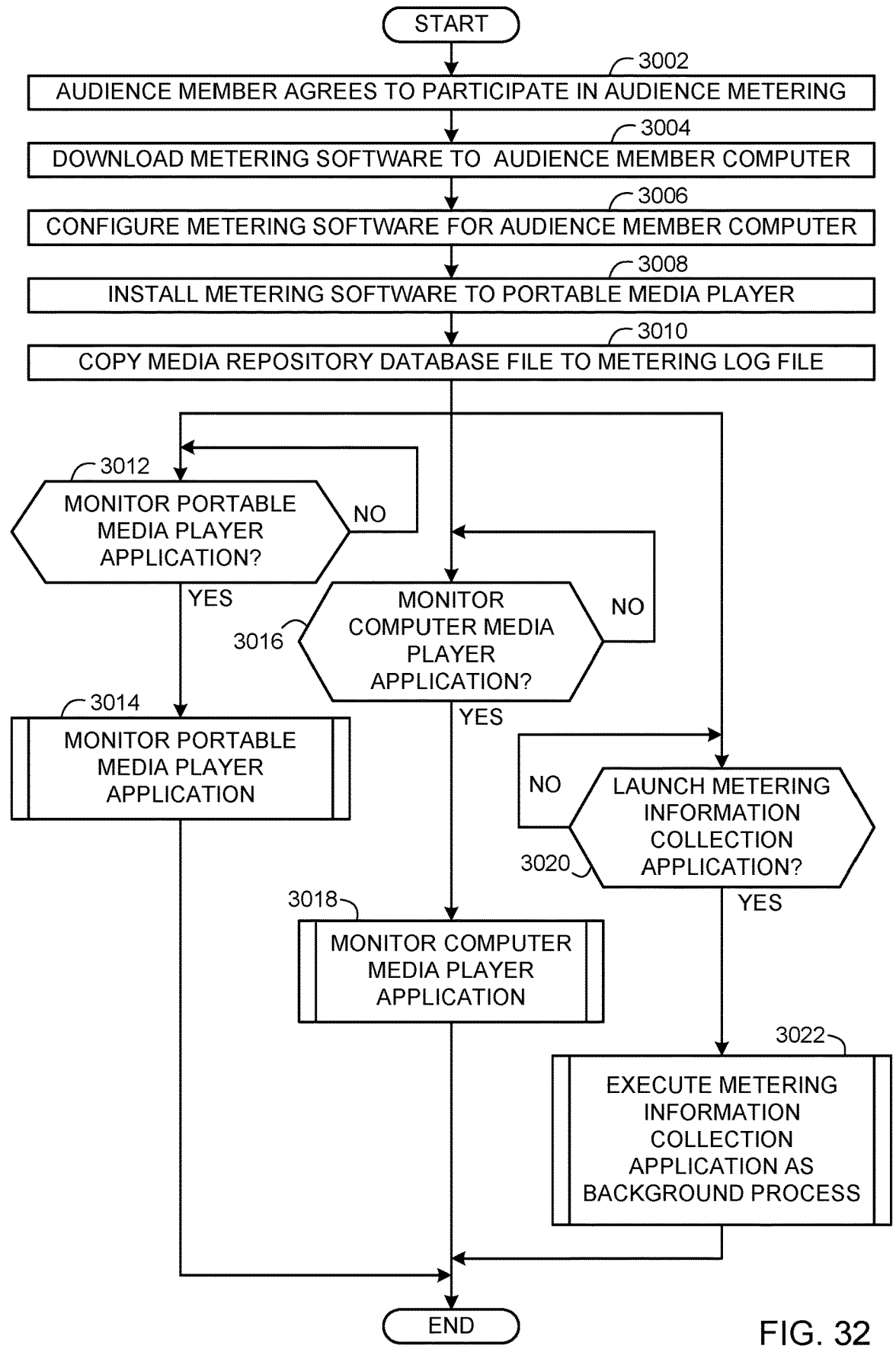
FIG. 32 is a flowchart representative of example machine readable instructions that may be executed to implement the example system of FIG. 31.

FIG. 32 is a flowchart representative of example machine readable instructions that may be executed to implement the example system 2900 of FIG. 31. Initially, an audience member (e.g., the consumer 16 of FIG. 1) agrees to participate in an audience metering program (block 3002). For example, the consumer 16 may answer 'YES' to an on-screen prompt displayed via the personal computer 29 (see FIGS. 1, 5, and 28) asking whether the consumer 16 would like to participate in an audience metering program.

The data interface 2912 then downloads metering software (block 3004). For example, the data interface 2912 may download one or more metering applications to be installed on the personal computer 29 and/or the media player 26. The metering applications may be used to implement the FIL tag code handler 2904, the repository data structure interface 2906, the data extractor 2908, the comparator 2910, and the data interface 2912 of FIG. 31.

The personal computer 29 then configures the metering software to be executed by the personal computer 29 (block 3006). For example, the personal computer 29 may install executable files, library files, etc. used to implement the metering software. In addition, the personal computer 29 installs or generates the metering log database 2618 and determines the file access paths for the CDB 2608 and the PDB copy 2614. The personal computer 29 can store a user identification, a personal computer identification, a software identification, and creation time/date information in the metering log database 2618. In some examples, the metering software may be implemented as a plug-in that functions in connection with media player applications (e.g., the computer media player application 2604 and/or the portable media player application 2606 of FIG. 28). In addition, the personal computer 29 in combination with the media player 26 install the metering software on the media player 26 (block 3008). For example, after coupling the media player 26 to the docking device 28 (see FIGS. 1 and 2B), the synchronization process 2612 (see FIG. 28) may copy the metering software application from the personal computer 29 to the media player 26 and install the metering software application and the PDB 2610 on the media player 26.

During the installation process of the metering software, the data extractor 2908 copies some or all of the metering information from the CDB 2608 and/or the PDB copy 2614 to the metering log database 2618 (block 3010). Alternatively, the data extractor 2908 may copy the metering information to the metering log database 2618 upon initial execution of the metering software.

The portable media player 26 then determines whether it should monitor media content presented by the portable media player application 2606 (block 3012). For example, the portable media player 26 may determine that it should monitor media content presented by the portable media player application 2606 any time the portable media player 26 is turned on or any time a user (e.g., the consumer 16) selects a media file for presentation. If the portable media player 26 determines that it should monitor media content presented by the portable media player application 2606 (block 3012), then it monitors media content presented by the portable media player application 2606 (block 3014) by, for example, executing the metering software downloaded and installed at blocks 3004 and 3008. The monitoring process of block 3014 may be implemented according to the flowchart depicted in FIG. 33 and described in detail below.

The personal computer 29 determines whether it should monitor media content presented by the computer media player application 2604 (block 3016). For example, the personal computer 29 may determine that it should monitor media content presented by the computer media player application 2604 any time a user (e.g., the consumer 16) launches the computer media player application 2604 or selects a media file for presentation. If the personal computer 29 determines that it should monitor media content presented by the computer media player application 2604 (block 3016), then it monitors media content presented by the portable media player application 2604 (block 3018) by, for example, executing the metering software downloaded and installed at blocks 3004 and 3006. The monitoring process of block 3018 may be implemented according to the flowchart depicted in FIG. 34 and described in detail below.

The personal computer 29 determines whether it should launch a metering information collection application (block 3020) to, for example, retrieve metering information from the CDB 2608 and the PDB copy 2614 and to communicate the metering information to the media metering entity 18 (see FIG. 1). For example, the personal computer 29 may determine that it should launch the metering information collection application any time the personal computer 29 is turned on. If the personal computer 29 determines that it should launch the metering information collection application (block 3020), then it executes the metering information collection application as a background process (block 3022) according to, for example, the flowchart depicted in FIG. 35 and described in detail below. Although blocks 3012, 3014, 3016, 3018, 3020, and 3022 are shown as being performed in parallel, in other examples, those blocks may be performed in serial.

Figure 33:
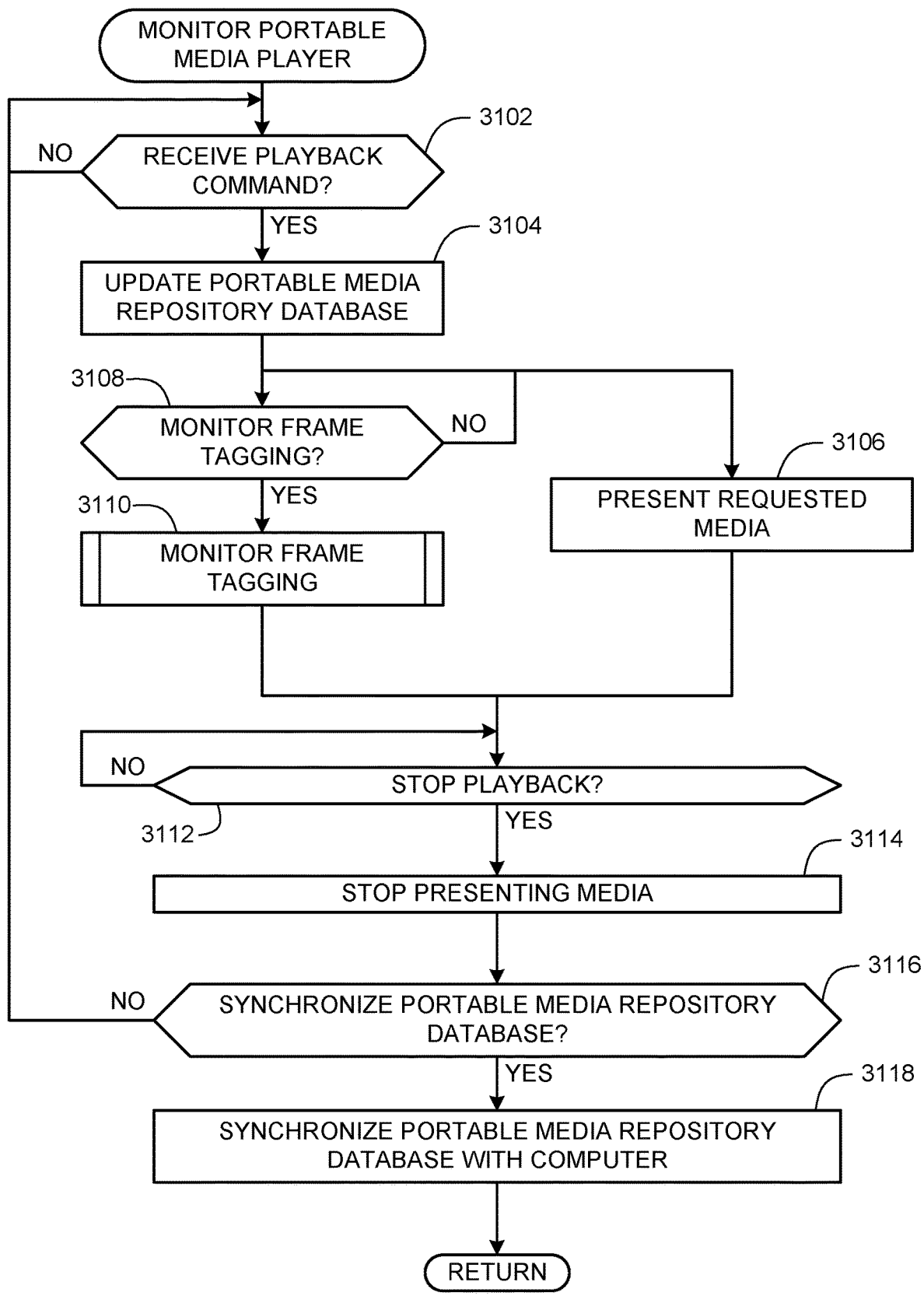
FIG. 33 is a flowchart representative of example machine readable instructions that may be executed to monitor a portable media player.

FIG. 33 is a flowchart representative of example machine readable instructions that may be executed to monitor the portable media player 26. Initially, the media decoder 2902 (see FIG. 31) determines whether it has received a playback command (block 3102). If the media decoder 2902 has not received a playback command (block 3102), the media decoder 2902 continues to check if it has received a playback command (block 3102). If the media decoder 2902 determines that it has received a playback command, the repository data structure interface 2906 updates the PDB 2610 (see FIG. 28) (block 3104) with information (e.g., media identification, current date stamp, current time stamp, etc.) pertaining to a media content file (e.g., a media content file selected by the consumer 16) selected for presentation.

The media decoder 2902 (see FIG. 31) then presents the requested media content (block 3106) and the FIL tag code handler 2904 (see FIG. 31) determines whether it should monitor frame tagging (block 3108) using, for example, FIL tag codes (e.g., the FIL tag codes 2702*a-c* of FIG. 29). If the FIL tag code handler 2904 determines that it should not monitor frame tagging (block 3108) then the media decoder 2902 presents the selected media content (block 3106) without having the FIL tag code handler 2904 monitor FIL tag codes. Otherwise, if the FIL tag code handler 2904 determines that it should monitor frame tagging (block 3108), then the FIL tag code handler 2904 monitors frame tagging (block 3110) according to, for example, the example flowchart depicted in FIG. 36 and described in detail below.

The media decoder 2902 then determines whether it should stop playback (block 3114). For example, the media decoder 2902 may determine that it should stop playback if the consumer 16 presses a stop button or a next movie button or a next song button on the media player 26. Additionally, the media decoder 2902 may determine that it should stop playback if it has reached the end of the selected media content. If the media decoder 2902 determines that it should not stop playback, then control is returned to block 3112. Otherwise, if the media decoder 2902 determines that it should stop playback, then the media decoder 2902 stops presenting the media content (block 3114).

The media player 26 then determines whether it should synchronize the PDB 2610 with the personal computer 29 (block 3116). For example, the media player 26 may determine that it should synchronize the PDB 2610 if the consumer 16 has communicatively coupled the media player 26 to the personal computer 29 via, for example, the docking station 28 and/or if the consumer 16 has selected a synchronization button. If the media player 26 determines that it should not synchronize the PDB 2610 with the personal computer 29 (block 3116), then control is passed back to block 3102. Otherwise, if the media player 26 determines that it should synchronize the PDB 2610 with the personal computer 29 (block 3116), then the synchronization process 2612 copies the metering information from the PDB 2610 to the PDB copy 2614 (see FIG. 28) in the personal computer 29 and control is returned to a calling function or process such as, for example, the process described above in connection with FIG. 32.

Figure 34:
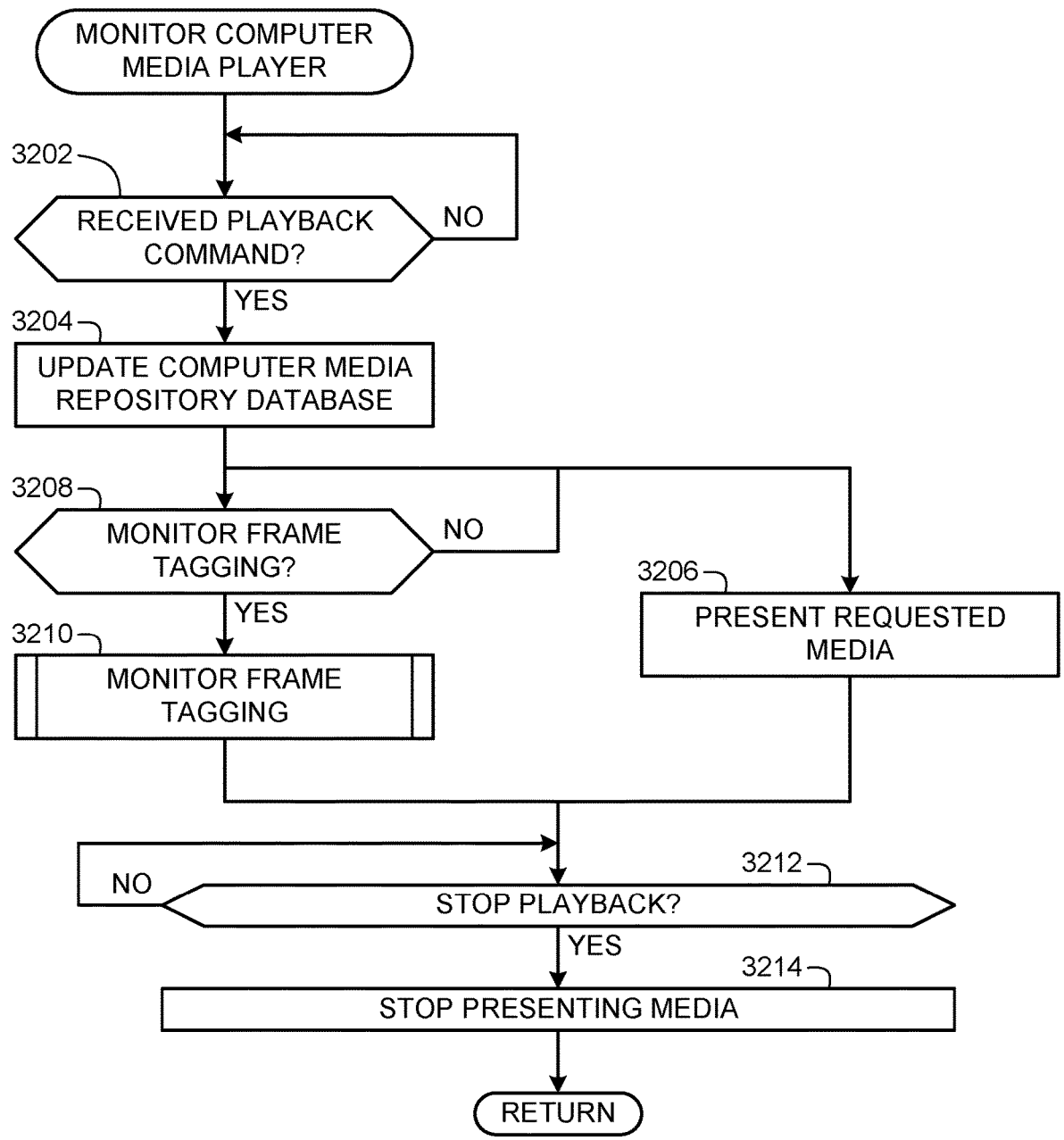
FIG. 34 is a flowchart representative of example machine readable instructions that may be executed to monitor a computer media player.

FIG. 34 is a flowchart representative of example machine readable instructions that may be executed to monitor media content presented by the computer media player application 2604. Initially, the media decoder 2902 (see FIG. 31) determines whether it has received a playback command (block 3202). If the media decoder 2902 has not received a playback command (block 3202), the media decoder 2902 continues to check if it has received a playback command (block 3202). If the media decoder 2902 determines that it has received a playback command, the repository data structure interface 2906 updates the CDB 2608 (see FIG. 28) (block 3204) with information pertaining to a media content file (e.g., a media content file selected by the consumer 16) selected for presentation.

The media decoder 2902 (see FIG. 31) then presents the requested media content (block 3206) and the FIL tag code handler 2904 (see FIG. 31) determines whether it should monitor frame tagging (block 3208) using, for example, FIL tag codes (e.g., the FIL tag codes 2702*a-c* of FIG. 29). If the FIL tag code handler 2904 determines that it should not monitor frame tagging (block 3208) then the media decoder 2902 presents the selected media content (block 3206) without having the FIL tag code handler 2904 monitor FIL tag codes. Otherwise, if the FIL tag code handler 2904 determines that it should monitor frame tagging (block 3208), then the FIL tag code handler 2904 monitors frame tagging (block 3210) according to, for example, the example flowchart depicted in FIG. 36 and described in detail below.

The media decoder 2902 then determines whether it should stop playback (block 3214). For example, the media decoder 2902 may determine that it should stop playback if the consumer 16 presses a stop button or a next movie button or a next song button on the personal computer 29. Additionally, the media decoder 2902 may determine that it should stop playback if it has reached the end of the selected media content. If the media decoder 2902 determines that it should not stop playback, then control is returned to block 3212. Otherwise, if the media decoder 2902 determines that it should stop playback, then media decoder 2902 stops presenting the media content (block 3214) and control is returned to a calling function or process such as, for example, the process described above in connection with FIG. 32.

Figure 35:
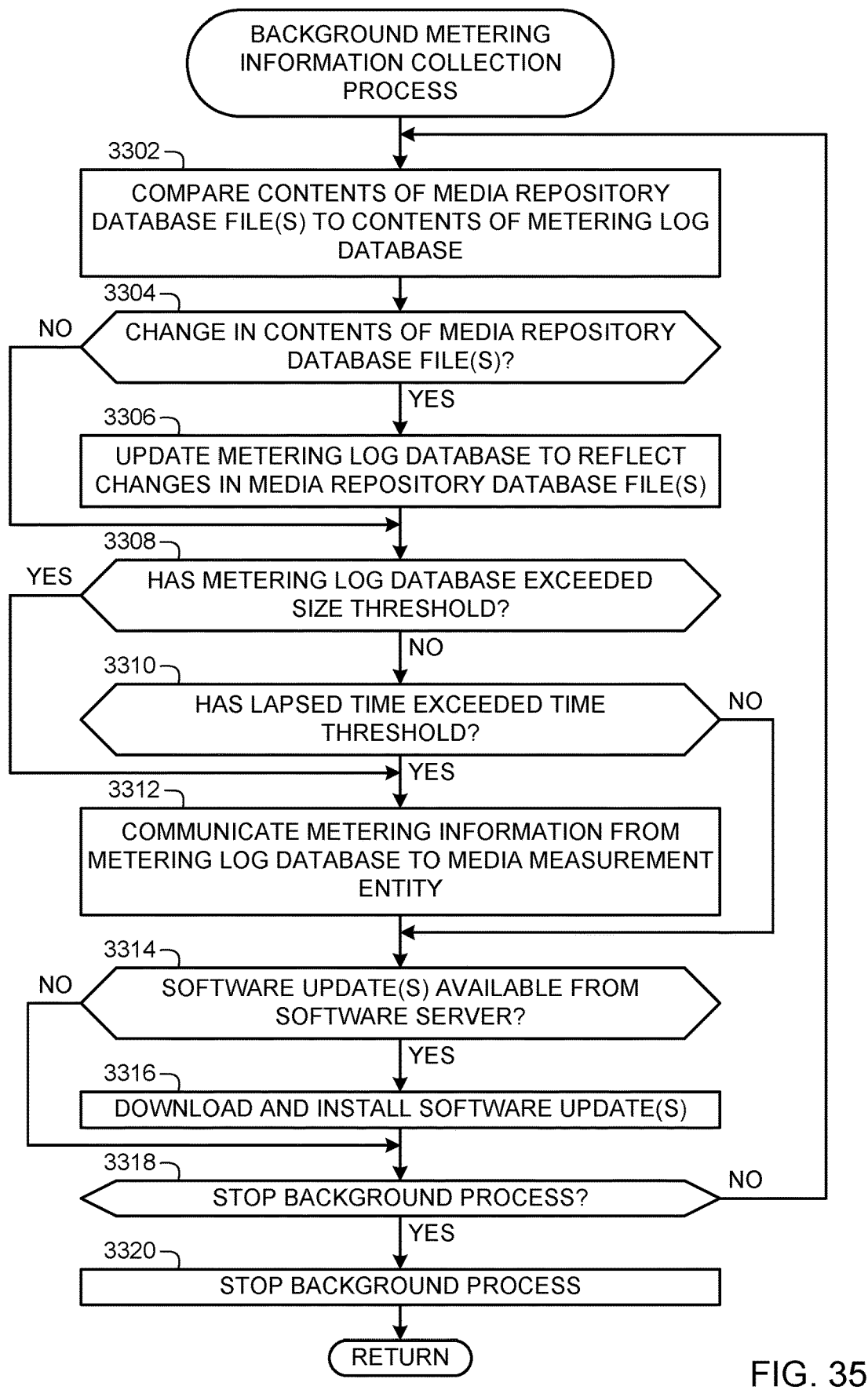
FIG. 35 is a flowchart representative of example machine readable instructions that may be executed to perform a background metering information collection process.

FIG. 35 is a flowchart representative of example machine readable instructions that may be executed to perform a background metering information collection process. Initially, the comparator 2910 compares the contents of the CDB 2608 and the PDB copy 2614 to the contents of the metering log database 2618 (see FIG. 28) (block 3302) and determines whether the contents of the CDB 2608 and/or the PDB copy 2614 have changed based on the comparison (block 3304). For example, if the CDB 2608 and/or the PDB copy 2614 include information different from that stored in the metering log database 2618, then the comparator 2910 determines that the contents of the CDB 2608 and/or the PDB copy 2614 have changed since the last time the data extractor 2908 copied metering information from the CDB 2608 and/or the PDB copy 2614 to the metering log database 2618.

If the comparator 2910 determines that the contents of the CDB 2608 and/or the PDB copy 2614 have changed (block 3304), then the data extractor 2908 updates the metering log database 2618 (block 3306). In particular, the data extractor 2908 retrieves all or select changed metering information from the CDB 2608 and/or the PDB copy 2614 and stores the retrieved metering information in the metering log database 2618 (block 3306).

After the data extractor 2908 updates the metering log database (block 3306) or if at block 3304 the comparator 2910 determines that the contents of the CDB 2608 and/or the PDB copy 2614 have not changed, then the comparator 2910 determines whether the metering log database 2618 has exceeded a size threshold (block 3308). For example, a predetermined size threshold may be used to determine when to communicate metering log information stored in the metering log database 2618 to the media measurement entity 18.

If the comparator 2910 determines that the metering log database 2618 has not exceeded the size threshold (block 3308), then the comparator 2910 determines whether a lapsed time has exceeded a time threshold (block 3310). For example, a predetermined time threshold may be used to determine when to communicate metering information from the metering log database 2618 to the media measurement entity 18. In this manner, even if the metering log database 2618 never exceeds a size threshold, the media measurement entity 18 is nonetheless guaranteed to receive the metering information at least at substantially periodic intervals based on the time threshold. The lapsed time that the comparator 2910 compares to the predetermined time threshold may be tracked using, for example, a timer (not shown) that the example system 2900 resets after each time the data interface 2912 transmits metering information from the metering log database 2618 to the media measurement entity 18.

If the comparator 2910 determines that a lapsed time has exceeded the time threshold (block 3310) or if at block 3308 the comparator 2910 determines that the metering log database 2618 has exceeded the size threshold, then the data interface 2912 (see FIG. 31) communicates metering information from the metering log database 2618 to the media measurement entity 18 (block 3312).

After the data interface 2912 has communicated the metering information from the metering log database 2618 to the media measurement entity 18 (block 3312) or if the comparator 2910 determines that the metering log database 2618 has not exceeded a size threshold (block 3308) or if the comparator 2910 determines that a lapsed time has not exceeded a time threshold (block 3310), the data interface 2912 determines if there are any software updates available from the media measurement entity 18 (block 3314). The software updates may be upgrades, add-ons, patches, additional features, etc. for the metering software applications installed on the personal computer 29 and/or the media player 26. If the data interface 2912 determines that there are software updates available (block 3314), then the data interface 2912 downloads and installs the software updates (block 3316) on the personal computer 29 and/or the media player 26.

The example system 2900 then determines whether it should stop the background metering information collection process (block 3318). For example, the example system 2900 may stop the background process if it is turned off or if the consumer 16 has indicated a request to no longer participate in the metering program. If the example system 2900 determines that it should not stop the background process then control is passed back to block 3302. Otherwise, the example system 2900 stops the background process (block 3320) and control is returned to a calling function or process such as, for example, the process of the example flowchart depicted in FIG. 32.

Figure 36:
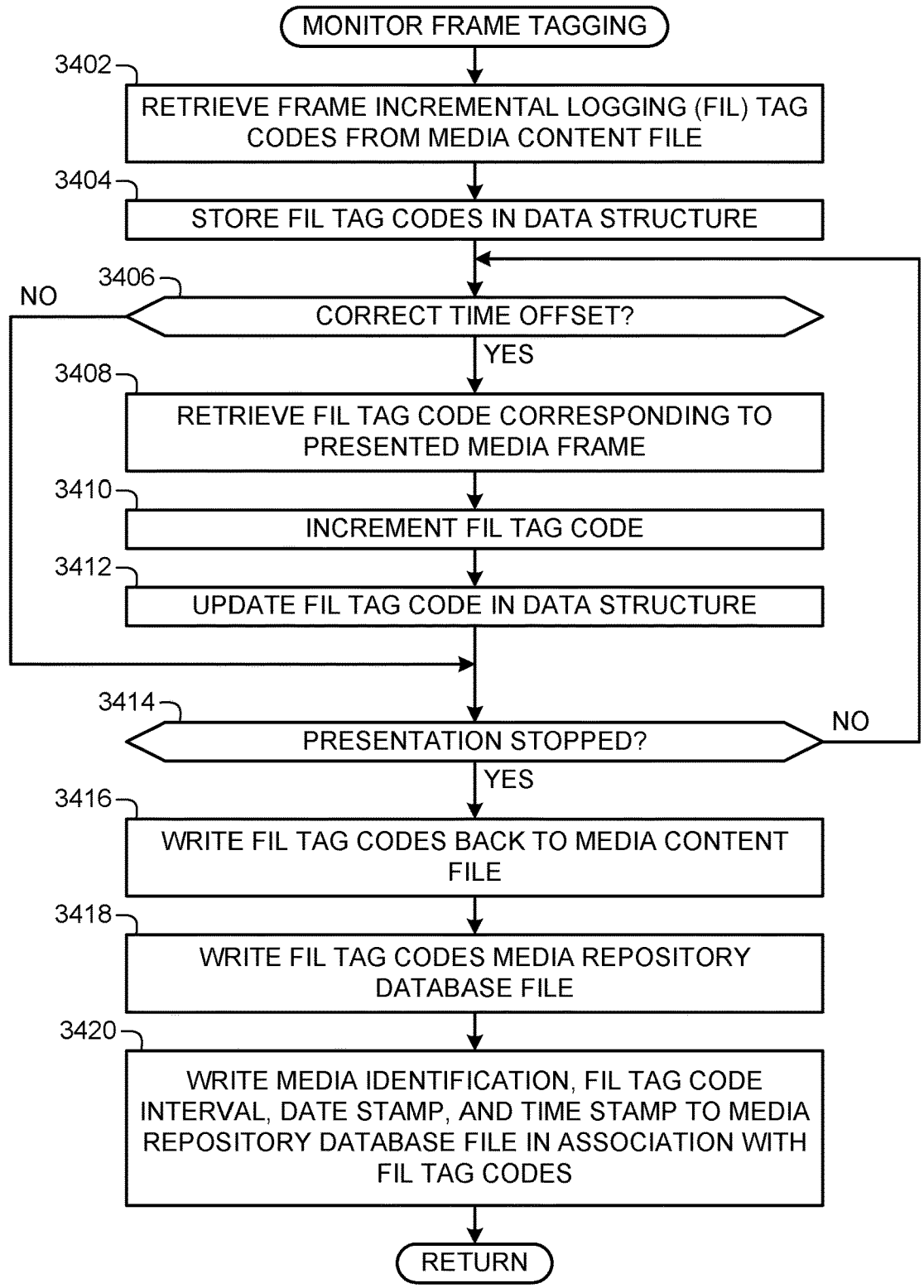
FIG. 36 is a flowchart representative of example machine readable instructions that may be executed to monitor frame tagging.

FIG. 36 is a flowchart representative of example machine readable instructions that may be executed to monitor frame tagging using FIL tag codes (e.g., the FIL tag codes 2702*a-c* of FIG. 29). Initially, the FIL tag code handler 2904 (see FIG. 31) retrieves FIL tag codes from a selected media content file (block 3402). For example, after the consumer 16 selects a particular media content file (e.g., an audio file, a video file, etc.) to be presented, the FIL tag code handler 2904 retrieves the FIL tag codes corresponding to that media content file. If the FIL tag codes are inserted into frames (e.g., audio frames or video frames) of the media content as depicted in FIG. 29, the FIL tag code handler 2904 can retrieve the FIL tag codes from the frames at block 3402. Alternatively, if the FIL tag codes are appended to the end or beginning of the media content file or the codes are stored in a separate file the FIL tag code handler 2904 can retrieve the codes at block 3402. The FIL tag code handler 2904 then stores the retrieved FIL tag codes in a data structure (block 3404) that may be substantially similar or identical to the data structure 2800 of FIG. 30. Alternatively, the data extractor 2908 may retrieve (block 3402) and store (block 3404) the FIL tag codes.

As the media decoder 2902 (see FIG. 31) presents the selected media content file (e.g., at blocks 3106 and/or 3206 of FIGS. 33 and 34), the FIL tag code handler 2904 and/or the comparator 2910 then determines if the media content has reached a correct time offset (block 3406) indicative of a location in the media content corresponding to a FIL tag code. For example, if FIL tag codes are inserted into the media content at five-second intervals, the example system 2900 can generate a plurality of FIL tag code time offset values (e.g., 5 seconds, 10 seconds, 20 seconds, etc.). Each FIL tag code time offset value indicates a correct time offset in a media presentation at which a FIL tag code is embedded in a frame of the media presentation. The FIL tag code handler 2904 may monitor the playback-time counter 2914 (FIG. 29) to determine when five seconds of media content have been presented by comparing the playback-time counter value to a correct time offset value corresponding to a FIL tag code time offset value derived using the five second interval. Even if the media content is fast forwarded or fast reversed, the FIL tag code handler 2904 can determine based on the playback-time counter 2914 when the playback of the media content has reached a time interval (i.e., a FIL tag code time offset value) corresponding to a FIL tag code.

If the FIL tag code handler 2904 and/or the comparator 2910 determines that a correct time offset has been reached (block 3406), the FIL tag code handler 2904 retrieves the FIL tag code corresponding to the media frame (e.g., one of the media frames 2704a-c of FIG. 29) presented at that time offset (block 3408). For example, the FIL tag code handler 2904 may retrieve the FIL tag code corresponding to the presented media frame from the data structure 2800 (see FIG. 30) based on the tag code identification number of the presented media frame and the tag code identification numbers 2802 stored in the data structure 2800. The FIL tag code handler 2904 then increments the value of the retrieved FIL tag code (block 3410) and updates the FIL tag code value in the data structure 2800 (block 3412).

After the FIL tag code handler 2904 has updated the data structure 2800 (block 3412) or if at block 3406 the FIL tag code handler 2904 determines that the correct time offset has not been reached, the FIL tag code handler 2904 determines whether the media presentation has stopped (block 3414) based on, for example, the playback-time counter or the status of the media decoder 2902 (see FIG. 31). If the FIL tag code handler 2904 determines that the media presentation has not stopped (block 3414), then control is returned to block 3406. Otherwise, the FIL tag code handler 2904 writes the FIL tag codes from the data structure 2800 to the selected media content file (block 3416) or to a FIL tag code file corresponding to the selected media content file. The repository data structure interface 2906 then writes the FIL tag codes from the data structure 2800 and/or the selected media content file to a media repository database file (block 3418) to, for example, be communicated to the media measurement entity 18 as described above in connection with FIG. 33. For example, if the process of FIG. 34 is implemented in association with the portable media player 26, the repository data structure interface 2906 writes the FIL tag codes to the PDB 2610. Alternatively, if the process of FIG. 34 is implemented in association with the personal computer 29, the repository data structure interface 2906 writes the FIL tag codes to the CDB 2608. In addition, the repository data structure interface 2906 writes media identification information, a FIL tag code interval value, a date stamp, and a time stamp media repository database file in association with the FIL tag codes written at block 3418 (block 3420). Control is then returned to a calling function or process such as, for example, the process of the example flowchart depicted in FIG. 33 or FIG. 34.

Figure 37:
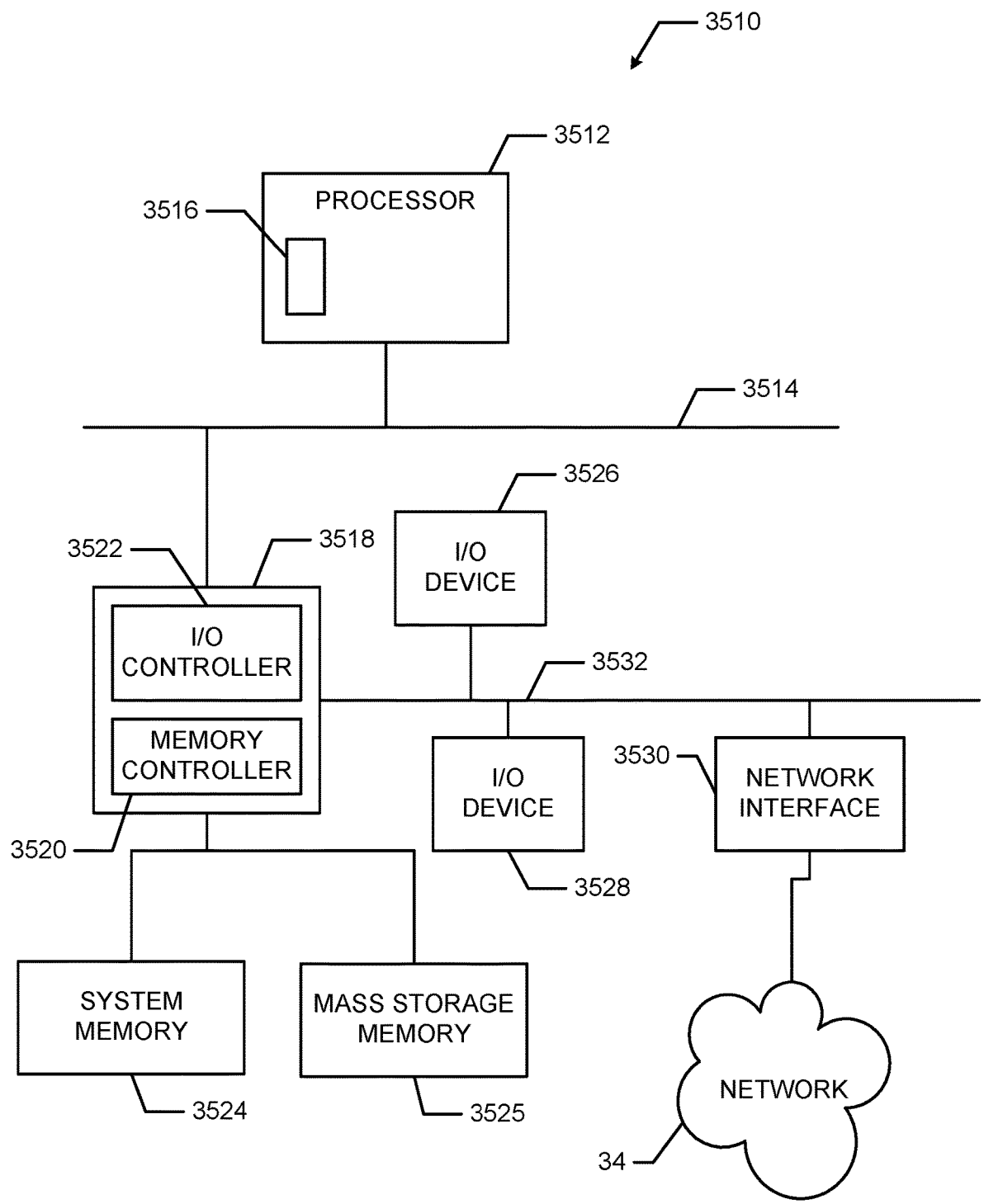
FIG. 37 is a block diagram of an example processor system that may be used to execute the example machine readable instructions of FIGS. 7-21, 26, and/or 30-32 to implement the example systems, portable media player meters, and/or methods described herein.

FIG. 37 is a block diagram of an example processor system 3510 that may be used to execute the example machine readable instructions of FIGS. 7-21, 26, and/or 32-36 to implement the example systems and/or methods described herein. As shown in FIG. 37, the processor system 3510 includes a processor 3512 that is coupled to an interconnection bus 3514. The processor 3512 includes a register set or register space 3516, which is depicted in FIG. 37 as being entirely on-chip, but which could alternatively be located entirely or partially off-chip and directly coupled to the processor 3512 via dedicated electrical connections and/or via the interconnection bus 3514. The processor 3512 may be any suitable processor, processing unit or microprocessor. Although not shown in FIG. 37, the system 3510 may be a multi-processor system and, thus, may include one or more additional processors that are identical or similar to the processor 3512 and that are communicatively coupled to the interconnection bus 3514.

The processor 3512 of FIG. 37 is coupled to a chipset 3518, which includes a memory controller 3520 and an input/output (I/O) controller 3522. As is well known, a chipset typically provides I/O and memory management functions as well as a plurality of general purpose and/or special purpose registers, timers, etc. that are accessible or used by one or more processors coupled to the chipset 3518. The memory controller 3520 performs functions that enable the processor 3512 (or processors if there are multiple processors) to access a system memory 3524 and a mass storage memory 3525.

The system memory 3524 may include any desired type of volatile and/or non-volatile memory such as, for example, static random access memory (SRAM), dynamic random access memory (DRAM), flash memory, read-only memory (ROM), etc. The mass storage memory 3525 may include any desired type of mass storage device including hard disk drives, optical drives, tape storage devices, etc.

The I/O controller 3522 performs functions that enable the processor 3512 to communicate with peripheral input/output (I/O) devices 3526 and 3528 and a network interface 3530 via an I/O bus 3532. The I/O devices 3526 and 3528 may be any desired type of I/O device such as, for example, a keyboard, a video display or monitor, a mouse, etc. The network interface 3530 may be, for example, an Ethernet device, an asynchronous transfer mode (ATM) device, an 802.11 device, a digital subscriber line (DSL) modem, a cable modem, a cellular modem, etc. that enables the processor system 3510 to communicate with another processor system.

While the memory controller 3520 and the I/O controller 3522 are depicted in FIG. 37 as separate functional blocks within the chipset 3518, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. An apparatus comprising:
at least one memory;
instructions; and
a processor to execute the instructions to, in response to monitoring being enabled, at least:
    download an application to be executed by the processor; and
    generate metering information by executing the application, the metering information based on (1) media sent to a headset and (2) media access commands received from a first communication interface of a portable meter at a second communication interface of a portable media presentation device, the portable meter comprising a metering information generator separate from the portable media presentation device, the portable meter to be communicatively coupled between the portable media presentation device and the headset, and the media received at an audio interface of the portable meter.

2. The apparatus of claim 1, wherein the portable meter is located in the headset and the processor is to execute the instructions to cause a speaker of the headset to emit audio based on the media received from the portable media presentation device.

3. The apparatus of claim 1, wherein the processor is to execute the instructions to generate the metering information by at least one of generating an audio signature based on the media or extracting a code from the media.

4. The apparatus of claim 1, wherein the processor is to execute the instructions to transmit the metering information to a personal computer via a wireless or wired communication medium.

5. The apparatus of claim 1, wherein the media access commands include at least one of a play command, a stop command, a pause command, a previous command, or a next command.

6. The apparatus of claim 1, wherein the processor is to execute the instructions to receive the media access commands when the media access commands are passed through the portable meter to the portable media presentation device from the headset.

7. An apparatus comprising:
at least one memory;
instructions; and
a processor to execute the instructions to at least:
    retrieve a frame tag code from a frame of media, the frame tag code associated with a corresponding frame of the media presented by a portable media presentation device, the frame tag code including a frame tag code value that indicates a number of times the frame of the media has been presented via the portable media presentation device;
    after the corresponding frame of the media has been presented, increment the frame tag code value when a playback-time of the media corresponds to a frame tag code time offset value; and
    store the frame tag code, with the incremented frame tag code value, in the corresponding frame of the media.

8. The apparatus of claim 7, wherein the frame is at least one of an audio frame or a video frame.

9. The apparatus of claim 7, wherein the processor is to execute the instructions to store the frame tag code in a data structure in association with identification information indicative of at least one of a user of the portable media presentation device, the portable media presentation device, or the media.

10. The apparatus of claim 7, wherein the processor is to execute the instructions to:
retrieve a plurality of frame tag codes associated with the media; and
store the plurality of frame tag codes in a database.

11. The apparatus of claim 7, wherein the processor is to execute the instructions to communicate the frame tag code to one of a personal computer or a data collection facility.

12. The apparatus of claim 7, wherein the processor is to execute the instructions to store the frame tag code, including the incremented frame tag code value, in a database.

13. The apparatus of claim 1, wherein the processor is to execute the instructions to launch a metering information collection application to retrieve the metering information and communicate the metering information to a media metering entity.

\* \* \* \* \*